(12) United States Patent
Forenza et al.

(10) Patent No.: US 9,685,997 B2
(45) Date of Patent: *Jun. 20, 2017

(54) SYSTEMS AND METHODS TO ENHANCE SPATIAL DIVERSITY IN DISTRIBUTED-INPUT DISTRIBUTED-OUTPUT WIRELESS SYSTEMS

(75) Inventors: Antonio Forenza, Palo Alto, CA (US); Timothy A. Pitman, Sunnyvale, CA (US); Benyavut Jirasutayasuntorn, San Mateo, CA (US); Robert J. Andrzejewski, San Jose, CA (US); Stephen G. Perlman, Palo Alto, CA (US)

(73) Assignee: REARDEN, LLC, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/475,598

(22) Filed: May 18, 2012

(65) Prior Publication Data
US 2012/0314649 A1 Dec. 13, 2012

Related U.S. Application Data

(63) Continuation-in-part of application No. 13/464,648, filed on May 4, 2012, which is a continuation-in-part
(Continued)

(51) Int. Cl.
*H04B 7/02* (2006.01)
*H04B 7/024* (2017.01)
(Continued)

(52) U.S. Cl.
CPC ........... *H04B 7/024* (2013.01); *H04B 7/0465* (2013.01); *H04B 7/0626* (2013.01); *H04B 7/0691* (2013.01)

(58) Field of Classification Search
CPC .... H04B 7/024; H04B 7/0626; H04B 7/0465; H04B 7/0691
See application file for complete search history.

(56) References Cited

U.S. PATENT DOCUMENTS

| 4,003,016 A | 1/1977 | Remley |
| 4,076,097 A | 2/1978 | Clarke |

(Continued)

FOREIGN PATENT DOCUMENTS

| CN | 1820424 A | 8/2006 |
| CN | 101536320 A | 9/2009 |

(Continued)

OTHER PUBLICATIONS

Office Action from U.S. Appl. No. 13/633,702, mailed Dec. 17, 2013, 21 pages.
(Continued)

*Primary Examiner* — Ajay Cattungal
(74) *Attorney, Agent, or Firm* — Nicholson De Vos Webster & Elliott LLP

(57) ABSTRACT

Systems and methods are described for enhancing the channel spatial diversity in a multiple antenna system (MAS) with multi-user (MU) transmissions ("MU-MAS"), by exploiting channel selectivity indicators. The proposed methods are: i) antenna selection; ii) user selection; iii) transmit power balancing. All three methods, or any combination of those, are shown to provide significant performance gains in DIDO systems in practical propagation scenarios.

36 Claims, 53 Drawing Sheets

Related U.S. Application Data of application No. 12/917,257, filed on Nov. 1, 2010, now Pat. No. 8,542,763, which is a continuation-in-part of application No. 12/802,988, filed on Jun. 16, 2010, which is a continuation-in-part of application No. 12/802,976, filed on Jun. 16, 2010, now Pat. No. 8,170,081, which is a continuation-in-part of application No. 12/802,974, filed on Jun. 16, 2010, which is a continuation-in-part of application No. 12/802,989, filed on Jun. 16, 2010, which is a continuation-in-part of application No. 12/802,958, filed on Jun. 16, 2010, which is a continuation-in-part of application No. 12/802,975, filed on Jun. 16, 2010, which is a continuation-in-part of application No. 12/802,938, filed on Jun. 16, 2010, now Pat. No. 8,571,086, which is a continuation-in-part of application No. 12/630,627, filed on Dec. 3, 2009, now Pat. No. 8,654,815, which is a continuation-in-part of application No. 11/894,394, filed on Aug. 20, 2007, now Pat. No. 7,599,420, which is a continuation-in-part of application No. 11/894,362, filed on Aug. 20, 2007, now Pat. No. 7,633,994, which is a continuation-in-part of application No. 11/894,540, filed on Aug. 20, 2007, now Pat. No. 7,636,381.

(51) Int. Cl.
  *H04B 7/06* (2006.01)
  *H04B 7/04* (2017.01)

(56) References Cited

U.S. PATENT DOCUMENTS

| | | | |
|---|---|---|---|
| 4,209,780 A | 6/1980 | Fenimore | |
| 4,253,193 A | 2/1981 | Kennard et al. | |
| 4,564,935 A | 1/1986 | Kaplan | |
| 4,771,289 A | 9/1988 | Masak | |
| 4,855,061 A | 8/1989 | Martin | |
| 5,088,091 A * | 2/1992 | Schroeder | H04L 12/28 370/406 |
| 5,095,500 A | 3/1992 | Tayloe et al. | |
| 5,304,809 A | 4/1994 | Wickersheim | |
| 5,315,309 A | 5/1994 | Rudow et al. | |
| 5,424,533 A | 6/1995 | Schmutz | |
| 5,472,467 A | 12/1995 | Pfeffer et al. | |
| 5,479,026 A | 12/1995 | Schumtz | |
| 5,600,326 A | 2/1997 | Yu et al. | |
| 5,809,422 A * | 9/1998 | Raleigh | H04B 7/2609 455/444 |
| 5,838,671 A | 11/1998 | Ishikawa | |
| 5,872,814 A | 2/1999 | McMeekin et al. | |
| 5,930,379 A | 7/1999 | Rehg et al. | |
| 5,950,124 A | 9/1999 | Trompower et al. | |
| 5,983,104 A | 11/1999 | Wickman et al. | |
| 6,041,365 A | 3/2000 | Kleinerman | |
| 6,061,023 A | 5/2000 | Daniel et al. | |
| 6,067,290 A | 5/2000 | Paulraj et al. | |
| 6,252,912 B1 | 6/2001 | Salinger | |
| 6,400,761 B1 | 6/2002 | Smee et al. | |
| 6,411,612 B1 | 6/2002 | Halford et al. | |
| 6,442,151 B1 | 8/2002 | H'mimy et al. | |
| 6,445,910 B1 | 9/2002 | Oestreich | |
| 6,459,900 B1 | 10/2002 | Scheinert | |
| 6,473,467 B1 | 10/2002 | Wallace et al. | |
| 6,484,030 B1 | 11/2002 | Antoine et al. | |
| 6,633,294 B1 | 10/2003 | Rosenthal et al. | |
| 6,643,386 B1 | 11/2003 | Foster | |
| 6,718,180 B1 * | 4/2004 | Lundh | H04W 52/362 370/342 |
| 6,760,388 B2 | 7/2004 | Ketchum et al. | |
| 6,771,706 B2 | 8/2004 | Ling et al. | |
| 6,785,341 B2 | 8/2004 | Walton et al. | |
| 6,791,508 B2 | 9/2004 | Berry et al. | |
| 6,801,580 B2 | 10/2004 | Kadous | |
| 6,804,311 B1 | 10/2004 | Dabak et al. | |
| 6,862,271 B2 | 3/2005 | Medvedev et al. | |
| 6,888,809 B1 * | 5/2005 | Foschini | H04B 7/0634 370/334 |
| 6,920,192 B1 | 7/2005 | Laroia et al. | |
| 6,978,150 B2 * | 12/2005 | Hamabe | H04W 52/54 370/320 |
| 7,006,043 B1 | 2/2006 | Nalbandian | |
| 7,013,144 B2 | 3/2006 | Yamashita et al. | |
| 7,072,413 B2 | 7/2006 | Walton et al. | |
| 7,072,693 B2 | 7/2006 | Farlow et al. | |
| 7,116,723 B2 | 10/2006 | Kim et al. | |
| 7,139,527 B2 | 11/2006 | Tamaki et al. | |
| 7,142,154 B2 | 11/2006 | Quilter et al. | |
| 7,154,936 B2 | 12/2006 | Bjerke et al. | |
| 7,154,960 B2 | 12/2006 | Liu et al. | |
| 7,167,684 B2 | 1/2007 | Kadous et al. | |
| 7,197,082 B2 | 3/2007 | Alexiou et al. | |
| 7,197,084 B2 | 3/2007 | Ketchum | |
| 7,242,724 B2 | 7/2007 | Alexiou et al. | |
| 7,248,879 B1 | 7/2007 | Walton et al. | |
| 7,257,237 B1 | 8/2007 | Luck et al. | |
| 7,272,294 B2 | 9/2007 | Zhou et al. | |
| 7,310,680 B1 | 12/2007 | Graham et al. | |
| 7,327,362 B2 | 2/2008 | Grau | |
| 7,333,540 B2 | 2/2008 | Yee | |
| 7,369,876 B2 | 5/2008 | Lee et al. | |
| 7,373,133 B2 | 5/2008 | Mickle et al. | |
| 7,412,212 B2 | 8/2008 | Hottinen | |
| 7,418,053 B2 | 8/2008 | Perlman et al. | |
| 7,437,177 B2 | 10/2008 | Ozluturk et al. | |
| 7,486,931 B2 | 2/2009 | Cho et al. | |
| 7,502,420 B2 | 3/2009 | Ketchum | |
| 7,548,752 B2 | 6/2009 | Sampath et al. | |
| 7,558,575 B2 | 7/2009 | Losh et al. | |
| 7,599,420 B2 | 10/2009 | Forenza et al. | |
| 7,630,337 B2 | 12/2009 | Zheng et al. | |
| 7,633,944 B1 | 12/2009 | Chang et al. | |
| 7,633,994 B2 | 12/2009 | Forenza et al. | |
| 7,636,381 B2 | 12/2009 | Forenza et al. | |
| 7,688,789 B2 | 3/2010 | Pan et al. | |
| 7,729,433 B2 | 6/2010 | Jalloul et al. | |
| 7,729,443 B2 | 6/2010 | Fukuoka et al. | |
| 7,751,843 B2 | 7/2010 | Butala | |
| 7,756,222 B2 | 7/2010 | Chen et al. | |
| 7,923,677 B2 | 4/2011 | Slinger | |
| 8,041,362 B2 | 10/2011 | Li et al. | |
| 8,081,944 B2 * | 12/2011 | Li | H04B 7/0837 375/347 |
| 8,126,510 B1 | 2/2012 | Samson | |
| 8,243,353 B1 | 8/2012 | Gutin et al. | |
| 8,428,177 B2 | 4/2013 | Tsai | |
| 8,638,880 B2 | 1/2014 | Baldemair et al. | |
| 8,654,815 B1 | 2/2014 | Forenza | |
| 8,797,970 B2 | 8/2014 | Xing | |
| 8,849,339 B2 | 9/2014 | Anto | |
| 2002/0027985 A1 * | 3/2002 | Rashid-Farrokhi | H04L 25/14 379/417 |
| 2002/0142723 A1 * | 10/2002 | Foschini | H04L 1/0618 455/59 |
| 2002/0168017 A1 * | 11/2002 | Berthet | H03M 13/25 375/267 |
| 2002/0181444 A1 | 12/2002 | Acampora | |
| 2002/0193146 A1 * | 12/2002 | Wallace | H04B 7/0417 455/562.1 |
| 2003/0003863 A1 | 1/2003 | Thielecke et al. | |
| 2003/0012315 A1 * | 1/2003 | Fan | H04B 7/0613 375/349 |
| 2003/0036359 A1 | 2/2003 | Dent et al. | |
| 2003/0043929 A1 | 3/2003 | Sampath | |
| 2003/0048753 A1 | 3/2003 | Jalali | |
| 2003/0095186 A1 | 5/2003 | Aman et al. | |
| 2003/0114165 A1 * | 6/2003 | Mills | H04W 16/06 455/453 |
| 2003/0125026 A1 | 7/2003 | Tsunerhara et al. | |
| 2003/0125040 A1 | 7/2003 | Walton et al. | |

(56) References Cited

U.S. PATENT DOCUMENTS

| | | |
|---|---|---|
| 2003/0139196 A1 | 7/2003 | Medvedev et al. |
| 2003/0147362 A1 | 8/2003 | Dick et al. |
| 2003/0156056 A1 | 8/2003 | Perry |
| 2003/0161282 A1 | 8/2003 | Medvedev et al. |
| 2003/0211843 A1* | 11/2003 | Song .................. H04W 76/002 455/411 |
| 2003/0214431 A1 | 11/2003 | Hager et al. |
| 2003/0222820 A1 | 12/2003 | Karr et al. |
| 2003/0223391 A1 | 12/2003 | Malaender et al. |
| 2003/0235146 A1 | 12/2003 | Wu et al. |
| 2004/0008650 A1 | 1/2004 | Le et al. |
| 2004/0042556 A1 | 3/2004 | Medvedev et al. |
| 2004/0043784 A1 | 3/2004 | Czaja et al. |
| 2004/0097197 A1 | 5/2004 | Juncker et al. |
| 2004/0136349 A1* | 7/2004 | Walton ................ H04B 7/0417 370/338 |
| 2004/0170430 A1* | 9/2004 | Gorokhov ............. H04L 1/0618 398/41 |
| 2004/0176097 A1 | 9/2004 | Wilson et al. |
| 2004/0179627 A1 | 9/2004 | Ketchum et al. |
| 2004/0185909 A1 | 9/2004 | Alexiou et al. |
| 2004/0190636 A1 | 9/2004 | Oprea |
| 2004/0203987 A1 | 10/2004 | Butala |
| 2004/0252632 A1 | 12/2004 | Bourdoux et al. |
| 2005/0003865 A1 | 1/2005 | Lastinger et al. |
| 2005/0020237 A1 | 1/2005 | Alexiou |
| 2005/0031047 A1 | 2/2005 | Maltsev et al. |
| 2005/0041750 A1 | 2/2005 | Lau |
| 2005/0041751 A1 | 2/2005 | Nir et al. |
| 2005/0043031 A1 | 2/2005 | Cho et al. |
| 2005/0047515 A1 | 3/2005 | Walton et al. |
| 2005/0058217 A1 | 3/2005 | Sandhu |
| 2005/0075110 A1 | 4/2005 | Posti et al. |
| 2005/0101259 A1 | 5/2005 | Tong et al. |
| 2005/0111406 A1 | 5/2005 | Pasanen et al. |
| 2005/0111599 A1* | 5/2005 | Walton ............... H04B 1/71072 375/347 |
| 2005/0157683 A1* | 7/2005 | Ylitalo ................ H04B 7/0634 370/334 |
| 2005/0169396 A1 | 8/2005 | Baier et al. |
| 2005/0232135 A1 | 10/2005 | Mukai et al. |
| 2005/0259627 A1* | 11/2005 | Song ....................... H04B 7/04 370/342 |
| 2005/0271009 A1 | 12/2005 | Shirakabe et al. |
| 2005/0287962 A1* | 12/2005 | Mehta ...................... H01Q 3/26 455/101 |
| 2006/0023803 A1 | 2/2006 | Perlman et al. |
| 2006/0050804 A1 | 3/2006 | Leclair |
| 2006/0098568 A1 | 5/2006 | Oh et al. |
| 2006/0146755 A1 | 7/2006 | Pan et al. |
| 2006/0203096 A1 | 9/2006 | Lasalle et al. |
| 2006/0203708 A1 | 9/2006 | Sampath |
| 2006/0270359 A1* | 11/2006 | Karmi .................. H04B 7/0632 455/69 |
| 2006/0287743 A1 | 12/2006 | Sampath et al. |
| 2007/0058590 A1 | 3/2007 | Wang et al. |
| 2007/0082674 A1 | 4/2007 | Pedersen |
| 2007/0091178 A1 | 4/2007 | Cotter |
| 2007/0099665 A1 | 5/2007 | Kim |
| 2007/0135125 A1 | 6/2007 | Kim et al. |
| 2007/0183362 A1 | 8/2007 | Mondal et al. |
| 2007/0242782 A1 | 10/2007 | Han et al. |
| 2007/0249380 A1 | 10/2007 | Stewart et al. |
| 2007/0280116 A1 | 12/2007 | Wang et al. |
| 2007/0285559 A1 | 12/2007 | Perlman et al. |
| 2008/0080631 A1* | 4/2008 | Forenza ............... H04B 7/0684 375/260 |
| 2008/0100622 A1 | 5/2008 | Gordon |
| 2008/0102881 A1 | 5/2008 | Han et al. |
| 2008/0107135 A1 | 5/2008 | Ibrahim |
| 2008/0117961 A1 | 5/2008 | Han |
| 2008/0118004 A1* | 5/2008 | Forenza ............... H04B 7/0684 375/299 |
| 2008/0125051 A1 | 5/2008 | Kim et al. |
| 2008/0130790 A1* | 6/2008 | Forenza ............... H04B 7/0452 375/299 |
| 2008/0132281 A1 | 6/2008 | Kim et al. |
| 2008/0181285 A1 | 7/2008 | Hwang et al. |
| 2008/0205538 A1 | 8/2008 | Han et al. |
| 2008/0214185 A1 | 9/2008 | Cho et al. |
| 2008/0227422 A1 | 9/2008 | Hwang et al. |
| 2008/0232394 A1 | 9/2008 | Kozek et al. |
| 2008/0239938 A1 | 10/2008 | Jalloul et al. |
| 2008/0260054 A1 | 10/2008 | Myung et al. |
| 2008/0268833 A1 | 10/2008 | Huang et al. |
| 2008/0292011 A1 | 11/2008 | Yang |
| 2009/0041151 A1 | 2/2009 | Khan et al. |
| 2009/0060013 A1 | 3/2009 | Ashikhmin et al. |
| 2009/0067198 A1 | 3/2009 | Graham et al. |
| 2009/0067402 A1 | 3/2009 | Forenza et al. |
| 2009/0086855 A1 | 4/2009 | Jin et al. |
| 2009/0135944 A1 | 5/2009 | Dyer et al. |
| 2009/0168914 A1 | 7/2009 | Chance et al. |
| 2009/0195355 A1 | 8/2009 | Mitchell |
| 2009/0202016 A1 | 8/2009 | Seong et al. |
| 2009/0207822 A1 | 8/2009 | Kim et al. |
| 2009/0209206 A1 | 8/2009 | Zou et al. |
| 2009/0227249 A1 | 9/2009 | Ylitalo |
| 2009/0227292 A1 | 9/2009 | Laroia et al. |
| 2009/0285156 A1 | 11/2009 | Huang et al. |
| 2009/0296650 A1 | 12/2009 | Venturino |
| 2009/0318183 A1 | 12/2009 | Hugl et al. |
| 2010/0034151 A1 | 2/2010 | Alexiou |
| 2010/0098030 A1 | 4/2010 | Wang et al. |
| 2010/0164802 A1 | 7/2010 | Li et al. |
| 2010/0172309 A1 | 7/2010 | Forenza |
| 2010/0195527 A1 | 8/2010 | Gorokhov et al. |
| 2010/0220679 A1 | 9/2010 | Abraham et al. |
| 2010/0224725 A1 | 9/2010 | Perlman et al. |
| 2010/0227562 A1 | 9/2010 | Shim et al. |
| 2010/0234071 A1 | 9/2010 | Shabtay et al. |
| 2010/0260060 A1 | 10/2010 | Abraham et al. |
| 2010/0260103 A1 | 10/2010 | Guey et al. |
| 2010/0260115 A1 | 10/2010 | Frederiksen et al. |
| 2010/0279625 A1 | 11/2010 | Ko et al. |
| 2010/0290382 A1 | 11/2010 | Hui et al. |
| 2010/0315966 A1 | 12/2010 | Weigand |
| 2010/0316163 A1* | 12/2010 | Forenza ................ H04B 7/024 375/296 |
| 2011/0002371 A1* | 1/2011 | Forenza ............... H04B 7/0417 375/227 |
| 2011/0002410 A1* | 1/2011 | Forenza ............... H04B 7/0626 375/267 |
| 2011/0002411 A1* | 1/2011 | Forenza ................ H04B 7/024 375/267 |
| 2011/0003606 A1* | 1/2011 | Forenza ............ H04L 25/03891 455/501 |
| 2011/0003607 A1* | 1/2011 | Forenza ............... H04B 7/0626 455/501 |
| 2011/0003608 A1* | 1/2011 | Forenza .................. H04B 7/01 455/501 |
| 2011/0044193 A1* | 2/2011 | Forenza ................ H04B 7/024 370/252 |
| 2011/0069638 A1 | 3/2011 | Ishizu et al. |
| 2011/0086611 A1 | 4/2011 | Klein et al. |
| 2011/0090885 A1 | 4/2011 | Safavi |
| 2011/0142020 A1 | 6/2011 | Kang et al. |
| 2011/0142104 A1 | 6/2011 | Coldrey et al. |
| 2011/0199946 A1 | 8/2011 | Breit et al. |
| 2011/0310987 A1 | 12/2011 | Lee et al. |
| 2012/0014477 A1 | 1/2012 | Ko et al. |
| 2012/0046039 A1 | 2/2012 | Hagerman et al. |
| 2012/0051257 A1 | 3/2012 | Kim et al. |
| 2012/0076028 A1 | 3/2012 | Ko et al. |
| 2012/0076236 A1 | 3/2012 | Ko et al. |
| 2012/0087261 A1 | 4/2012 | Yoo et al. |
| 2012/0151305 A1 | 6/2012 | Zhang et al. |
| 2012/0236741 A1 | 9/2012 | Xu |
| 2012/0236840 A1 | 9/2012 | Kim et al. |
| 2012/0252470 A1 | 10/2012 | Wong et al. |
| 2012/0258657 A1 | 10/2012 | Schneiert |

(56) References Cited

U.S. PATENT DOCUMENTS

| | | | |
|---|---|---|---|
| 2012/0300717 A1* | 11/2012 | Cepeda Lopez | H04B 7/0691 370/329 |
| 2012/0314570 A1* | 12/2012 | Forenza | H04B 7/01 370/230 |
| 2012/0314649 A1* | 12/2012 | Forenza | H04B 7/024 370/328 |
| 2013/0033998 A1 | 2/2013 | Seo et al. | |
| 2013/0039168 A1 | 2/2013 | Forenza et al. | |
| 2013/0039332 A1 | 2/2013 | Nazar et al. | |
| 2013/0039387 A1 | 2/2013 | Qu | |
| 2013/0077514 A1 | 3/2013 | Dinan | |
| 2013/0077569 A1 | 3/2013 | Nam et al. | |
| 2013/0094548 A1 | 4/2013 | Park | |
| 2013/0128821 A1 | 5/2013 | Hooli et al. | |
| 2013/0188567 A1 | 7/2013 | Wang | |
| 2013/0195047 A1 | 8/2013 | Koivisto | |
| 2013/0195086 A1 | 8/2013 | Xu | |
| 2013/0195467 A1 | 8/2013 | Schmid | |
| 2013/0242890 A1 | 9/2013 | He et al. | |
| 2013/0315211 A1 | 11/2013 | Balan | |
| 2014/0038619 A1 | 2/2014 | Moulsley | |
| 2014/0086296 A1 | 3/2014 | Badic et al. | |
| 2014/0087680 A1 | 3/2014 | Luukkala et al. | |
| 2014/0112216 A1 | 4/2014 | Seo et al. | |
| 2014/0146756 A1 | 5/2014 | Sahin et al. | |
| 2014/0198744 A1 | 7/2014 | Wang et al. | |
| 2014/0219267 A1 | 8/2014 | Eyuboglu | |
| 2014/0241218 A1 | 8/2014 | Moshfeghi | |
| 2014/0295758 A1 | 10/2014 | Pedersen | |
| 2014/0348077 A1 | 11/2014 | Chen et al. | |
| 2014/0348090 A1 | 11/2014 | Nguyen et al. | |
| 2014/0348131 A1 | 11/2014 | Duan et al. | |
| 2015/0011197 A1 | 1/2015 | Tarraf et al. | |
| 2015/0016317 A1 | 1/2015 | Park et al. | |

FOREIGN PATENT DOCUMENTS

| | | |
|---|---|---|
| EP | 1359683 | 11/2003 |
| EP | 1775937 A2 | 4/2007 |
| EP | 2244390 | 10/2010 |
| JP | 2002-374224 | 12/2001 |
| JP | 2003179948 A | 6/2003 |
| JP | 2006-245871 | 9/2006 |
| JP | 2007-116686 | 5/2010 |
| JP | 2010-193189 | 9/2010 |
| WO | WO02054626 | 7/2002 |
| WO | WO-02/099995 A2 | 12/2002 |
| WO | WO03071569 A2 | 8/2003 |
| WO | WO-03094460 | 11/2003 |
| WO | WO-03107582 | 12/2003 |
| WO | WO03107582 | 12/2003 |
| WO | WO2006113872 A1 | 10/2006 |
| WO | WO2007/114654 | 10/2007 |
| WO | WO-2010/017482 | 2/2010 |

OTHER PUBLICATIONS

Office Action from U.S. Appl. No. 10/817,731, mailed Jan. 21, 2009, 23 pages.
Office Action from U.S. Appl. No. 11/894,394, mailed Oct. 28, 2008, 13 pages.
Office Action from U.S. Appl. No. 11/894,540, mailed Oct. 29, 2008, 13 pages.
Office Action from U.S. Appl. No. 11/894,362, mailed Oct. 29, 2008, 17 pgs.
Office Action from U.S. Appl. No. 11/256,478, mailed Sep. 19, 2008, 14 pgs.
Notice of Allowance from U.S. Appl. No. 11/894,394, mailed Jun. 26, 2009, 5 pgs.
Office Action from U.S. Appl. No. 10/817,731, mailed Sep. 11, 2009, 36 pgs.
Notice of Allowance from U.S. Appl. No. 11/894,362, mailed Sep. 3, 2009, 6 pages.
Notice of Allowance from U.S. Appl. No. 11/894,540, mailed Sep. 14, 2009, 6 pages.
Notice of Allowance from U.S. Appl. No. 11/256,478, mailed Jan. 26, 2010, 6 pgs.
Office Action from U.S. Appl. No. 10/817,731, mailed Mar. 15, 2010, 26 pages.
Notice of Allowance from U.S. Appl. No. 12/802,976, mailed Nov. 29, 2010, 6 pages.
Office Action from U.S. Appl. No. 12/630,627, mailed Mar. 16, 2011, 5 pages.
Notice of Allowance from U.S. Appl. No. 12/802,976, mailed Apr. 14, 2011, 6 pages.
Final Office Action from U.S. Appl. No. 12/630,627, mailed Oct. 20, 2011, 13 pages.
Final Office Action from U.S. Appl. No. 10/817,731, mailed Jul. 9, 2008, 20 pages.
Office Action from U.S. Appl. No. 10/817,731, mailed Jan. 4, 2008, 13 pages.
Office Action from U.S. Appl. No. 10/817,731, mailed May 18, 2007, 12 pages.
Notice of Allowance from U.S. Appl. No. 10/817,731, mailed Sep. 30, 2010, 6 pages.
Notice of Allowance from U.S. Appl. No. 12/143,503, mailed Aug. 18, 2011, 12 pages.
Office Action from U.S. Appl. No. 12/143,503, mailed Dec. 9, 2010, pages.
Office Action from U.S. Appl. No. 11/894,540, mailed Apr. 29, 2009, 5 pages.
Office Action from U.S. Appl. No. 12/637,643, mailed Sep. 23, 2011, 18 pages.
Final Office Action from U.S. Appl. No. 12/802,988, mailed Sep. 5, 2012, 10 pages.
Notice of Allowance from counterpart U.S. Appl. No. 12/802,938 mailed Sep. 19, 2012, 8 pages.
Final Office Action from U.S. Appl. No. 12/802,989, mailed Nov. 27, 2012, 12 pages.
Notice of Allowance from counterpart U.S. Appl. No. 12/802,938 mailed Dec. 6, 2012, 5 pages.
Office Action from U.S. Appl. No. 12/802,974, mailed Dec. 19, 2012, 7 pages.
Office Action from U.S. Appl. No. 12/802,975, mailed Dec. 19, 2012, 16 pages.
Notice of Allowance from counterpart U.S. Appl. No. 12/917,257, mailed Dec. 6, 2012, 8 pages.
Notice of Allowance from counterpart U.S. Appl. No. 12/917,257 mailed Feb. 15, 2013, 18 pages.
Office Action from U.S. Appl. No. 13/464,648, mailed Feb. 12, 2013, 12 pages.
Office Action from U.S. Appl. No. 12/802,988, mailed Apr. 12, 2013, 8 pages.
Notice of Allowance from U.S. Appl. No. 12/917,257 mailed May 31, 2013, 12 pages.
Notice of Allowance from U.S. Appl. No. 12/802,938 mailed May 24, 2013, 10 pages.
Final Office Action from U.S. Appl. No. 12/802,958, mailed Jun. 25, 2013, 48 pages.
Final Office Action from U.S. Appl. No. 13/464,648, mailed Aug. 1, 2013, 10 pages.
Office Action from U.S. Appl. No. 12/802,974, mailed Aug. 1, 2013, 35 pages.
Office Action from U.S. Appl. No. 12/802,975, mailed on Aug. 14, 2013, 26 pages.
Final Office Action from U.S. Appl. No. 12/802,988, mailed Aug. 2, 2013, 13 pages.
Office Action from U.S. Appl. No. 12/802,975, mailed Aug. 14, 2013, 26 pages.
Office Action from U.S. Appl. No. 12/802,989), mailed Nov. 26, 2013, 27 pages.
Office Action from U.S. Appl. No. 13/464,648, mailed Feb. 14, 2014, 11 pages.
Office Action from U.S. Appl. No. 13/461,682, mailed Feb. 25, 2014, 37 pages.

(56) References Cited

OTHER PUBLICATIONS

"AIRGO—Wireless Without Limits—Homepage", http://www.airgonetworks.com/, printed Apr. 9, 2004, 1 page.
ArrayComm, "Field-Proven Results", Improving wireless economics through MAS software, printed on Mar. 28, 2011, 3 pages, retrieved from the internet, www.arraycomm.com/serve.php?page=proof.
"Chapter 26—Electromagnetic-Wave Propagation", Reference Data for Radio Engineers, 5th Edition, Howard W. Sams & Co., Inc., (1973), 1-32 pages.
"High Frequency Active Auroroal Research Program—Homepage", http://www.haarp.alaska.edu/, printed Apr. 9, 2004, 1 page.
"IntelliCell: A Fully Adaptive Approach to Smart Antennas", ArrayComm, Incorporated, WP-ISA-031502-2.0, (2002), 1-18 pages.
"MIMO System uses SDMA for IEEE802.11n", Electronicstalk, http://www.electronicstalk.com/news/ime/ime149.html, (Jul. 14, 2004), 1-3 pages.
"VIVATO—Homepage", http://www.vivato.net/, printed Apr. 9, 2004, 1 page.
3GPP TR 25.876 V7.0.0 (Mar. 2007), Technical Report, 3rd Generation Partnership Project; Technical Specification Group Radio Access Network; Multiple Input Multiple Output in UTRA; (Release 7), pp. 2-76.
3GPP TS 36.211 V8.7.0 (May 2009), Technical Specification, 3rd Generation Partnership Project; Technical Specification Group Radio Access Network; Evolved Universal Terrestrial Radio Access (E-UTRA); Physical Channels and Modulation (Release 8), pp. 1-83.
3GPP, ETSI 136 212 V9.1.0 (2010-, Technical Specification, LTE; Evolved Universal Terrestrial Radio Access (E-UTRA); Multiplexing and Channel Coding (3GPP TS 36.212 VERION 9.1.0 Release 9) pp. 63.
3GPP, TS 36.212.V8.7.0 (May 2009), Technical Specification, 3rd Generation Partnership Project; Technical Specification Group Radio Access Network; Evolved Universal Terrestrial Radio Access (E-UTRA); "Multiplexing and channel Coding" (Release 8), pp. 60.
Abbasi, N, et al., "Capacity estimation of HF-MIMO systems", International Conference on Ionospheric Systems and Techniques, Apr. 2009, pp. 5.
Arraycomm, Improving Wireless Economics Through MAS Software, printed on Mar. 8, 2011, pp. 1-3, http://www.arraycomm.com/serve.php?page+proof.
Benedetto, M.D., et al., "Analysis of the effect of the I/Q baseband filter mismatch in an OFDM modem", Wireless personal communications, (2000), 175-186 pages.
Bengtsson, M, "A Pragmatic Approach to Multi-User Spatial Multiplexing", IEEE 2002, pp. 130-134.
Besson, O., et al., "On parameter estimation of MIMO flat-fading channels with frequency offsets", Signal Processing, IEEE Transactions on [see also Acoustics, Speech, and Signal Processing, IEEE Transactions on], vol. 51, No. 3, (Mar. 2003), 602-613 pages.
Caire, et al., "On Achivalbe Rates in a Multi-Antenna Broadcast Downlink", IEEE Trans. Info. Th., vol. 49, pp. 1691-1706, Jul. 2003.
Catreux, Severine, et al., "Adaptive modulation and MIMO coding for broadband wireless data networks", IEEE Comm. Mag., vol. 2, (Jun. 2002), 108-115 pages.
Chen, Runhua, et al., "Multiuser Space-Time Block Coded MIMO System with Downlink Precoding", IEEE Communications Society, 2004, pp. 2689-2693.
Chen, Runhua , et al., "Transmit selection diversity for unitary precoded multiuser spatial multiplexing systems with linear receivers", accepted to IEEE Trans. on Signal Processing, (Aug. 2005), 1-30 pages.
Choi, L.U., et al., "A transmit preprocessing technique for multiuser MIMO systems using a decomposition approach", IEEE Trans. Wireless Comm., vol. 3, (Jan. 2004), 20-24 pages.
Choi, Wan, et al., "Opportunistic space division multiple access with beam selection", to appear in IEEE Trans. on Communications, (May 19, 2006), 1-23 pages.
Chu, D, et al., "Polyphase codes with good periodic correlation properties (corresp.)", IEEE Trans. Inform. Theory, vol. 18, No. 4, (Jul. 1972), 531-532.
Costa, "Writing on Dirty Paper", IEEE Transactions on Information Theory, vol. IT-29, No. 3, May 1983, pp. 439-441.
Coulson, J, et al., "Maximum likelihood synchronization for OFDM using a pilot symbol: analysis", IEEE J. Select. Areas Commun., vol. 19, No. 12, (Dec. 2001), 2495-2503 pages.
Dai, X, et al., "Carrier frequency offset estimation for OFDM/SDMA systems using consecutive pilots", IEEE Proceedings—Communications, vol. 152, (Oct. 2005), 624-632 pages.
Daniel, J , "Introduction to public safety: RF Signal Distribution Using Fiber Optics", 2009, pp. 13, http://www.rfsolutions.com/fiber.pdf.
Devasirvatham, et al., "Time Delay Spread Measurements At 850 MHz and 1 7 GHz Inside a Metropolitan Office Building", Electronics Letters, Feb. 2, 1989, vol. 25, No. 3, pp. 194-196.
Devasirvatham, et al., Radio Propagation Measurements at 850MHz. 1.7GHz and 4GHz Inside Two Dissimilar Office Buildings, Electronics Letter Mar. 29, 1990 vol. 26 No. 7, pp. 445-447.
Devasirvatham, et al., "Time Delay Spread and Signal Level Measurements of 850 MHz Radio Waves in Building Environments", IEEE Transactions on Antennas and Propagation, vol. AP-34, No. 11, Nov. 1986, 194-196 pages.
Dietrich, Carl B., et al., "Spatial, polarization, and pattern diversity for wireless handheld terminals", Proc. IEEE Antennas and Prop. Symp., vol. 49, (Sep. 2001), 1271-1281.
Ding, P , et al., "On the Sum Rate of Channel Subspace Feedback for Multi-Antenna Broadcast Channels," in Proc., IEEE Globecom, vol. 5, pp. 2699-2703, Nov. 2005.
Dohler, Mischa, et al., "A Step Towards MIMO: Virtual Antenna Arrays", European Cooperation in the Field of Scientific and Technical Research, (Jan. 15-17, 2003), 9 pages.
Dong, Liang, et al., "Multiple-input multiple-output wireless communication systems using antenna pattern diversity", Proc. IEEE Glob. Telecom. Conf., vol. 1, (Nov. 2002), 997-1001 pages.
Fakhereddin, M.J., et al., "Combined effect of polarization diversity and mutual coupling on MIMO capacity", Proc. IEEE Antennas and Prop. Symp., vol. 2, (Jun. 2003), 495-498 pages.
Fella, Adlane, "Adaptive WiMAX Antennas: The promise of higher ROI", http://www.wimax.com/commentary/spotlight/spotlight8-08-2005/?searchterm=AdlaneFella, printed May 9, 2008, 1-3 pages.
Fletcher, P.N. , et al., "Mutual coupling in multi-element array antennas and its influence on MIMO channel capacity", IEEE Electronics Letters, vol. 39, (Feb. 2003), 342-344 pages.
Forenza, Antonio, et al., "Adaptive MIMO transmission for exploiting the capacity of spatially correlated channels", IEEE Trans. on Veh. Tech., vol. 56, n.2, (Mar. 2007), 619-630 pages.
Forenza, Antonio , et al., "Benefit of Pattern Diversity Via 2-element Array of Circular Patch Antennas in Indoor Clustered MIMO Channels", IEEE Trans. on Communications, vol. 54, No. 5, (May 2006), 943-954 pages.
Forenza, Antonio , et al., "Impact of antenna geometry on MIMO communication in indoor clustered channels", Proc. IEEE Antennas and Prop. Symp., vol. 2, (Jun. 2004), 1700-1703 pages.
Foschini, G.J. , et al., "Simplified processing for high spectral efficiency wireless communication employing multi-element arrays", IEEE Jour. Select. Areas in Comm., vol. 17, No. 11, (Nov. 1999), 1841-1852 pages.
Fusco, T , et al., "Blind Frequency-offset Estimation for OFDM/OQAM Systems", IEEE Transactions on [see also Acoustics, Speech, and Signal Processing, IEEE Transactions on] vol. 55, (2007), 1828-1838 pages.
Garcia, C.R , et al., "Channel Model for Train to Train Communication Using the 400 MHz Band", in Proc. of IEEE Vehicular Technology Conference, pp. 3082-3086, May 2008.
Gesbert, David , et al., "From Theory to Practice: An Overview of MIMO Space—Time Coded Wireless Systems", IEEE Journal on Selected Areas in Communications, vol. 21, No. 3, Apr. 2003., 281-302 pages.

(56) References Cited

OTHER PUBLICATIONS

Gesbert, D., et al., "Multi-Cell MIMO Cooperative Networks: A New Look at Interference" IEEE Journal on Selected Areas in Communications, vol. 28, No. 9, Dec. 1, 2010, 30 pages.
Gesbert, David , et al., "Outdoor MIMO Wireless Channels: Models and Performance Prediction", IEEE Transactions on Communications, vol. 50, No. 12, (Dec. 2002), 1926-1934.
Ghogho, M , et al., "Training design for multipath channel and frequency offset estimation in MIMO systems", Signal Processing, IEEE Transactions on [see also Acoustics, Speech, and Signal Processing, IEEE Transactions on], vol. 54, No. 10, (Oct. 2006), 3957-3965 pages.
Gunashekar, G, et al., "Investigations into the Feasibility of MIMO Techniques within the HF Band: Preliminary Results", Radio Science (Special Issue), 2009, (In Press) 33 pages.
Haring, L., "Residual carrier and sampling frequency synchronization in multiuser OFDM systems", VTC—Spring. IEEE 63rd Vehicular Technology Conference, vol. 4, (2006), 1937-1941 pages.
Heath, Robert W., et al., "Antenna selection for spatial multiplexing systems with linear receivers", IEEE Trans. Comm., vol. 5, (Apr. 2001), 142-144 pages.
Heath, Robert W., et al., "Switching between diversity and multiplexing in MIMO systems", IEEE Trans. Comm., vol. 53, No. 6, (Jun. 2005), 962-968 pages.
Hewlett Packard, "GPS and Precision Timing Applications", Application Note 1272, pp. 1-28.
Jindal, N, "MIMO Broadcast Channels With Finite-Rate Feedback," IEEE Trans. on Info. Theory, vol. 52, pp. 5045-5060, Nov. 2006.
Jose, Jubin, et al., "Channel Estimation and Linear Precoding in Multiuser Multiple-Antenna TDD Systems", IEEE Transactions on Vehicular Technology. Jun. 2011 vol. 60 No. 5, pp. 2102-2116.
Jungnickel, V., et al., "Capacity of MIMO systems with closely spaced antennas", IEEE Comm. Lett., vol. 7, (Aug. 2003), 361-363 pages.
Kannan, T.P., et al., "Separation of cochannel signals under imperfect timing and carrier synchronization", IEEE Trans. Veh. Technol., vol. 50, No. 1, (Jan. 2001), 79-96 pages.
Lang, S, et al., "Design and development of a 5.25 GHz software defined wireless OFDM communication platform", IEEE Communications Magazine, vol. 42, No. 6, (Jun. 2004), 6-12 pages.
Lee, K , et al., "Frequency-offset estimation for MIMO and OFDM systems using orthogonal training sequences", IEEE Trans. Veh. Technol., vol. 56, No. 1, (Jan. 2007), 146-156 pages.
Liu, G. , et al., "Time and frequency offset estimation for distributed multiple-input multiple-output orthogonal frequency division multiplexing systems", Institute of Engineering and Technology Communications, vol. 4, Issue 6, 2010, pp. 708-715.
Luise, M , et al., "Carrier frequency acquisition and tracking for OFDM systems", IEEE Trans. Commun., vol. 44, No. 11, (Nov. 1996), 1590-1598 pages.
Luise, M , et al., "Low-complexity blind carrier frequency recovery for OFDM signals over frequency-selective radio channels", IEEE Trans. Commun., vol. 50, No. 7, (Jul. 2002), 1182-1188 pages.
Mattheijssen, Paul , "Antenna-pattern diversity versus space diversity for use at handhelds", IEEE Trans. on Veh. Technol., vol. 53, (Jul. 2004), 1035-1042 pages.
Mazrouei-Sebdani, Mahmood , et al., "Vector Perturbation Precoding and User Scheduling for Network MIMO", IEEE WCNC 2011, pp. 203-208. ISBN 978-1-61284-254-7.
McKay, Matthew R., et al., "A throughput-based adaptive MIMO ¬BICM approach for spatially correlated channels", to appear in Proc. IEEE ICC, (Jun. 2006), 1-5 pages.
McKay, Matthew R., et al., "Multiplexing/beamforming switching for coded MIMO in spatially correlated Rayleigh channels", IEEE Transactions on Vehicular Technology, vol. 56, No. 5, (Sep. 2007), pp. 2555-2567.
McLean, James S., et al., "A re-examination of the fundamental limits on the radiation Q of electrically small antennas", IEEE Trans. Antennas Propagat., vol. 44, n.5, (May 1996), 672-676 pages.

Minn, et al., "A robust timing and frequency synchronization for OFDM systems", IEEE Trans. Wireless Commun., vol. 2, No. 4, (Jul. 2003), 822-839 pages.
Montgomery, B.G , et al., "Analog RF-over-fiber technology", Syntonics LLC, Jan. 2008, pp. 2-51, http://chesapeakebayaoc.org/documents/Syntonics_AOC_RF_over-Fiber_19_Jan_08.pdf.
Moose, Paul H., et al., "A technique for orthogonal frequency division multiplexing frequency offset correction", IEEE Trans. Commun., vol. 42, No. 10, (Oct. 1994), 2908-2914.
Morelli, M, et al., "An improved frequency offset estimator for OFDM applications", IEEE Commun. Lett., vol. 3, No. 3, (Mar. 1999), 75-77.
Morelli, M, et al., "Frequency ambiguity resolution in OFDM systems", IEEE Commun. Lett., vol. 4, No. 4, (Apr. 2000), 134-136.
Morris, Matthew L., et al., "Network model for MIMO systems with coupled antennas and noisy amplifiers", IEEE Trans. Antennas Propagat., vol. 53,, (Jan. 2005), 545-552.
Oberli, C , et al., "Maximum likelihood tracking algorithms for MIMOOFDM, " in Communications, IEEE International Conference on, vol. 4, Jun. 20-24, 2004, 2468-2472.
Oda, Y , et al., "Measured Path Loss and Multipath Propagation Characteristics in UHF and Microwave Frequency Bands for Urban Mobile Communications", IEEE, VIC 2001, pp. 337-341.
Pohl, V., et al., "Antenna spacing in MIMO indoor channels", Proc. IEEE Veh. Technol. Conf., vol. 2,, (May 2002), 749-753.
Proakis, J, "Digital Communications", Fourth Edition, Department of Electrical and Computer Engineering, Northeastern University, ISBN 0-07-232111-3, Cover page, Title page, Table of Contents, 2001, 9 pages.
"Propagation", printed Oct. 21, 2005, http://home.planet.nl/~alphe078/propagat1.htm, 2 pages.
Rao, R, et al., "I/Q mismatch cancellation for MIMO-OFDM systems", In Personal, Indoor and Mobile Radio Communications, PIMRC 2004. 15th IEEE International Symposium on, vol. 4, (2004), 2710-2714 pages.
Rao, R.M., et al., "Multi-antenna testbeds for research and education in wireless communications", IEEE Communications Magazine, vol. 42, No. 12, (Dec. 2004), 72-81 pages.
Rappaport, T, Wireless Communications, Principles and Practice, Second Edition, Prentice Hall, 2002, ISBN 0-13-042232-0, Cover page, Title page, Table of Contents, 13 pages.
Schmidl, T.M, et al., "Robust frequency and timing synchronization for OFDM", IEEE Trans. Commun., vol. 45, No. 12, (Dec. 1997), 1613-1621 pages.
Schuchert, S, et al., "A novel I/Q imbalance compensation scheme for the reception of OFDM signals", IEEE Transaction on Consumer Electronics, (Aug. 2001), 313-318 pages.
Serpedin, E, et al., "Blind channel and carrier frequency offset estimation using periodic modulation precoders", Signal Processing, IEEE Transactions on [see also Acoustics, Speech, and Signal Processing, IEEE Transactions on], vol. 48, No. 8, (Aug. 2000), 2389-2405 pages.
Sharif, M , et al., "On the capacity of MIMO broadcast channel with partial side information", IEEE Trans. Info. Th., vol. 51, (Feb. 2005), 506-522 pages.
Shen, Zukang , et al., "Low complexity user selection algorithms for multiuser MIMO systems with block diagonalization", accepted for publication in IEEE Trans. Sig. Proc, (Sep. 2005), 1-12 pages.
Shen, Zukang , et al., "Sum capacity of multiuser MIMO broadcast channels with block diagonalization", submitted to IEEE Trans. Wireless Comm.,, (Oct. 2005), 1-12 pages.
Shi, K , et al., "Coarse frame and carrier synchronization of OFDM systems: a new metric and comparison", IEEE Trans. Wireless Commun., vol. 3, No. 4, (Jul. 2004), 1271-1284 pages.
Shiu, Da-Shan , et al., "Fading correlation and its effect on the capacity of multielement antenna systems", IEEE Trans. Comm., vol. 48, No. 3, (Mar. 2000), 502-513 pages.
Spencer, Quentin H., et al., "Adaptive Antennas and MIMO Systems for Wireless Communications—An Introduction to the Multi-User MIMI Downlink", IEEE Communications Magazine, (Oct. 2004), 60-67 pages.

(56) References Cited

OTHER PUBLICATIONS

Spencer, Quentin H., et al., "Zero-forcing methods for downlink spatial multiplexing in multiuser MIMO channels", IEEE Trans. Sig. Proc., vol. 52, (Feb. 2004), 461-471 pages.
Stoytchev, M., et al., "Compact antenna arrays for MIMO applications", Proc. IEEE Antennas and Prop. Symp., vol. 3, (Jul. 2001), 708-711 pages.
Strangeways, H , "Determination of the Correlation Distance for Spaced Antennas on Multipath HF Links and Implications for Design of SIMO and MIMO Systems", School of Electronic and Electrical Engineering, University of Leeds, IEEE First European Conf. on Antennas and Prop, 12 pages.
Strangways, H. J., "Investigation of signal correlation for spaced and co-located antennas on multipath hf links and implications for the design of SIMO and MIMO systems", IEEE First European Conf. on Antennas and Propagation (EuCAP 2006), vol. , n. 6-10, pp. 1-6, Nov. 2006.
Strohmer, T, et al., "Application of Time-Reversal with MMSE Equalizer to UWB Communications", Proc. of IEEE Globecom, vol. 5, pp. 3123-3127, Nov. 2004.
Syntonics, "FORAX RF-over-fiber Communications Systems", pp. 1-3, printed on Mar. 8, 2011, http://www.syntonicscorp.com/products/products-foraxRF.html.
Tang, T , et al., "Joint frequency offset estimation and interference cancellation for MIMO-OFDM systems [mobile radio]", VTC2004-Fall. 2004 IEEE 60th Vehicular Technology Conference, vol. 3, Sep. 26-29, 2004, 1553-1557 pages.
Tarighat, Alireza, et al., "Compensation schemes and performance analysis of IQ imbalances in OFDM receivers", Signal Processing, IEEE Transactions on [see also Acoustics, Speech, and Signal Processing, IEEE Transactions on], vol. 53, (Aug. 2005), 3257-3268 pages.
Tarighat, et al., "MIMO OFDM receivers for systems with IQ imbalances", , IEEE Trans. Sig. Proc., vol. 53, for orthogonal space-time block codes (OSTBC), (Sep. 2005), 3583-3596 pages.
Tarokh, Vahid, et al., "Space-time block codes from orthogonal designs", IEEE Trans. Info. Th., vol. 45, (Jul. 1999), 1456-467 pages.
Tureli, U , et al., "OFDM blind carrier offset estimation: ESPRIT", IEEE Trans. Commun., vol. 48, No. 9, (Sep. 2000), 1459-1461 pages.
Valkama, M, et al., "Advanced methods for I/Q imbalance compensation in communication receivers", IEEE Trans. Sig. Proc., (Oct. 2001).
Van De Beek, Jan-Jaap , et al., "ML estimation of time and frequency offset in OFDM systems", Signal Processing, IEEE Transactions on [see also Acoustics, Speech, and Signal Processing, IEEE Transactions on] vol. 45, No. 7, (Jul. 1997), 1800-1805 pages.
Vaughan, Rodney , et al., "Switched parasitic elements for antenna diversity", IEEE Trans. Antennas Propagat., vol. 47, (Feb. 1999), 399-405 pages.
Vishwanath, S, "Duality, Achievable Rates, and Sum-Rate Capacity of Gaussian MIMO Broadcast Channels," IEEE Trans. Info. Th., vol. 49, No. 10, pp. 2658-2668, Oct. 2003.
Viswanath, et al., "Sum Capacity of the Vector Gaussian Broadcast Channel and Uplink-Downlink Duality", IEEE Transactions on Information Theory, vol. 49, No. 8, Aug. 2003, pp. 1912-1921.
Waldschmidt, Christian, et al., "Complete RF system model for analysis of compact MIMO arrays,", IEEE Trans. on Vehicular Technologies, vol. 53, (May 2004), 579-586 pages.
Wallace, Jon W., et al., "Termination-dependent diversity performance of coupled antennas: Network theory analysis,", IEEE Trans. Antennas Propagat., vol. 52, (Jan. 2004), 98-105 pages.
Warrington, E.M, et al. "Measurement and Modeling of HF Channel Directional Spread Characteristics for Northerly Paths", Radio Science, vol. 41, RS2006, DOI:10.1029/2005RS003294, 2006, pp. 1-13.
Wheeler, Harold A., et al., "Small antennas", IEEE Trans. Antennas Propagat., vol. AP-23, n.4, (Jul. 1975), 462-469 pages.
Wikipedia, "Mobile ad hoc network", printed on Mar. 8, 2011, pp. 1-3, http://en.wikipedia.org/wiki/Mobile_ad_hoc_network.
Wikipedia, "List of ad hoc routing protocols", printed on Mar. 8, 2011, http://en.wikipedia.org/wiki/List.sub.--of.sub.--ad.sub.--hoc. sub.--routi- ng.sub.--protocols, 1 page.
Wong, et al., "Performance Enhancement of Multiuser MIMO Wireless Communication Systems", IEEE Transactions on Communications, vol. 50, No. 12, Dec. 2002, pp. 1960-1970.
Wong, Kai-Kit , et al., "A joint-channel diagonalization for multiuser MIMO antenna systems", IEEE Trans. Wireless Comm., vol. 2, (Jul. 2003), 773-786 pages.
Yoo, et al., "Multi-Antenna Downlink Channels with Limited Feedback and User Selection", IEEE Journal on Selected Areas in Communications, vol. 25, No. 7, Sep. 2007, pp. 1478-1491.
Yu, et al., "Sum Capacity of Gaussian Vector Broadcast Channels", IEEE Transactions on Information Theory, vol. 50, No. 9, Sep. 2004, pp. 1875-1892.
Zhang, et al., "Coordinated Multi-Cell MIMO Systems With Cellular Block Diagonalization", IEEE 2007, pp. 1669-1673.
Zhang, et al., "Networked MIMO with Clustered Linear Precoding", IEEE Transactions on Wireless Communications, vol. 8, No. 4, Apr. 2009, pp. 1910-1921.
Zheng, Lizhong, et al., "Diversity and multiplexing: a fundamental tradeoff in multiple antenna channels", IEEE Trans. Info. Th., vol. 49, No. 5, (May 2003), 1073-1096 pages.
Zhuang, X, et al., "Channel models for link and system level simulations", IEEE 802.16 Broadband Wireless Access Working Group, (Sep. 2004), 15 pages.
Zogg, et al., "Multipath Delay Spread in a Hilly Region at 210 MHz", IEEE Transactions on Vehicular Technology, vol. VT-36, No. 4, Nov. 1987, pp. 184-187.
Office Action from U.S. Appl. No. 12/802,989 mailed Nov. 26, 2013, 27 pages.
Office Action from U.S. Appl. No. 12/802,958, mailed Jun. 23, 2014, 24 pages.
Office Action from U.S. Appl. No. 14/023,302 mailed Jul. 17, 2014, 37 pages.
Office Action from U.S. Appl. No. 12/802,988, mailed Mar. 24, 2014, 11 pages.
Final Office Action from U.S. Appl. No. 12/802,974, mailed Aug. 1, 2014, 23 pages.
Final Office Action from U.S. Appl. No. 12/802,975, mailed Aug. 4, 2014, 40 pages.
Office Action from U.S. Appl. No. 14/156,254, mailed Sep. 11, 2014, 44 pages.
Notice of Allowance from U.S. Appl. No. 13/633,702, mailed Jan. 6, 2015, 12 pages.
Office Action from U.S. Appl. No. 12/802,989, mailed Nov. 25, 2014, 17 pages.
"Quantum Cryptography." Wikipedia: The Free Encyclopedia. Wikimedia Foundation, Inc. Jul. 26, 2014. Web. Nov. 14, 2014. <http://en.wikipedia.org/wiki/Quantum_cryptography>.
Brassard, Gilles, et al., "A Quantum Bit Commitment Scheme Provably Unbreakable by both Parties". IEEE, FOCS 1993, pp. 362-371.
Mayers, Dominic, "Unconditionally Secure Quantum Bit Commitment is Impossible". *Physical Review Letters* (APS) 78 (17), 1997.
Damgard, Ivan, et al., "Cryptography in the Bounded Quantum-Storage Model". IEEE, FOCS 2005, pp. 24-27.
Koenig, Robert, et al., "Unconditional security from noisy quantum storage". IEEE Transactions on Information Theory, vol. 58, No. 3, Mar. 2012, pp. 1962-1984.
Cachin, Christian, et al. "Oblivious Transfer with a Memory-Bounded Receiver". FOCS 1998. IEEE. pp. 493-502.
Dziembowski, Stefan, et al. "On Generating the Initial Key in the Bounded-Storage Model". Eurocrypt 2004. LNCS 3027. Springer. pp. 126-137.
Chandran, Nishanth, et al., "Position-Based Cryptography", Department of Computer Science, UCLA, 2009, 50 pages.
Kent, Adrian, et al, "Quantum Tagging: Authenticating Location via Quantum Information and Relativistic Signalling Constraints". 2010, 9 pages. Phys. Rev. A84, 012326 (2011), DOI: 10.1103/PhysRevA.84.012326, arXiv:1008.2147.

(56) References Cited

OTHER PUBLICATIONS

Lau, Hoi-Kwan, et al., "Insecurity of position-based quantum-cryptography protocols against entanglement attacks". Physical Review A (APS), 2010, 83: 012322, 13 pages.
Malaney, Robert, A., et al., "Location-dependent communications using quantum entanglement". Physical Review A, 2010, 81: 042319, 11 pages.
Buhrman, Harry, et al., "Position-Based Quantum Cryptography: Impossibility and Constructions". 2010, 27 pages.
"Post-quantum cryptography". Web. Retrieved Aug. 29, 2010. <http://pqcrypto.org/>.
Bernstein, Daniel J., et al., "Post-quantum cryptography" Springer, 2009, 248 pages ISBN 978-3-540-88701-0.
Watrous, John, "Zero-Knowledge against Quantum Attacks". *SIAM J. Comput.* 39 (1): 25-58. (2009).
3GPP, "Spatial Channel Model AHG (Combined ad-hoc from 3GPP & 3GPP2)", SCM Text V6.0, Apr. 22, 2003, pp. 1-45.
3GPP TR 25.912, "Feasibility Study for Evolved UTRA and UTRAN", V9.0.0 (Oct. 2009).
3GPP TR 25.913, "Requirements for Evolved UTRA (E-UTRA) and Evolved UTRAN (E-UTRAN)", V8.0.0 (Jan. 2009).
W. C. Jakes, Microwave Mobile Communications, IEEE Press, 1974.
J. G. Proakis, Communication System Engineering, Prentice Hall, 1994.
M. R. Andrews, P. P. Mitra, and R. deCarvalho, "Tripling the capacity of wireless communications using electromagnetic polarization," Nature, vol. 409, pp. 316-318, Jan. 2001.
Wi-Fi alliance, homepage, pp. 1-3, printed on Nov. 17, 2014, www.wi-fi.org/.
Wi-Fi alliance, "Wi-Fi certified makes it Wi-Fi" 1 page, http://www.wi-fi.org/files/WFA_Certification_Overview_WP_en.pdf.
3GPP, "UMTS, Universal Mobile Telecommunications System," pp. 1-2, printed on Nov. 17, 2014, www.3gpp.org/article/umts.
Motorola, "Long Term Evolution (LTE): A Technical Overview", http://business.motorola.com/experiencelte/pdf/LTETechnicalOverview.pdf.
Blelloch, "Introduction to Data Compression", Carnegie Mellon University Tech. Report Sep. 2010, pp. 1-55.
Kermoal, et al., "A Stochastic MIMO Radio Channel Model With Experimental Validation," IEEE Journal on Selected Areas in Communications, vol. 20., No. 6, Aug. 2002, pp. 1211-1226.
Extended Search Report from foreign counterpart European Patent Application No. 06718208.8, mailed Jan. 22, 2015, 6 pages.
Decision of Refusal from foreign counterpart Korean Patent Application No. 2010-7006265), mailed Apr. 23, 2015, 6 pages.
First Office Action and Search Report from foreign counterpart Chinese Patent Application No. 201210466082X, mailed Apr. 3, 2015, 14 pages.
Examiner's Report from foreign counterpart Canadian Patent Application No. 2695799, mailed Apr. 1, 2015, 4 pages.
Final Office Action from U.S. Appl. No. 12/802,958), mailed Apr. 15, 2015, 24 pages.
Office Action from U.S. Appl. No. 13/642,259 mailed May 14, 2015, 9 pages.
Office Action from U.S. Appl. No. 13/475,598, mailed Mar. 23, 2015, 14 pages.
Notice of Allowance from U.S. Appl. No. 14/156,254, mailed Mar. 12, 2015, 5 pages.
Office Action from U.S. Appl. No. 14/086,700, mailed Apr. 2, 2015, 12 pages.
Office Action from foreign counterpart Mexico Patent Application No. MX/a/2014/002900, mailed May 25, 2015, 3 pages.
Office Action from U.S. Appl. No. 13/797,984, mailed Jan. 29, 2015, 15 pages.
Office Action from foreign counterpart Japanese Patent Application No. 2013-156855, mailed Apr. 17, 2015, 6 pages.
Office Action from foreign counterpart Korean Patent Application No. 2015-7002560, mailed May 21, 2015, 15 pages.
Office Action from foreign counterpart China Patent Application No. 201180061132.X, mailed May 27, 2015, 6 pages.
Office Action from U.S. Appl. No. 13/233,006, mailed Jun. 4, 2015, 12 pages.
Office Action from U.S. Appl. No. 13/798,004, mailed Jun. 17, 2015, 13 pages.
Office Action from U.S. Appl. No. 14/187,759, mailed Jun. 23, 2015, 16 pages.
Office Action from U.S. Appl. No. 13/232,996, mailed Jun. 24, 2015, 15 pages.
Office Action from U.S. Appl. No. 12/802,988, mailed Jun. 26, 2015, 17 pages.
Office Action from foreign counterpart Japanese Patent Application No. 2014-140413, mailed Jun. 27, 2015, 3 pages.
Office Action from U.S. Appl. No. 12/802,974, mailed Apr. 24, 2015, 27 pages.
Office Action from U.S. Appl. No. 12/802,975, mailed May 7, 2015, 25 pages.
Office Action from foreign counterpart China Patent Application No. 201210464974.6, mailed Jul. 1, 2015, 3 pages.
Office Action from U.S. Appl. No. 13/797,950, mailed May 11, 2015, 61 pages.
Office Action from U.S. Appl. No. 14/023,302, mailed Jun. 11, 2015, 8 pages.
First Examination Report from foreign counterpart New Zealand Patent Application No. 622137, mailed Aug. 28, 2014, 2 pages.
Office Action from U.S. Appl. No. 13/797,971, mailed May 11, 2015, 52 pages.
Notice of Allowance from U.S. Appl. No. 14/156,254, mailed Jul. 8, 2015, 7 pages.
First Office Action from foreign counterpart Russian Patent Application No. 2011131821, mailed Jun. 26, 2015, 8 pages.
First Office Action from foreign counterpart Russian Patent Application No. 2011131821, mailed Jun. 24, 2015, 8 pages.
Office Action from U.S. Appl. No. 13/844,355 mailed Aug. 12, 2015, 20 pages.
Notice of Acceptance from foreign counterpart New Zealand Patent Application No. 610463, mailed Aug. 4, 2015, 1 page.
Examiner's Report from foreign counterpart Canadian Patent Application No. 2,659,572, mailed Jul. 29, 2015, 3 pages.
Office Action from U.S. Appl. No. 12/802,958, mailed Aug. 13, 2015, 22 pages.
Notice of Allowance from U.S. Appl. No. 13/464,648 mailed Aug. 14, 2015, 21 pages.
Notice of Allowance from foreign counterpart Canadian Patent Application No. P14906, mailed Jun. 1, 2015, 1 page.
Examiner's Report from foreign counterpart Canadian Patent Application No. 2657309, mailed Apr. 16, 2015, 3 pages.
Office Action from U.S. Appl. No. 13/797,984, mailed Aug. 20, 2015, 15 pages.
Office Action from U.S. Appl. No. 12/802,989, mailed Aug. 25, 2015, 24 pages.
Office Action from U.S. Appl. No. 14/611,565, mailed Aug. 31, 2015, 21 pages.
Office Action from U.S. Appl. No. 14/086,700, mailed Sep. 2, 2015, 9 pages.
Transmittal of International Preliminary Report on Patentability from foreign counterpart PCT/US2013/061493 Mailed Apr. 16, 2015, 8 pages.
Transmittal of International Search Report and the Written Opinion of the International Searching Authority, or the Declaration from foreign counterpart PCT/US15/14511 mailed May 18, 2015, 7 pages.
European Supplementary Search Report from European Patent Application No. 06718208.9 mailed Jan. 22, 2015, 6 pages.
A. Paulraj, R. Nabar, and D. Gore, Introduction to Space-Time Wireless Communications, Cambridge University Press, 40 West 20th Street, New York, NY, USA, 2003, 33 pages.
D. Gesbert, M. Shafi, D. Shiu, P.J. Smith and A. Naguib, "From theory to practice: an overview of MIMO space-time coded wireless systems", IEEE Journal on Selected Areas on Communications, vol. 2, n.3, pp. 281-302, Apr. 2003.

(56) References Cited

OTHER PUBLICATIONS

L. Zheng and D. N. C. Tse, "Diversity and multiplexing: a fundamental tradeoff in multiple-antenna channels," *IEEE Trans. Info. Th.*, vol. 49, No. 5, pp. 1073-1096, May 2003.
D. N. C. Tse, P. Viswanath, and L. Zheng, "Diversity-multiplexing tradeoff in multiple-access channels", *IEEE Trans. Info. Th.*, vol. 50, No. 9, pp. 1859-1874, Sep. 2004.
E. Visotsky and U. Madhow, "Space-time transmit precoding with im-perfect feedback," IEEE Trans. Info. Th., vol. 47, pp. 2632-2639, Sep. 2001.
S. A. Jafar, S. Vishwanath, and A. Goldsmith, "Channel capacity and beamforming for multiple transmit and receive antennas with covariance feedback," Proc. IEEE Int. Conf. on Comm., vol. 7, pp. 2266-2270, Jun. 2001.
S. A. Jafar and A. Goldsmith, "Transmitter optimization and optimality of beamforming for multiple antenna systems," IEEE Trans. Wireless Comm., 1165-1175.
E. A. Jorswieck and H. Boche, "Channel capacity and capacity-range of beamforming in MIMO wireless systems under correlated fading with covariance feedback," IEEE Trans. Wireless Comm., vol. 3, pp. 1543-1553, Sep. 2004.
A. L. Moustakas and S. H. Simon, "Optimizing multiple-input single-output (MISO) communication systems with general Gaussian channels: nontrivial covariance and nonzero mean," IEEE Trans. Info. Th., vol. 49, pp. 2770-2780, Oct. 2003.
M. Kang and M. S. Alouini, "Water-filling capacity and beamforming performance of MIMO systems with covariance feedback," IEEE Work. on Sign. Proc. Adv. in Wire. Comm., pp. 556-560, Jun. 2003.
S. H. Simon and A. L. Moustakas, "Optimizing MIMO antenna systems with channel covariance feedback," IEEE Jour. Select. Areas in Comm., vol. 21, pp. 406-417, Apr. 2003.
S. M. Alamouti, "A simple transmit diversity technique for wireless communications," IEEE Jour. Select. Areas in Comm., vol. 16, No. 8, pp. 1451-1458, Oct. 1998.
V. Tarokh, N. Seshadri, and A. R. Calderbank, "Space-time codes for high data rate wireless communication: Performance criterion and code construction," IEEE Trans. Info. Th., vol. 44, pp. 744-765, Mar. 1998.
V. Tarokh, H. Jafarkhani, and A. R. Calderbank, "Space-time block codes from orthogonal designs," IEEE Trans. Info. Th., vol. 45, pp. 1456-1467, Jul. 1999.
E. N. Onggosanusi, A. G. Dabak, and T. A. Schmidl, "High rate space-time block coded scheme: performance and improvement in correlated fading channels," Proc. IEEE Wireless Comm. and Net. Conf., vol. 1, pp. 194-199, Mar. 2002.
G. D. Durgin, Space-Time Wireless Channels, Prentice Hall, Upper Saddle River, NJ, USA, 2003.
A. Forenza and R. W. Heath Jr., "Impact of antenna geometry on MIMO communication in indoor clustered channels," Proc. IEEE Antennas and Prop. Symp., vol. 2, pp. 1700-1703, Jun. 2004.
R. W. Heath Jr. and A. Paulraj, "Switching between multiplexing and diversity based on constellation distance," Proc. of Allerton Conf. on 208, Comm. Control and Comp., Sep. 2000.
A. Forenza, A. Pandharipande, H. Kim, and R. W. Heath Jr., "Adaptive MIMO transmission scheme: Exploiting the spatial selectivity of wireless channels," Proc. IEEE Veh. Technol. Conf., vol. 5, pp. 3188-3192, May 2005.
FCC, "Broadband action agenda", National Broadband Plan, 2010 http://www.broadband.gov/plan/national-broadband-plan-action-agenda.pdf.
N. Delfas, F. Meunier, S. Flannery, T. Tsusaka, E. Gelblum and S. Kovler, "Mobile data wave: who dares to invest, wins", Morgan Stanley Research Global, pp. 1-62, Jun. 13, 2012.
D. Goldman, "Sorry, America: your wireless airwaves are full", CNN Money, 3 pages, http://money.cnn.com/2012/02/21/technology/spectrum_crunch/index.htm.

P. Rysavy, "No silver bullets for FCC, NTIA spectrum challange", Daily report for executives, Bloomberg BNA, Aug. 2012, pp. 1-4, http://www.rysavy.com/Articles/2012_09_No_Spectrum_Silver_Bullets.pdf.
T. W. Hazlett, "Radio spectrum for a hungry wireless world", Sep. 22, 2011, 41 pages.
B. J. Love, D. J. Love and J. V. Krogmeier, "Like deck chairs on the Titanic: why spectrum reallocation won't avert the coming data crunch but technology might keep the wireless industry afloat", Feb. 2012, 705-719 pages.
Qualcomm, "The 1000x data challenge, the latest on wireless, voice, services and chipset evolution", 4G World, Oct. 31st, 2012 61 pages submitted as Parts 1-3.
J. Lee, J.-K. Han, J. Zhang, "MIMO technologies in 3GPP LTE and LTE-advanced", EURASIP Journal on Wireless Comm. and Net., Hindawi, May 2009, pp. 1-10.
3GPP, TS 36.201, "Evolved Universal Terrestrial Radio Access (E-UTRA); LTE Physical Layer-General Description (Release 11)" pp. 1-14, Oct. 2012.
3GPP, TS 36.211, "Evolved Universal Terrestrial Radio Access (E-UTRA); Physical Channels and Modulation (Release 11" submitted as Part 1 and Part 2.
3GPP, TS 36.212, "Evolved Universal Terrestrial Radio Access (E-UTRA); Multiplexing and channel coding (Release 11)" submitted as Part 1 and Part 2.
3GPP, TS 36.213, "Evolved Universal Terrestrial Radio Access (E-UTRA); Physical layer procedures (Release 11)" pp. 1-145, Oct. 2012.
T. Yoo, N. Jindal, and A. Goldsmith, "Multi-antenna broadcast channels with limited feedback and user selection," IEEE Journal on Sel. Areas in Communications, vol. 25, pp. 1478-1491, Jul. 2007.
P. Ding, D. J. Love, and M. D. Zoltowski, "On the sum rate of channel subspace feedback for multi-antenna broadcast channels," in Proc., IEEE Globecom, vol. 5, pp. 2699-2703, Nov. 2005.
N. Jindal, "MIMO broadcast channels with finite-rate feedback," IEEE Trans. on Info. Theory, vol. 52, pp. 5045-5060, Nov. 2006.
D. J. Love, R. W. Heath, Jr., V. K. N. Lau, D. Gesbert, B. D. Rao, and M. Andrews, "An Overview of Limited Feedback in Wireless Communication Systems," IEEE Journal on Sel. Areas in Comm., Special Issue on Exploiting Limited Feedback in Tomorrow's Wireless Communication Networks, vol. 26, No. 8, pp. 1341-1365, Oct. 2008.
R. W. Heath, Jr., D. J. Love, V. K. N. Lau, D. Gesbert, B. D. Rao, and M. Andrews, "Exploiting Limited Feedback in Tomorrow's Wireless Communication Networks," IEEE Journal on Sel. Areas in Comm., Special Issue on Exploiting Limited Feedback in Tomorrow's Wireless Communication Networks, vol. 26, No. 8, pp. 1337-1340, Oct. 2008.
D. J. Love, R. W. Heath, Jr., and T. Strohmer, "Grassmannian Beamforming for Multiple-Input Multiple-Output Wireless Systems," IEEE Trans. on Info. Theory special issue on MIMO Communication, vol. 49, pp. 2735-2747, Oct. 2003.
C. B. Chae, D. Mazzarese, N. Jindal and R. W. Heath, Jr., "Coordinated Beamforming with Limited Feedback in the MIMO Broadcast Channel" *IEEE Journal on Sel. Areas in Comm.*, Special Issue on Exploiting Limited Feedback in Tomorrow's Wireless Comm. Networks, vol. 26, No. 8, pp. 1505-1515, Oct. 2008.
A. Paulraj, "Is OFDMA, MIMO and OS the right stuff for mobile broad-band?" 63 pages, http://www.ieeevtc.org/vtc2005fall/presentations/paulraj.pdf, Sep. 2005.
J. Wannstrom, "Carrier aggregation explained", 3GPP http://www.3gpp.org/Carrier-Aggregation-explained.
3GPP, TS 36.808, "Evolved Universal Terrestrial Radio Access (E-UTRA); Carrier Aggregation (Release 10)", v10.0.0, Jun. 2012.
Nokia Siemens Networks, "2020: beyond 4G, radio evolution for the gigabit experience", White Paper, 2011, www.nokiasiemensnetworks.com.
S. Marek, "AT&T's Rinne talks about carrier aggregation trials, small cells and more", http://www.fiercebroadbandwireless.com/story/atts-rinne-talks-about-carrier-aggregation-trials-small-cells-and-more/2012-11-08.
NICTA, "InterfereX", 3 pages, http://www.interfereX.com.

(56) References Cited

OTHER PUBLICATIONS

J. Duplicity, et al., "MU-MIMO in LTE systems", EURASIP Journal on Wireless Communications and Networking, Mar. 2011, 10 pages.
S. Feng and E. Seidel, "Self-organizing networks (SON) in 3GPP LTE", Nomor research, May 2008, pp. 1-15.
NEC, "Self organizing networks", White paper, Feb. 2009, pp. 1-4.
G. J. Foschini, H. C. Huang, K. Karakayali, R. A. Valenzuela, and S. Venkatesan. The Value of Coherent Base Station Coordination. In *Conference on In-formation Sciences and Systems (CISS 2005)*, Mar. 2005.
M. K. Karakayali, G. J. Foschini, R. A. Valenzuela, and R. D. Yates, "On the maximum common rate achievable in a coordinated network," Proc. of the Int'l Conf. on Communications (ICC'06), vol. 9, pp. 1-6, Mar. 3, 2006.
G. J. Foschini, M. K. Karakayali, and R. A. Valenzuela, "Coordinating multiple antenna cellular networks to achieve enormous spectral efficiency," *Proceedings of the IEEE*, vol. 153, No. 4, pp. 548-555, Aug. 2006.
S. Venkatesan, A. Lozano, and R. Valenzuela, "Network MIMO: overcoming inter-cell interference in indoor wireless systems", Proc. of Asilomar conf., pp. 83-87, Nov. 2007.
S. Venkatesan, H. Huang, A. Lozano, and R. Valenzuela, "A WiMAX-based implementation of network MIMO for indoor wireless systems", EURASIP Journal on Advances in Signal Processing, Sep. 2009, 11 pages.
Y. Liang, R. Valenzuela, G. Foschini, D. Chizhik, and A. Goldsmith, "Interference suppression in wireless cellular networks through picocells", ACSSC, pp. 1041-1045, Nov. 2007.
A. Papadogiannis, H. J. Bang, D. Gesbert, and E. Hardouin, "Efficient selective feedback design for multicell cooperative networks", IEEE Trans. on Vehicular Techn., pp. 196-205, vol. 60, n.1, Jul. 13, 2010.
I. F. Akyildiz, D. M. Guterrez-Estevez, E. C. Reyes, "The evolution to 4G cellular systems: LTE-Advanced", Physical Comm., Elsevier, pp. 217-244, 2010.
A. Barbieri, P. Gaal, S. Geirhofer, T. Ji, D. Malladi, Y. Wei, and F. Xue, "Coordinated downlink multi-point communications in heterogeneous cellular networks", (Qualcomm), Information Theory and App. Workshop, pp. 7-16, Feb. 2012.
S. Parkvall, E. Dahlman, A Furuskar, Y. Jading, M. Olsson, S. Wanstedt, and K. Zangi, "LTE-Advanced—evolving LTE towards IMT-Advanced", (Ericsson) IEEE VTC, pp. 1-5, Sep. 2008.
R. A. Monziano and T. W. Miller, *Introduction to Adaptive Arrays*, New York: Wiley, 1980.
R. Chen, R. W. Heath, Jr., and J. G. Andrews, "Transmit Selection Diversity for Unitary Precoded Multiuser Spatial Multiplexing Systems with Linear Receivers," *IEEE Trans. on Signal Proc.*, vol. 55, No. 3, pp. 1159-1171, Mar. 2007.
M. Costa, "Writing on dirty paper," *IEEE Transactions on Information Theory*, vol. 29, No. 3, pp. 439-441, May 1983.
G. Caire and S. Shamai, "On the achivable throughput of a multi-antenna Gaussian broadcast channel," IEEE Trans. Info.Th., vol. 49, pp. 1691-1706, Jul. 2003.
N. Jindal & A. Goldsmith, "Dirty Paper Coding vs. TDMA for MIMO Broadcast Channels", IEEE Trans. on Info. Theory, vol. 51, pp. 1783-1794, May 2005.
M. Tomlinson, "New automatic equaliser employing modulo arithmetic," *Electronics Letters*, vol. 7, Nos. 5/6, pp. 138-139, Mar. 1971.
H. Miyakawa and H. Harashima, "A method of code conversion for digital communication channels with intersymbol interference," *Trans. of the Inst. of Electronic*.
U. Erez, S. Shamai (Shitz), and R. Zamir, "Capacity and lattice-strategies for cancelling known interference," Proceedings of International Symposium on Information Theory, Honolulu, Hawaii, Nov. 2000, pp. 1-32.
W. Yu and J. M. Cioffi, "Trellis Precoding for the Broadcast Channel", IEEE Globecom, vol. 2, pp. 1344-1348, 2001.

S. Perlman and A. Forenza, "Distributed-input distributed-output (DIDO) wireless technology: a new approach to multiuser wireless", Rearden Labs White Paper, 19 pages, Jul. 2011, http://www.reardenwireless.com/110727-DIDO-A%20New%20Approach%20to%20Multiuser%20Wireless.pdf.
A. Vance, "Steve Perlman's wireless fix", Businessweek, Jul. 2011, 10 pages, http://www.businessweek.com/magazine/the-edison-of-silicon-valley-07272011.html.
M. Lindström (Ericsson), "LTE-Advanced Radio Layer 2 and RRC aspects", 3GPP TSG-RAN WG2, Dec. 17-18, 2009, 38 pages.
Anritsu, "LTE resource guide", 18 pages, 2009, www.us.anritsu.com.
3GPP, "Spatial Channel Model AHG (Combined ad-hoc from 3GPP & 3GPP2)", SCM Text V6.0, Apr. 22, 2003.
J. Lee, "Introduction of LTE-Advanced DL/UL MIMO", Samsung Electronics, Sep. 2009, 18 pages.
E. Dahlman, S. Parkvall and J. Skold, "4G: LTE/LTE-Advanced for mobile broadband", Elsevier, 2011.
J. Zyren, "Overview on the 3GPP long term evolution physical layer", Freescale White Paper, Jul. 2007, 27 pages.
M. Baker, "LTE-Advanced physical layer", Alcatel-Lucent, Dec. 2009, 48 pages.
J. Xu, "LTE-Advanced signal generation and measurements using SystemVue", Agilent Technologies, 46 pages.
X. Hou and H. Kayama, "Demodulation reference signal design and channel estimation for LTE-Advanced uplink", DOCOMO, Adv. in Vehic. Netw. Tech., Apr. 2011, Ch. 22, pp. 418-432, title page.
D. C. Chu, "Polyphase codes with good periodic correlation properties", *IEEE Trans. Info. Theory*, vol. 18, n. 4, pp. 531-532, Jul. 1972.
A. Lozano, R.W. Heath and J. Andrews, "Fundamental limits of cooperation", , 27 pages, Mar. 2012, http://arxiv.org/pdf/1204.0011.pdf.
J. G. Andrews, "Seven ways that HetNet are a cellular paradigm shift", pp. 136-144, http://users.ece.utexas.edu/~jandrews/pubs/And_HetNet_CommMag2012_v3.pdf.
J-C. Guey, and L. D. Larsson, "Modeling and evaluation of MIMO systems exploiting channel reciprocity in TDD mode", 2004, VTC2004-Fall. 2004 IEEE 60th, 2004.
Bourdoux, "Non-reciprocal transceivers in OFDM/SDMA systems: impact and mitigation", IEEE, pp. 183-186, 2003.
N. Tyler, B. Allen, and H. Aghvami, "Adaptive antennas: the calibration problem", IEEE Comm. Mag., pp. 114-122, Dec. 2004.
M. Guillaud, D. T. M. Slock, and R. Knopp, "A practical method for wireless channel reciprocity exploitation through relative calibration", IEEE Proc. of Sign Proc., pp. 403-406, vol. 1 Aug. 2005.
P. Zetterberg, "Experimental investigation of TDD reciprocity based zero-forcing transmit precoding", EURASIP, Jun. 2010.
P. Uthansakul, K. Attakitmongkol, N. Promsuvana, and Uthansakul, "MIMO antenna selection using CSI from reciprocal channel", Int. Journ. of Elect. and Info. Eng., 2010.
Ubuquiti, "airMAX", http://www.ubnt.com/airmax.
Ubuquiti, "airFiber", http://www.ubnt.com/airfiber.
MikroTik, "Routerboard", http://routerboard.com/.
Ruckus wireless, "Long-range 802.11n Wi-Fi point-to-point/multi-point backhaul", http://www.ruckuswireless.com/products/zoneflex-outdoor/7731.
DigitalAir wireless, "Outdoor wireless", http://www.digitalairwireless.com/outdoor-wireless-networks.html.
DigitalAir wireless, "GeoDesy laser links 1.25Gbps full duplex", http://www.digitalairwireless.com/outdoor-wireless-networks/point-to-point-wireless/laser-fso-links/geodesy-fso-laser-links.html.
Netsukuku, http://netsukuku.freaknet.org/.
Webpass, "Buildings online" http://www.webpass.net/buildings?city=san+francisco&column=address&order=asc.
BelAir Networks, "Small cells" http://www.belairnetworks.com/sites/default/files/WP—SmallCells.pdf.
Morgan Stanley, "Mobile data wave: who dares to invest, wins", Jun. $13_{th}$, 2012.
Nihar Jindal & Andrea Goldsmith, "Dirty Paper Coding vs. TDMA for MIMO Broadcast Channels", IEEE Trans. on Information Theory, vol. 51, pp. 1783-1794, May 2005.

(56) References Cited

OTHER PUBLICATIONS

B. M. Hochwald, C. B. Peel, and A. L. Swindlehurst, "A Vector-Perturbation Technique for Near-Capacity Multiantenna Multiuser Communication—Part II: Perturbation", IEEE Trans. on Communications, vol. 53, n. 3, pp. 537-544, Mar. 2005.
P. Viswanath, et al., "Opportunistic beamforming using dump antennas," IEEE Trans. on Inform. Theory, vol. 48, pp. 1277-1294, Jun. 2002.
A. A. M. Saleh, et al., "A statistical model for indoor multipath propagation," IEEE Jour. Select. Areas in Comm., vol. 195 SAC-5, No. 2, pp. 128-137, Feb. 1987.
J. Choi, et al., "Interpolation Based Transmit Beamforming for MIMO-OFDM with Limited Feedback," *IEEE Trans. on Signal Processing*, vol. 53, No. 11, pp. 4125-4135, Nov. 2005.
I. Wong, et al., "Long Range Channel Prediction for Adaptive OFDM Systems," *Proc. of the IEEE Asilomar Conf. on Signals, Systems, and Computers*, vol. 1,pp. 723-736, Pacific Grove, CA, USA, Nov. 7-10, 2004.
B.D.Van Veen, et al., "Beamforming: a versatile approach to spatial filtering," *IEEE ASSP Magazine*, Apr. 1988, pp. 4-24.
R.G. Vaughan, "On optimum combining at the mobile," *IEEE Trans. on Vehic. Tech.*, vol. 37, n.4, pp. 181-188, Nov. 1988.
F.Qian, "Partially adaptive beamforming for correlated interference rejection," *IEEE Trans. on Sign. Proc.*, vol. 43, n.2, pp. 506-515, Feb. 1995.
H.Krim, et. al., "Two decades of array signal processing research," *IEEE Signal Proc. Magazine*, pp. 67-94, Jul. 1996.
H.Boche, et al., "Analysis of different precoding/decoding strategies for multiuser beamforming", IEEE Vehic. Tech. Conf., vol. 1, Apr. 2003.
M.Schubert, et al., "Joint 'dirty paper' pre-coding and downlink beamforming," vol. 2, pp. 536-540, Dec. 2002.
H.Boche, et al."A general duality theory for uplink and downlink beamforming", vol. 1, pp. 87-91, Dec. 2002.
S. Robinson, "Toward an Optimal Algorithm for Matrix Multiplication", SIAM News, vol. 38, No. 9, Nov. 2005.
D. Coppersmith and S. Winograd, "Matrix Multiplication via Arithmetic Progression", J. Symb. Comp. vol. 9, p. 251-280, 1990.
H. Cohn, R. Kleinberg, B. Szegedy, C. Umans, "Group-theoretic Algorithms for Matrix Multiplication", p. 379-388, Nov. 2005.
W.H. Press, S.A. Teukolsky, W. T. Vetterling, B.P. Flannery "Numerical Recipes in C: The Art of Scientific Computing", Cambridge University Press, 1992.
Per-Erik Eriksson and Björn Odenhammar, "VDSL2: Next important broadband technology", Ericsson Review No. 1, 2006.
J. W. Wallace and M. A. Jensen, "Statistical characteristics of measured MIMO wireless channel data and comparison to conventional models," Proc. IEEE Veh. Technol. Conf., vol. 2, No. 7-11, pp. 1078-1082, Oct. 2001.
V. Erceg et al., "TGn channel models," IEEE 802.11-03/940r4, May 2004.
K. Sulonen, P. Suvikunnas, L. Vuokko, J. Kivinen, and P. Vainikainen, "Comparison of MIMO antenna configurations in picocell and microcell environments," IEEE Jour. Select. Areas in Comm., vol. 21, pp. 703-712, Jun. 2003.
Shuangqing Wei, D. L. Goeckel, and R. Janaswamy, "On the asymptoticcapacity of MIMO systems with fixed length linear antenna arrays," Proc. IEEE Int. Conf. on Comm., vol. 4, pp. 2633-2637, 2003.
T. S. Pollock, T. D. Abhayapala, and R. A. Kennedy, "Antenna saturation effects on MIMO capacity," Proc. IEEE Int. Conf. on Comm., 192 vol. 4, pp. 2301-2305, May 2003.
M. L. Morris and M. A. Jensen, "The impact of array configuration on MIMO wireless channel capacity," Proc. IEEE Antennas and Prop. Symp., vol. 3, pp. 214-217, Jun. 2002.
Liang Xiao, Lin Dal, Hairuo Zhuang, Shidong Zhou, and Yan Yao, "A comparative study of MIMO capacity with different antenna topologies," IEEE ICCS'02, vol. 1, pp. 431-435, Nov. 2002.
D.D. Stancil, A. Berson, J.P. Van't Hof, R. Negi, S. Sheth, and P. Patel, "Doubling wireless channel capacity using co-polarised, co-located electric and magnetic dipoles," Electronics Letters, vol. 38, pp. 746-747, Jul. 2002.
T. Svantesson, "On capacity and correlation of multi-antenna systems employing multiple polarizations," Proc. IEEE Antennas and Prop. Symp., vol. 3, pp. 202-205, Jun. 2002.
C. Degen and W. Keusgen, "Performance evaluation of MIMO systems using dual-polarized antennas," Proc. IEEE Int. Conf. on Telecommun., vol. 2, pp. 1520-1525, Feb. 2003.
J. B. Andersen and B. N. Getu, "The MIMO cube-a compact MIMO antenna," IEEE Proc. of Wireless Personal Multimedia Communications Int. Symp., vol. 1, pp. 112-114, Oct. 2002.
C. Waldschmidt, C. Kuhnert, S. Schulteis, and W. Wiesbeck, "Compact MIMO-arrays based on polarisation-diversity," Proc. IEEE Antennas and Prop. Symp., vol. 2, pp. 499-502, Jun. 2003.
S. Visuri and D. T. Slock, "Colocated antenna arrays: design desiderata for wireless communications," Proc. of Sensor Array and Multichannel Sign. Proc. Workshop, pp. 580-584, Aug. 2002.
A. Forenza and R. W. Heath, Jr., "Optimization Methodology for Designing 2-CPAs Exploiting Pattern Diversity in Clustered MIMO Channels", *IEEE Trans. on Communications*, vol. 56, No. 10, pp. 1748-1759, Oct. 2008.
D. Piazza, N. J. Kirsch, A. Forenza, R. W. Heath, Jr., and K. R. Dandekar, "Design and Evaluation of a Reconfigurable Antenna Array for MIMO Systems," *IEEE Transactions on Antennas and Propagation*, vol. 56, No. 3, pp. 869-881, Mar. 2008.
R. Bhagavatula, R. W. Heath, Jr., A. Forenza, and S. Vishwanath, "Sizing up MIMO Arrays," *IEEE Vehicular Technology Magazine*, vol. 3, No. 4, pp. 31-38, Dec. 2008.
Ada Poon, R. Brodersen and D. Tse, "Degrees of Freedom in Multiple Antenna Channels: A Signal Space Approach", IEEE Transactions on Information Theory, vol. 51(2), Feb. 2005, pp. 523-536.
Wikipedia, "Advanced Mobile Phone System" http://en.wikipedia.org/wiki/Advanced_Mobile_Phone_System.
AT&T, "1946: First Mobile Telephone Call" http://www.corp.att.com/attlabs/reputation/timeline/46mobile.html.
GSMA, "GSM technology" http://www.gsmworld.com/technology/index.htm.
ETSI, "Mobile technologies GSM" http://www.etsi.org/WebSite/Technologies/gsm.aspx.
Wikipedia, "IS-95" http://en.wikipedia.org/wiki/IS-95.
Ericsson, "The evolution of EDGE" http://www.ericsson.com/res/docs/whitepapers/evolution_to_edge.pdf.
Q. Bi (Mar. 2004). "A Forward Link Performance Study of the 1xEV-DO Rel. 0 System Using Field Measurements and Simulations" (PDF). Lucent Technologies. http://www.cdg.org/resources/white_papers/files/Lucent%201xEV-DO%20Rev%20O%20Mar%2004.pdf.
WiMAX forum, http://www.wimaxforum.org/.
C. Eklund, R. B. Marks, K. L. Stanwood and S. Wang, "IEEE Standard 802.16: A Technical Overview of the WirelessMAN™ Air Interface for Broadband Wireless Access" http://ieee802.org/16/docs/02/C80216-02_05.pdf.
H. Ekström, A. Furuskär, J. Karlsson, M. Meyer, S. Parkvall, J. Torsner, and M. Wahlqvist "Technical Solutions for the 3G Long-Term Evolution", IEEE Communications Magazine, pp. 38-45, Mar. 2006.
3GPP, "LTE", http://www.3gpp.org/LTE.
ITU, "ISM band" http://www.itu.int/ITU-R/terrestrial/faq/index.html#g013.
S. Perlman and A. Forenza "Distributed-input distributed-output (DIDO) wireless technology: a new approach to multiuser wireless", Aug. 2011 http://www.rearden.com/DIDO/DIDO_White_Paper_110727.pdf.
Bloomberg Businessweek, "Steve Perlman's Wireless Fix", Jul. 27, 2011 http://www.businessweek.com/magazine/the-edison-of-silicon-valley-07272011.html.
Wired, "Has OnLive's Steve Perlman Discovered Holy Grail of Wireless?", Jun. 30, 2011; http://www.wired.com/epicenter/2011/06/perlman-holy-grail-wireless/.

(56) References Cited

OTHER PUBLICATIONS

The Wall Street Journal "Silicon Valley Inventor's Radical Rewrite of Wireless", Jul. 28, 2011 http://blogs.wsj.com/digits/2011/07/28/silicon-valley-inventors-radical-rewrite-of-wireless/.

The White House, "Presidential Memorandum: Unleashing the Wireless Broadband Revolution", Jun. 28, 2010 http://www.whitehouse.gov/the-press-office/presidential-memorandum-unleashing-wireless-broadband-revolution.

FCC, "Open commission meeting", Sep. 23$^{rd}$, 2010 http://reboot.fcc.gov/open-meetings/2010/september.

IEEE 802.22, "IEEE 802.22 Working Group on Wireless Regional Area Networks", http://www.ieee802.org/22/.

A. Duel-Hallen, S. Hu, and H. Hallen, "Long-Range Prediction of Fading Signals," IEEE Signal Processing Mag., vol. 17, No. 3, pp. 62-75, May 2000.

A. Forenza and R. W. Heath, Jr., "Link Adaptation and Channel Prediction in Wireless OFDM Systems," in Proc. IEEE Midwest Symp. on Circuits and Sys., Aug. 2002, pp. 211-214.

M. Sternad and D. Aronsson, "Channel estimation and prediction for adaptive OFDM downlinks [vehicular applications]," in Proc. IEEE Vehicular Technology Conference, vol. 2, Oct. 2003, pp. 1283-1287.

D. Schafhuber and G. Matz, "MMSE and Adaptive Prediction of Time-Varying Channels for OFDM Systems," IEEE Trans. Wireless Commun., vol. 4, No. 2, pp. 593-602, Mar. 2005.

I. C. Wong and B. L. Evans, "Joint Channel Estimation and Prediction for OFDM Systems," in Proc. IEEE Global Telecommunications Conference, St. Louis, MO, Dec. 2005.

M. Guillaud and D. Slock, "A specular approach to MIMO frequencyselective channel tracking and prediction," in Proc. IEEE Signal Processing Advances in Wireless Communications, Jul. 2004, pp. 59-63.

Wong, I.C. Evans, B.L., "Exploiting Spatio-Temporal Correlations in MIMO Wireless Channel Prediction", IEEE Globecom Conf., pp. 1-5, Dec. 2006.

Hewlett Packard, "GPS and precision timing applications", Application Note 1272; http://www.jackson-labs.com/assets/uploads/main/HP_GPS_Apps.pdf.

Kellerman, et al., "LDPC OFDM space-time multipath fading channel results", Proc. SPIE 5100, Digital Wireless Communications V, 19 (Jul. 25, 2003); doi:10.1117/12.487462.

Lin, et al., "Mirror MoCap: Automatic and efficient capture of dense 3D facial motion parameters from video", The Visual Computer, International Journal of Computer Graphics, Springer, Berlin, DE, vol. 21 , No. 6, Jul. 2005, pp. 355-372, XP019339114.

C. B. Chae, A. Forenza, R. W. Heath, Jr., M. R. McKay, and I. B. Collings, "Adaptive MIMO Transmission Techniques for Broadband Wireless Communication Systems," IEEE Communications Magazine, vol. 48, No. 5, pp. 112-118, May 2010.

M. K. Karakayali, G. J. Foschini, and R. A. Valenzuela, "Network coordination for spectrally efficient communications in cellular systems," IEEE Wireless Communications Magazine, vol. 13, No. 4, pp. 56-61, Aug. 2006.

Discussion Draft, "A bill",112th congress, 1$^{st}$ session, Jul. 12, 2011, House Republicans, Spectrum Innovation Act of 2011, 2011, 55 pages.

http://republicans.energycommerce.house.gov/Media/file/Hearings/Telecom/071511/DiscussionDraft.pdf.

Full Examiner's Report from foreign counterpart Australian Patent Application No. 2010256510, mailed Aug. 10, 2015, 3 pages.

Office Action from U.S. Appl. No. 13/652,259, mailed Sep. 23, 2015, 6 pages.

Examination Report from counterpart Australian Patent Application No. 2014200745, mailed Sep. 25, 2015, 3 pages.

Office Action from foreign counterpart Japan Patent Application No. 2013-537753, mailed Sep. 7, 2015, 9 pages.

Examiner Report from foreign counterpart Canada Patent Application No. 2,562,657, mailed Aug. 31, 2015, 3 pages.

First Examination Report from counterpart India Patent Application No. 1528/DELNP/2007 mailed Sep. 29, 2015, 3 pages.

Notice of Allowance from U.S. Appl. No. 14/023,302, mailed Oct. 9, 2015, 5 pages.

Office Action from U.S. Appl. No. 13/797,971, mailed Oct. 9, 2015, 52 pages.

Examiner Report from foreign counterpart Australian Patent Application No. 2011323559, mailed Sep. 30, 2015, 3 pages.

First Office Action from counterpart Mexican Patent Application No. MX/a/2014/013795, mailed Oct. 30, 2015, 4 pages.

Notice of Allowance from U.S. Appl. No. 14/156,254, mailed Nov. 3, 2015, 29 pages.

Office Action from U.S. Appl. No. 13/233,006, mailed Nov. 5, 2015, 10 pages.

Office Action from U.S. Appl. No. 13/232,996, mailed Nov. 12, 2015, 14 pages.

Extended Search Report from counterpart European Patent Application No. 13 784 690.3, mailed Nov. 23, 2015, 4 pages.

International Preliminary Report on Patentability and Written Opinon from foreign counterpart PCT/US2013/061493 mailed Apr. 16, 2015, 7 pages.

International Preliminary Report on Patentability and Written Opinion from foreign counterpart PCT/US2014/025108 mailed Sep. 24, 2015, 8 pages.

International Preliminary Report on Patentability and Written Opinion from foreign counterpart PCT/US2014/025102 mailed Sep. 24, 2015, 10 pages.

International Preliminary Report on Patentability and Written Opinion from foreign counterpart PCT/US2014/025123 mailed Sep. 24, 2015, 10 pages.

International Preliminary Report on Patentability and Written Opinion from foreign counterpart PCT/US2014/025109 mailed Oct. 1, 2015, 5 pages.

International Preliminary Report on Patentability and Written Opinion from foreign counterpart PCT/US2014/025105 mailed Sep. 24, 2015, 10 pages.

International Preliminary Report on Patentability and Written Opinion from foreign counterpart PCT/US2013/071749 mailed Jun. 4, 2015, 7 pages.

International Preliminary Report on Patentability and Written Opinion from foreign counterpart PCT/US2015/23436 mailed Mar. 30, 2015, 10 pages.

Notice of Allowance from counterpart Mexican Patent Application No. MX/a/2014/002900, Nov. 6, 2015, 1 page.

First Office Action from counterpart Japan Patent Application No. 2014-264325, mailed Nov. 12, 2015, 4 pages.

Final Office Action from U.S. Appl. No. 12/802,974, mailed Nov. 30, 2015, 22 pages.

First Examination Report from counterpart Australian Patent Application No. 2020256510 mailed Aug. 10, 2015, 3 pages.

First Office Action Report from counterpart Chinese Patent Application No. 201310407419.4 mailed Nov. 20, 2015, 8 pages.

First Examination Report from counterpart Australian Patent Application No. 2011323559 mailed Oct. 12, 2015, 3 pages.

Office Action from U.S. Appl. No. 12/802,988, mailed Jan. 13, 2016, 11 pages.

Office Action from U.S. Appl. No. 13/797,984, mailed Jan. 14, 2016, 14 pages.

First Office Action from counterpart European Patent Application No. 10 784 126.4 mailed Dec. 17, 2015, 7 pages.

First Office Action from counterpart European Patent Application No. 12762167.0 mailed Jan. 4, 2016, 4 pages.

Notice of Allowance from foreign counterpart Korean Patent Application No. 2015-7002560, mailed Feb. 4, 2016, 2 pages.

Extended Search Report Office Action from counterpart European Patent Application No. 13 790 935. 4 mailed Dec. 1, 2015, 9 pages.

Office Action from U.S. Appl. No. 13/797,950, mailed Feb. 2, 2016, 65 pages.

International Search Report and Written Opinion from foreign counterpart PCT Application No. PCT/US13/41726 mailed Jul. 16, 2013, 7 pages.

International Preliminary Report on Patentability from foreign counterpart PCT Application No. PCT/US2013/041726 mailed Nov. 18, 2014.

(56) References Cited

OTHER PUBLICATIONS

First Office Action from counterpart European Patent Application No. 201380035543.0 mailed Feb. 15, 2016, 4 pages.
Office Action from U.S. Appl. No. 13/652,259, mailed Feb. 18, 2016, 8 pages.
Notice of Allowance from U.S. Appl. No. 14/156,254, mailed Feb. 26, 2016, 21 pages.
P. Rapajic and D. Popescu, Information Capacity of Random Signature Multiple-Input Multiple Output Channel, IEEE Trans. Commun., vol. 48, No. 8, pp. 1245-1248, Aug. 2000.
C.-N. Chuah, D. N. C. Tse, J. M. Kahn, and R. A. Valenzuela, Capacity Scaling in MIMO Wireless Systems under Correlated Fading, IEEE Trans. Inform. Theory, vol. 48, No. 2, pp. 637-650, Feb. 2002.
A. Bourdoux, B. Come, and N. Khaled, Non-reciprocal transceivers in OFDM/SDMA systems: Impact and mitigation, in Proc. Radio and Wireless Conference (RAWCON), Aug. 2003.
A. Moustakas, S. Simon, and A. Sengupta, MIMO Capacity Through Correlated Channels in the Presence of Correlated Interferers and Noise: A (Not so) Large N Analysis, IEEE Trans. Inform. Theory, vol. 49, No. 10, pp. 2545-2561, Oct. 2003.
Hochwald, T. Marzetta, and V. Tarokh, Multi-Antenna Channel Hardening and its Implications for Rate Feedback and Scheduling, IEEE Trans. Inform. Theory, vol. 50, No. 9, pp. 1893-1909, Sep. 2004.
M. Debbah and R. Muller, MIMO Channel Modelling and the Principle of Maximum Entropy, IEEE Trans. Inform. Theory, vol. 51, No. 5, pp. 1667-1690, May 2005.
Y.-C. Liang, S. Sun and C. Ho, Block-iterative Generalized Decision Feedback Equalizers (BI-GDFE) for Large MIMO Systems: Algorithm Design and Asymptotic Performance Analysis, IEEE Trans. Signal Processing, vol. 54, No. 6, pp. 2035-2048, Jun. 2006.
D. Aktas, M. N. Bacha, J. S. Evans, and S. V. Hanly, Scaling Results on the Sum Capacity of Cellular Networks with MIMO Links, IEEE Trans. Inform. Theory, vol. 52, pp. 3264-3274, Jul. 2006.
Y.-C. Liang, G. M. Pan and Z. D. Bai, Asymptotic Performance of MMSE Receivers for Large Systems Using Random Matrix Theory, IEEE Trans. Inform. Theory, vol. 53, No. 11, pp. 4173-4190, Nov. 2007.
R. Muller, D. Guo, and A. Moustakas, Vector Precoding for Wireless MIMO Systems and Its Replica Analysis, IEEE J. Sel. Areas Commun., vol. 26, No. 3, pp. 530-540, Apr. 2008.
S. K. Mohammed, A. Chockalingam, and B. Sundar Rajan, A Low-Complexity Precoder for Large Multiuser MISO Systems, Proc. IEEE Vehicular Technology Conference (VTC' 2008), Singapore, May 2008.
G. Taricco, Asymptotic Mutual Information Statistics of Separately-Correlated Rician Fading MIMO Channels, IEEE Trans. Inform. Theory, vol. 54, No. 8, pp. 3490-3504, Aug. 2008.
Y.-C. Liang, E.Y. Cheu, L. Bai and G. Pan, On the Relationship Between MMSE-SIC and BI-GDFE Receivers for Large Multiple-Input Multiple-Output Channels, IEEE Trans. Signal Processing, vol. 56, No. 8, pp. 3627-3637, Aug. 2008.
V. K. Nguyen and J. S. Evans, Multiuser Transmit Beamforming via Regularized Channel Inversion: A Large System Analysis, in Proc. IEEE Global Communications Conference, New Orleans, LO, US, Dec. 2008, pp. 1-4.
K. R. Kumar, G. Caire, and A. Moustakas, Asymptotic performance of linear receivers in MIMO fading channels, IEEE Trans. Inform. Theory, vol. 55, No. 10, pp. 4398-4418, Oct. 2009.
B. Cerato and E. Viterbo, Hardware implementation of low-complexity detector for large MIMO, in Proc. IEEE ISCAS'2009, pp. 593-596, Taipei, May 2009.
W. Hachem, O. Khorunzhiy, P. Loubaton, J. Najim, L. Pastur, A New Approach for Mutual Information Analysis of Large Dimensional Multi-Antenna Channels, IEEE Trans. Inform. Theory, vol. 54, No. 9, pp. 3987-4004, Sep. 2008.

T. Datta, N. Srinidhi, A. Chockalingam, and B. Sundar Rajan, A Hybrid RTS-BP Algorithm for Improved Detection of Large-MIMO M-QAM Signals, in Proc. IEEE National Conference on Communication, 2011.
G. Guthy, W. Utschick, and M.L. Honig, Large System Analysis of the Successive Encoding Successive Allocation Method for the MIMO BC, in Proc. of the International ITG Workshop on Smart Antennas, Bremen, Germany, Feb. 2010.
J. Dumont, W. Hachem, S. Lasaulce, P. Loubaton, J. Najim, On the Capacity Achieving Transmit Covariance Matrices for MIMO Rician Channels: An Asymptotic Approach, IEEE Trans. Inform. Theory, vol. 56, No. 3, pp. 1048-1069, Mar. 2010.
A. Chockalingam, Low-Complexity Algorithms for Large-MIMO Detection, in Proc. Communications, Control and Signal Processing (ISCCSP), 2010.
E. Riegler and G. Taricco, Asymptotic Statistics of the Mutual Information for Spatially Correlated Rician Fading MIMO Channels with Interference, IEEE Trans. Inform. Theory, vol. 56, No. 4, pp. 1542-1559, Apr. 2010.
P. Li and R. D. Murch, Multiple Output Selection-Las Algorithm in Large MIMO Systems, IEEE Commun. Lett., vol. 14, No. 5, pp. 399-401, May 2010.
Huh, S.-H. Moon, Y.-T. Kim, I. Lee, and G. Caire, Multi-cell MIMO Downlink with Cell Cooperation and Fair Scheduling: A Large-System Limit Analysis, IEEE Trans. Inform. Theory, vol. 57, No. 12, pp. 7771-7786, Dec. 2011.
C. Guthy, W. Utschick, and M.L. Honig, Large System Analysis of Projection Based Algorithms for the MIMO Broadcast Channel, in Proc. of the IEEE Int'l Symp. Inform. Theory, Austin, U.S.A., Jun. 2010.
F. Dupuy, P. Loubaton, On the Capacity Achieving Covariance Matrix for Frequency Selective MIMO Channels Using the Asymptotic Approach, IEEE Trans. Inform. Theory, vol. 57, No. 9, pp. 5737-5753, Sep. 2011.
C. K. Wen, K. K. Wong, and J. C. Chen, Asymptotic Mutual Information for Rician MIMO-MA Channels with Arbitrary Inputs: A Replica Analysis, IEEE Trans. Commun., vol. 58, No. 10, pp. 2782-2788, Oct. 2010.
T. L. Marzetta, Noncooperative Cellular Wireless with Unlimited Numbers of Base Station Antennas, IEEE Trans. Wireless Communications, vol. 9, No. 11, pp. 3590-3600, Nov. 2010.
T. Datta, N. Srinidhi, A. Chockalingam, and B. S. Rajan, Random-Restart Reactive Tabu Search Algorithm for Detection in Large-MIMO Systems, IEEE Commun. Letters, vol. 14, No. 12, pp. 1107-1109, Dec. 2010.
H. C. Papadopoulos, G. Caire, and S. A. Ramprashad, Achieving Large Spectral Efficiencies from MU-MISO with Tens of Antennas: Location-Adaptive TDD MU-MIMO Design and User Scheduling, in Proc. IEEE Asilomar Conf. on Signals, Systems, and Computers (ACSSC), Pacific Grove, CA, Nov. 2010.
N. Srinidhi, T. Datta, A. Chockalingam, and B. S. Rajan, Layered Tabu Search Algorithm for Large-MIMO Detection and a Lower Bound on ML Performance, IEEE Trans. Commun., vol. 59, No. 11, pp. 2955-2963, Nov. 2011.
Judge, P., GreenTouch Shows Low Power Wireless TechWeekEurope, 3 pages, http://www.techweekeurope.co.uk/workspace/greentouch-shows-low.
R. Couillet, M. Debbah, and J. W. Silverstein, A Deterministic Equivalent for the Analysis of Correlated MIMO Multiple Access Channels, IEEE Trans. Inform. Theory, vol. 57, No. 6, pp. 3493-3514, Jun. 2011.
R. Muharar and J. Evans, Downlink Beamforming with Transmit-Side Channel Correlation: A Large System Analysis, in Proc. IEEE International Conference on Communications (ICC), Kyoto, Japan, Jun. 2011.
A. Kumar, S. Chandrasekaran, A. Chockalingam, and B. S. Rajan, Near-Optimal Large-Mimo Detection Using Randomized MCMC and Randomized Search Algorithms, in Proc. IEEE International Conference on Communications (ICC), Kyoto, Japan, Jun. 2011.
J. Jose, A. Ashikhmin, T. L. Marzetta, and S. Vishwanath, Pilot Contamination and Precoding in Multi-cell TDD Systems, IEEE Trans. Wireless Commun., vol. 10, No. 8, pp. 2640-2651, Aug. 2011.

(56) References Cited

OTHER PUBLICATIONS

B. Gopalakrishnan and N. Jindal, An Analysis of Pilot Contamination on Multi-User MIMO Cellular Systems with Many Antennas. in Proc. Signal Processing Advances in Wireless Communications (SPAWC), San Francisco, CA, Jun. 2011.
C. Artigue, P. Loubaton, On the Precoder Design of Flat Fading MIMO Systems Equipped with MMSE Receivers: A Large System Approach, IEEE Trans. Inform. Theory, vol. 57, No. 7, pp. 4138-4155, Jul. 2011.
C. Knievel and P. A. Hoeher, On Particle Swarm Optimization for MIMO Channel Estimation, Journal of Electrical and Computer Engineering, vol. 2012, Article ID 614384, 10 pages, 2012.
R. Zakhour and S. Hanly, Min-Max Fair Coordinated Beamforming via Large Systems Analysis, in Proc. of the IEEE International Symposium on Information Theory, St. Petersburg, Jul. 2011.
C. K. Wen, S. Jin, and K. K. Wong, On the Sum-Rate of Multiuser MIMO Uplink Channels with Jointly-Correlated Rician fading, IEEE Trans. Commun., vol. 59, No. 10, pp. 2883-2895, Oct. 2011.
X. Gao, O. Edfors, F. Rusek, and F. Tufvesson, Linear Pre-Coding Performance in Measured Very-Large MIMO Channels, in Proc. IEEE Vehicular Technology Conf. (VTC), San Francisco, CA, US, Sep. 2011, pp. 1-5.
C. Knievel, M. Noemm, and P. A. Hoeher, Low Complexity Receiver for Large-MIMO Space Time Coded Systems, in Proc. IEEE VTC-Fall'2011, Sep. 2011.
D. Wing Kwan Ng, E. S. Lo, R. Schober, Energy-Efficient Resource Allocation in OFDMA Systems with Large Numbers of Base Station Antennas, 30 pages, Oct. 15, 2011.
J. Hoydis, R. Couillet, and M. Debbah, Iterative Deterministic Equivalents for the Performance Analysis of Communication Systems, pp. 1-43, Dec. 18, 2011.
H. Q. Ngo and E. G. Larsson, EVD-Based Channel Estimations for Multicell Multiuser MIMO with Very Large Antenna Arrays, IEEE Int'l Conf. on Acoustics, Speed and Signal Processing (ICASSP), Kyoto, Japan, Mar. 2012.
X. Dai, R. Zou, S. Sun and Y. Wang, Reducing the Complexity of Quasi-ML Detectors for MIMO Systems Through Simplified Branch Metric and Accumulated Branch Metric Based Detection, Communications Letters, vol. 17, No. 5, pp. 916-919, May 2013.
S. K. Mohammed and E. G. Larsson, Per-antenna Constant Envelope Precoding for Large Multi-User MIMO Systems, IEEE Trans. Commun., vol. 61, No. 3, pp. 1059-1071, Mar. 2013.
F. Rusek, D. Persson, B. K. Lau, E. G. Larsson, T. L. Marzetta, O. Edfors, and F. Tufvesson, Scaling up MIMO: Opportunities and Challenges with Very Large Arrays, IEEE Signal Proces. Mag., vol. 30, No. 1, pp. 40-46, Jan. 2013.
P. Vallet, P. Loubaton, X. Mestre, Improved Subspace Estimation for Multivariate Observations of High Dimension: The Deterministic Signals Case, IEEE Trans. Inform. Theory, vol. 58, No. 2, pp. 1043-1068, Feb. 2012.
S. Wagner, R. Couillet, M. Debbah, and D. T. M. Slock, Large System Analysis of Linear Precoding in MISO Broadcast Channels with Limited Feedback, IEEE Trans. Inform. Theory, vol. 58, No. 7, pp. 4509-4537, Jul. 2012.
B. Zaidel, R. Muller, A. Moustakas, and R. de Miguel, Vector Precoding for Gaussian MIMO Broadcast Channels: Impact of Replica Symmetry Breaking, IEEE Trans. Inform. Theory, vol. 58, No. 3, pp. 1413-1440, Mar. 2012.
P. Suthisopapan, K. Kasai, V. Imtawil, and A. Meesomboon, Near Capacity.
Approaching Capacity of Large MIMO Systems by Non-Binary LDPC Codes and MMSE Detection, in Proc. of the IEEE International Symposium on Information Theory, 2012.
J. Nam, J-Y. Ahn, A. Adhikary, G. Caire, Joint Spatial Division and Multiplexing: Realizing Massive MIMO Gains with Limited Channel State Information, in Proc. Conference on Information Sciences and Systems, 2012, IEEE, 6 pages.

S. Payami and F. Tufvesson, Channel Measurements and Analysis for Very Large Array Systems At 2.6 GHz, in Proc. 6th European Conference on Antennas and Propagation, EuCAP 2012, Prague, Czech Republic, Mar. 3, 2012.
Ping-Heng Kuo, H. T. Kung, and Pang-An Ting, Compressive Sensing Based Channel Feedback Protocols for Spatially-Correlated Massive Antenna Arrays, in Proc. IEEE Wireless Communications and Networking Conference (WCNC 2012), Apr. 2012, pp. 492-497.
A. Pitarokoilis, S. K. Mohammed, and E. G. Larsson, On the Optimality of Single-Carrier Transmission in Large-Scale Antenna Systems, IEEE Wireless Commun. Lett., vol. 1, No. 4, pp. 276-279, Aug. 2012.
H. Q. Ngo, E. G. Larsson, and T. L. Marzetta, Energy and Spectral Efficiency of Very Large Multiuser MIMO Systems, IEEE Trans. Commun., vol. 61, No. 4, pp. 1436-1449, Apr. 2013.
S. K. Mohammed and E. G. Larsson, Single-User Beamforming in Large-Scale MISO Systems with Per-Antenna Constant-Envelope Constraints: The Doughnut Channel, IEEE Trans. Wireless Commun., vol. 11, No. 11, pp. 3992-4005, Nov. 2012.
H. Q. Ngo, M. Matthaiou, T. Q. Duong, and E. G. Larsson, Uplink Performance Analysis of Multicell MU-MIMO Systems with ZF Receivers, pp. 1-32, Jun. 29, 2012.
X. Artiga, B. Devillers, and J. Perruisseau-Carrier, Mutual coupling effects in multi-user massive MIMO base stations, in Proc. IEEE Antennas and Propagation Society International Symposium (APSURSI), Jul. 2012.
H. Huh, G. Caire, H. C. Papadopoulos, and S. A. Ramprashad, Achieving "Massive MIMO" Spectral Efficiency with a Not-so-Large Number of Antennas. IEEE Trans. Wireless Communications, vol. 11, No. 9, pp. 3226-3239, Sep. 2012.
C. Shepard, H. Yu, N. Anand, L. E. Li, T. L. Marzetta, R. Yang, and L. Zhong, Argos: Practical Many-Antenna Base Stations, in Proc. ACM Int. Conf. Mobile Computing and Networking (MobiCom), Aug. 2012.
A. Pitarokoilis, S. K. Mohammed, and E. G. Larsson, Effect of Oscillator Phase Noise on Uplink Performance of Large MU-MIMO Systems, in Proc. of the 50th Annual Allerton Conference on Communication, Control, and Computing, 2012.
A. L. Anderson and M. A. Jensen, Beamforming in large-scale MIMO multiuser links under a per-node power constraint, in Proc. International Symposium on Wireless Communication Systems (ISWCS), Paris, France, Aug. 2012.
J. Lee and S. Lee, A Compressed Analog Feedback Strategy for Spatially Correlated.
Massive MIMO Systems, in Proc. IEEE Vehicular Technology Conference (VTC), Quebec, Cananda, Sep. 2012.
H. Suzuki, I. B. Collings, D. Hayman, J. Pathikulangara, Z. Chen, and R. Kendall, Large-scale multiple antenna fixed wireless systems for rural areas, in Proc. IEEE PIMRC, Sep. 2012.
C. Lee, C-B. Chae, T. Kim, S. Choi, and J. Leez, Network Massive MIMO for Cell-Boundary Users: From a Precoding Normalization Perspective, IEEE Goblecom Workshops, 2012.
J. Zhang, C-K. Wen, S. Jin, X. Gao, and K-K. Wong, On Capacity of Large-Scale MIMO Multiple Access Channels with Distributed Sets of Correlated Antennas, IEEE J. Sel. Areas Commun, vol. 31, No. 2, pp. 133-148, Feb. 2013.
W. Yang, G. Durisi, and E. Riegler, On the Capacity of Large-MIMO Block-Fading Channel, IEEE J. Sel. Areas Commun, vol. 31, No. 2, pp. 117-132, Feb. 2013.
H. Suzuki, R. Kendall, K. Anderson, A. Grancea, D. Humphrey, J. Pathikulangara, K. Bengston, J. Matthews, and C. Russell, Highly Spectrally Efficient Ngara Rural Wireless Broadband Access Demonstrator, in Proc. IEEE International Symposium on Communications and Information Technologies (ISCIT), Oct. 2012.
P. S. Taluja and B. L. Hughes, Diversity Limits of Compact Broadband Multi-Antenna Systems, IEEE J. Sel. Areas Commun, vol. 31, No. 2, pp. 326-337, Feb. 2013.
E. P. Tsakalaki, O. N. Alrabadi, E. de Carvalho, and G. F. Pedersen, On the beamforming performance of large-scale antenna arrays, in Proc. Loughborough Antennas and Propagation Conference (LAPC), Nov. 2012.

(56) References Cited

OTHER PUBLICATIONS

N. Krishnan, R. D. Yates, and N. B. Mandayam, Cellular Systems with Many Antennas: Large System Analysis under Pilot Contamination, in Proc. of the 50th Annual Allerton Conference on Communication, Control, and Computing, 2012.
C. Guthy, W. Utschick, and M. L. Honig, Large System Analysis of Sum Capacity in the Gaussian MIMO Broadcast Channel, IEEE J. Sel. Areas Commun, vol. 31, No. 2, pp. 149-159, Feb. 2013.
H. Yin, D. Gesbert, M. Filippou, and Y. Liu, A Coordinated Approach to Channel Estimation in Large-scale Multiple-antenna Systems, IEEE J. Sel. Areas Commun, vol. 31, No. 2, pp. 264-273, Feb. 2013.
O. N. Alrabadi, E. Tsakalaki, H. Huang, and G. F. Pedersen, Beamforming via Large and Dense Antenna Arrays above a Clutter, IEEE J. Sel. Areas Commun, vol. 31, No. 2, pp. 314-325, Feb. 2013.
M. Hong, R-Y. Sun, H. Baligh, Z-Q. Luo, Joint Base Station Clustering and Beamformer Design for Partial Coordinated Transmission in Heterogenous Networks, IEEE J. Sel. Areas Commun, vol. 31, No. 2, pp. 226-240, Feb. 2013.
R. Aggarwal, C. E. Koksal, and P. Schniter, On the Design of Large Scale Wireless Systems, IEEE J. Sel. Areas Commun, vol. 31, No. 2, pp. 215-225, Feb. 2013.
C. Studer and E. G. Larsson, PAR-Aware Large-Scale Multi-User MIMO-OFDM Downlink, IEEE J. Sel. Areas Commun, vol. 31, No. 2, pp. 303-313, Feb. 2013.
A. Ozgur, O. Leveque, and D. Tse, Spatial Degrees of Freedom of Large Distributed MIMO Systems and Wireless Ad Hoc Networks, IEEE J. Sel. Areas Commun, vol. 31, No. 2, pp. 202-214, Feb. 2013.
M. Matthaiou, C. Zhong, M. R. McKay, and T. Ratnarajah, Sum Rate Analysis of ZF Receivers in Distributed MIMO Systems, IEEE J. Sel. Areas Commun, vol. 31, No. 2, pp. 180-191, Feb. 2013.
S. Govindasamy, D. W. Bliss, and D. H. Staelin, Asymptotic Spectral Efficiency of the Uplink in Spatially Distributed Wireless Networks With Multi-Antenna Base Stations, IEEE Trans. Commun., vol. 61, No. 7, Jul. 2013.
K. Takeuchi, R. Muller, M. Vehkapera, and T. Tanaka, On an Achievable Rate of Large Rayleigh Block-Fading MIMO Channels with No CSI, IEEE Trans. Inform. Theory, 2011, submitted.
Q. Zhou and X. Ma, An Improved LR-aided K-Best Algorithm for MIMO Detection, in Proc. IEEE International Conference on Wireless Communications and Signal Processing (WCSP) 2012.
H. Q. Ngo, E. G. Larsson, and T. L. Marzetta, The multicell multiuser MIMO uplink with very large antenna arrays and a finite-dimensional channel, IEEE Trans. Commun., vol. 61, No. 6, pp. 2350-2361, Jun. 2013.
S. Nguyen and A. Ghrayeb, Compressive sensing-based channel estimation for massive multiuser MIMO systems, in Proc. IEEE WCNC, Shanghai, China, Apr. 2013.
Tanumay Datta, N. Ashok Kumar, A. Chockalingam, and B. Sundar Rajan, A Novel Monte Carlo Sampling Based Receiver for Large-Scale Uplink Multiuser MIMO Systems, IEEE Trans. Veh. Technol., vol. 62, No. 7, pp. 3019-3038, Jan. 29, 2012.
S. K. Mohammed and E. G. Larsson, Constant-Envelope Multi-User Precoding for Frequency-Selective Massive MIMO Systems, IEEE Wireless Commun. Lett., vol. 2, No. 5, pp. 547-550, Oct. 2013.
M. Wu, B. Yin, A. Vosoughi, C. Studer, J. R. Cavallaro, and C. Dick, Approximate matrix inversion for high-throughput data detection in the large-scale MIMO uplink, IEEE International Symposium on Circuits and Systems (ISCAS), May 2013.
X. Dai, S. Sun and Y. Wang, Reduced-complexity performance-lossless (quasi-)maximum-likelihood detectors for S-QAM modulated MIMO systems, Electronics Letters, vol. 49, No. 11, pp. 724-725, May 2013.
Yin, M. Wu, C. Studer, J. R. Cavallaro, and C. Dick, Implementation trade-offs for linear detection in large-scale MIMO systems, Proc. IEEE International Conference on Acoustics, Speech, and Signal Processing (ICASSP), May 2013.
Masouros, M. Sellathurai, and T. Ratnarajah, Large-Scale MIMO Transmitters in Fixed Physical Spaces: The Effect of Transmit Correlation and Mutual Coupling, IEEE Trans. Commun., vol. 61, No. 7, pp. 2794-2804, Jul. 2013.
H. A. Suraweera, H. Q. Ngo, T. Q. Duong, C. Yuen, and E. G. Larsson, Multi-Pair Amplify-and-Forward Relaying with Very Large Antenna Arrays, in Proc. IEEE International Conference on Communicatons (ICC), Budapest, Hungary, Jun. 2013.
Y. Zeng, R. Zhang, Z. N. Chen, Electromagnetic Lens-focusing Antenna Enabled Massive MIMO, Jun. 6, 2013, pp. 1-7.
K. Hosseini, J. Hoydis, S. ten Brink, and M. Debbah, Massive MIMO and Small Cells: How to Densify Heterogeneous Networks, IEEE ICC 2013, Wireless Communications Symposium, pp. 5442-5447.
Y. Huang, C. W. Tan, and B. D. Rao, Joint Beamforming and Power Control in Coordinated Multicell: Max-Min Duality, Effective Network and Large System Transition, IEEE Trans. Wireless Commun., Jun. 27, 2013, pp. 1-14.
P. Svac, F. Meyer, E. Riegler, and F. Hlawatsch, Soft-Heuristic Detectors for Large MIMO Systems, IEEE Trans. Signal Processing, vol. 61, No. 18, pp. 4573-4586, Sep. 2013.
K. T. Truong and R. W. Heath, Jr., Effects of Channel Aging in Massive MIMO Systems, Journal of Communications and Networks, Special Issue on Massive MIMO, vol. 15, No. 4, pp. 338-351, Jul. 12. 2013.
B. Kouassi, I. Ghauri, and L. Deneire, Reciprocity-Based Cognitive Transmissions using a MU Massive MIMO Approach, in Proc. IEEE International Conference on Communications (ICC), Budapest, Hungary, Jun. 2013, pp. 1331-1335.
A. Hakkarainen, J. Werner, K. R. Dandekar, and M. Valkama, Widely-Linear Beamforming and RF Impairment Suppression in Massive Antenna Arrays, Journal of Communications and Networks, vol. 15, No. 4 (Special Issue on Massive MIMO), pp. 383-397, Aug. 2013.
S. Nguyen and A. Ghrayeb, Precoding for Multicell MIMO Systems with Compressive Rank-q Channel Approximation, in Proc. IEEE PIMRC, Fundamentals and PHY Track, London, UK, Sep. 2013, pp. 1227-1232.

\* cited by examiner

- i.i.d. channel model *(low TX-spatial correlation, low power imbalance)*

| | | | | | | |
|---|---|---|---|---|---|---|
| 0.0000 | 0.4400 | 0.0000 | 0.0000 | 0.0000 | 0.0000 | 0.0000 |
| 0.0000 | 1.6667 | 0.0000 | 0.0000 | 0.0000 | 0.0000 | 0.0000 |
| 0.0000 | 0.0000 | 1.3333 | 0.0000 | 0.0000 | 0.0000 | 0.0000 |
| 0.0000 | 0.0000 | 0.0000 | 1.0000 | 0.0000 | 0.0000 | 0.0000 |
| 0.0000 | 0.0000 | 0.0000 | 0.0000 | 0.6667 | 0.0000 | 0.0000 |
| 0.0000 | 0.0000 | 0.0000 | 0.0000 | 0.0000 | 0.3333 | 0.3333 |

$\rho_c = 0.00001, \rho_a = 1$

- High cross-correlation *(high TX-spatial correlation, low power imbalance)*

| | | | | | | |
|---|---|---|---|---|---|---|
| 1.0000 | 0.8000 | 0.6400 | 0.5120 | 0.4096 | 0.3277 |
| 0.8000 | 1.6667 | 0.8000 | 0.6400 | 0.5120 | 0.4096 |
| 0.6400 | 0.8000 | 1.3333 | 0.8000 | 0.6400 | 0.5120 |
| 0.5120 | 0.6400 | 0.8000 | 1.0000 | 0.8000 | 0.6400 |
| 0.4096 | 0.5120 | 0.6400 | 0.8000 | 0.6667 | 0.8000 |
| 0.3277 | 0.4096 | 0.5120 | 0.6400 | 0.8000 | 0.3333 |

$\rho_c = 0.8, \rho_a = 1$

- High auto-correlation *(low TX-spatial correlation, high power imbalance)*

| | | | | | | |
|---|---|---|---|---|---|---|
| 5.9000 | 0.0000 | 0.0000 | 0.0000 | 0.0000 | 0.0000 |
| 0.0000 | 0.0333 | 0.0000 | 0.0000 | 0.0000 | 0.0000 |
| 0.0000 | 0.0000 | 0.0267 | 0.0000 | 0.0000 | 0.0000 |
| 0.0000 | 0.0000 | 0.0000 | 0.0200 | 0.0000 | 0.0000 |
| 0.0000 | 0.0000 | 0.0000 | 0.0000 | 0.0133 | 0.0000 |
| 0.0000 | 0.0000 | 0.0000 | 0.0000 | 0.0000 | 0.0067 |

$\rho_c = 0.00001, \rho_a = 5.9$

Fig. 5

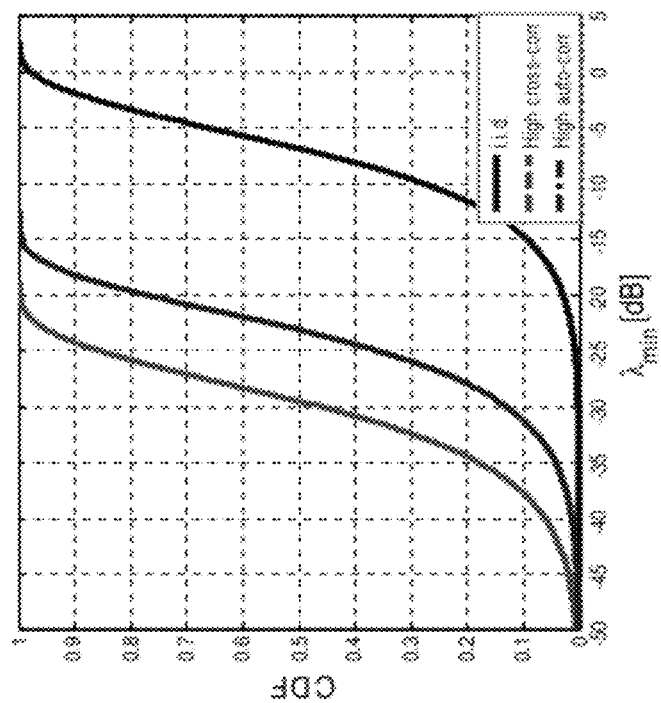
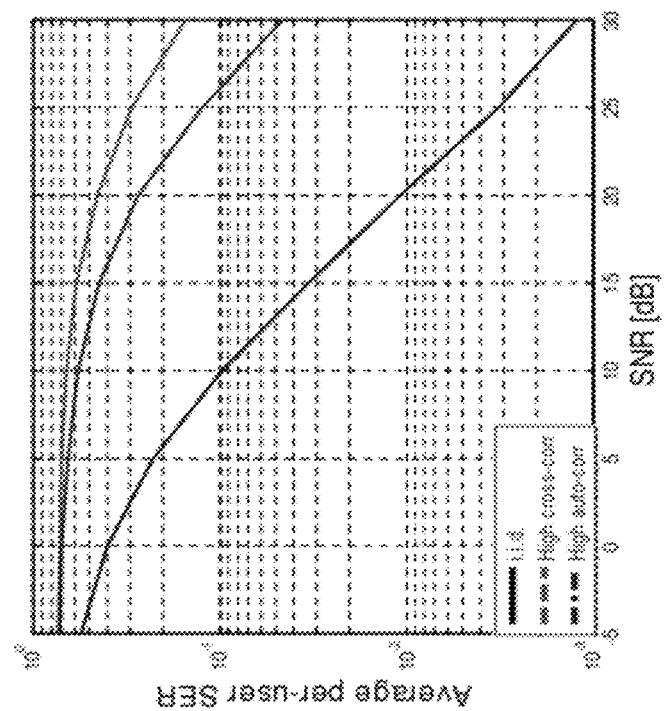
Fig. 6

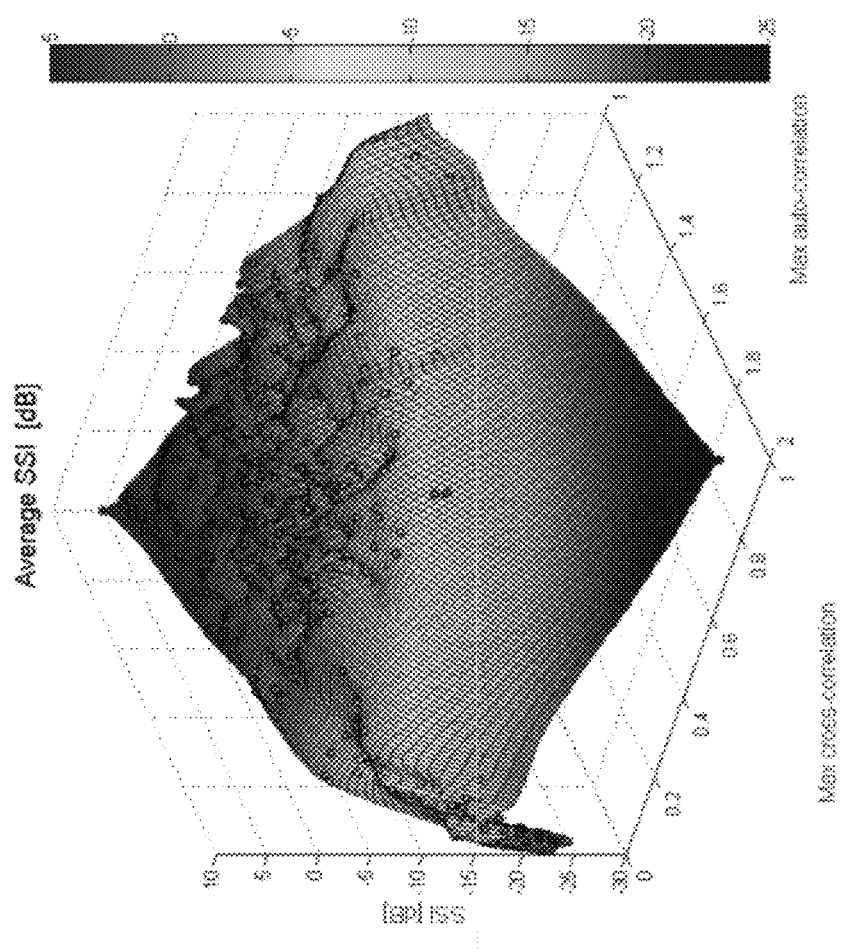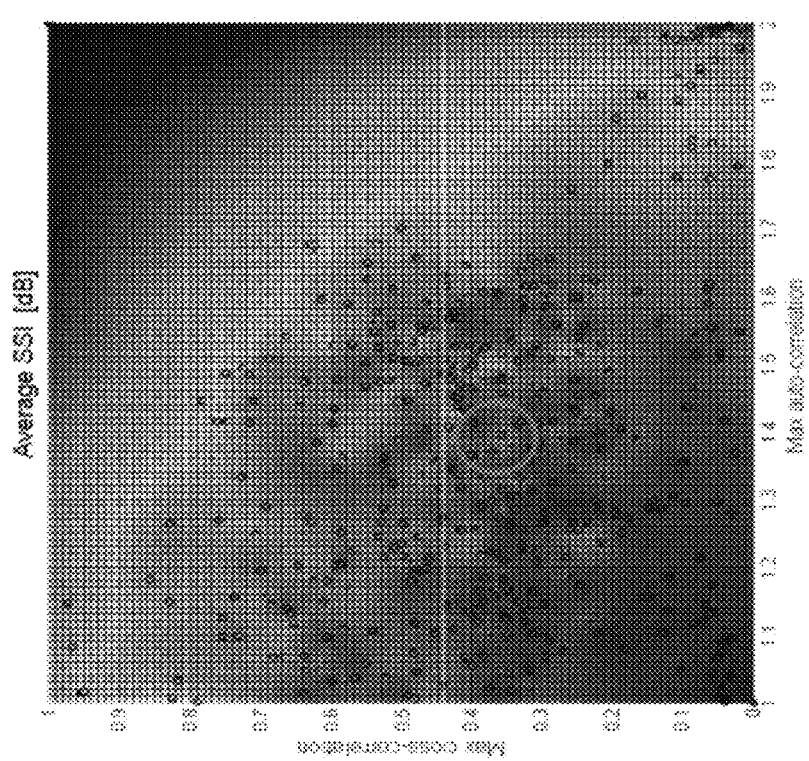
Fig. 8

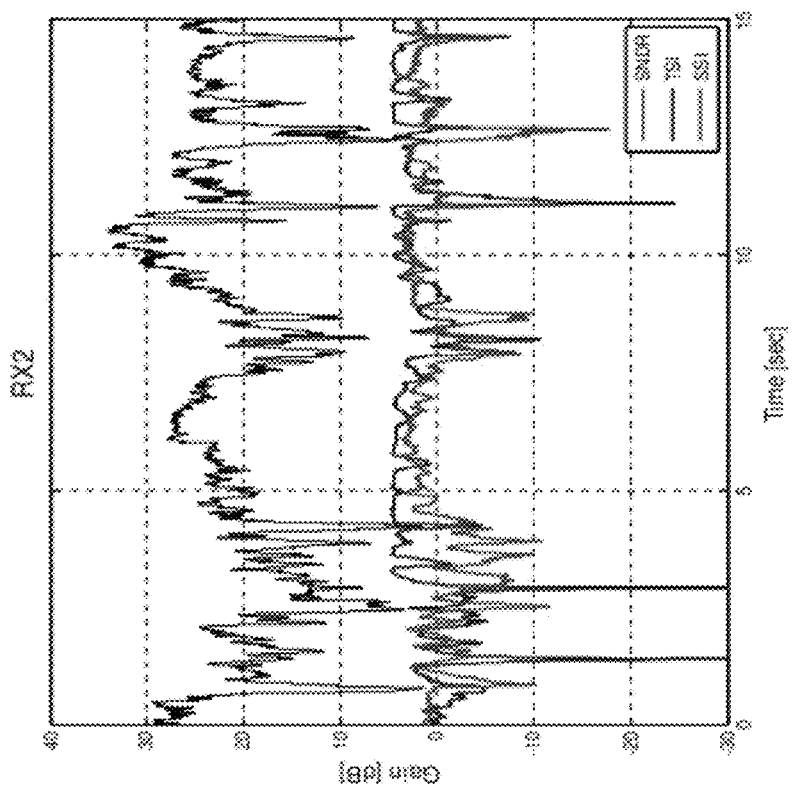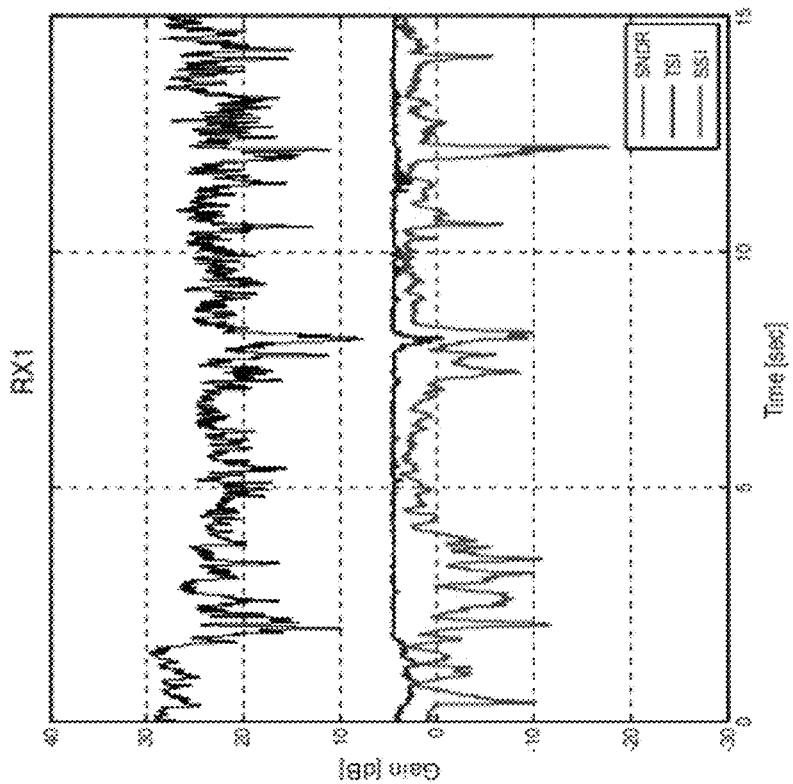
Fig. 12

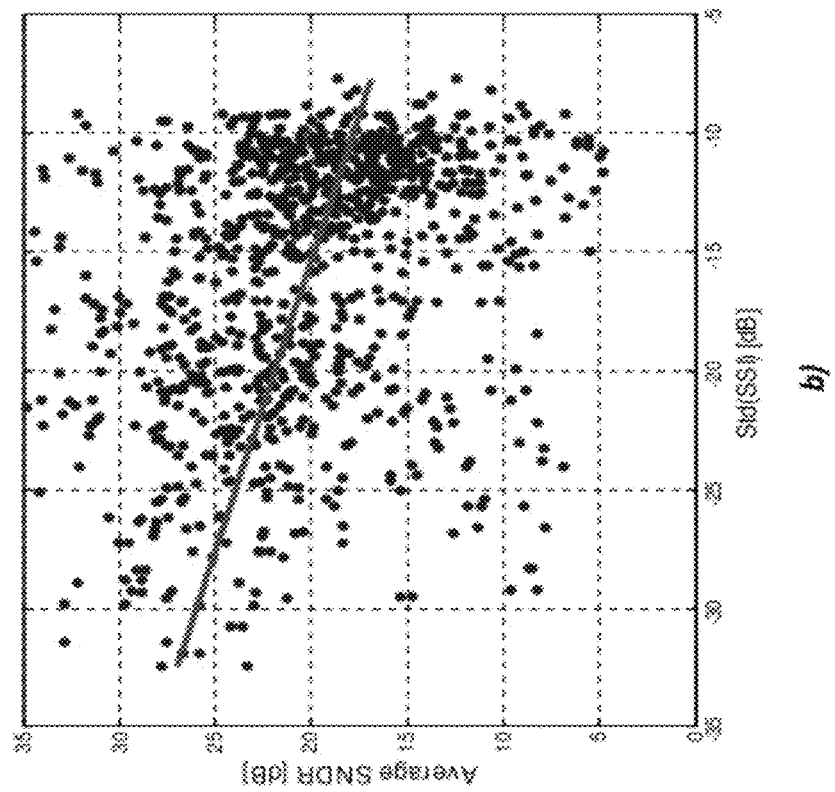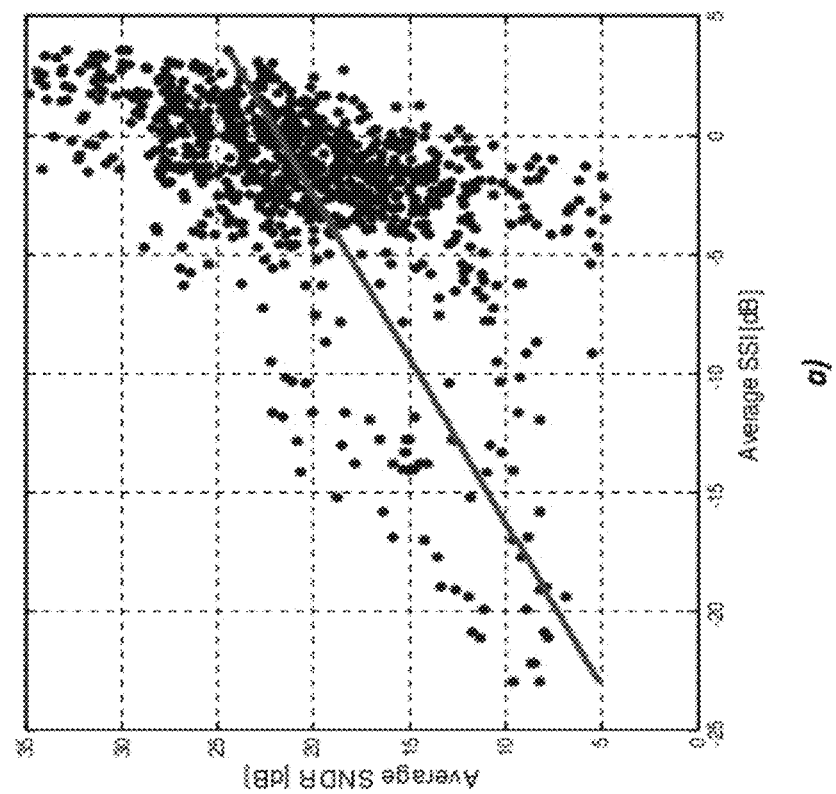
Fig. 15

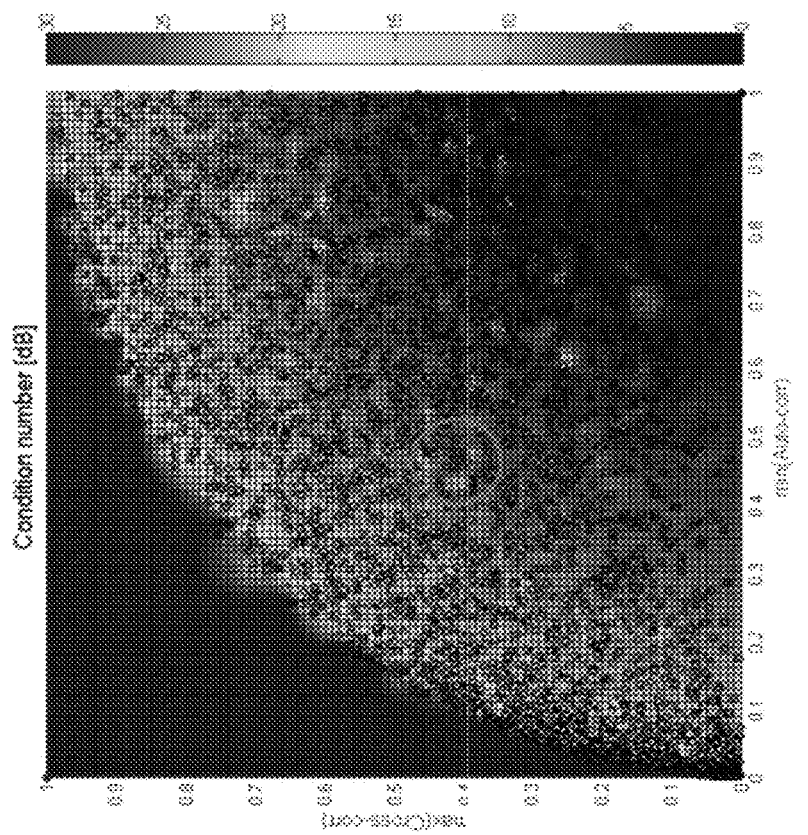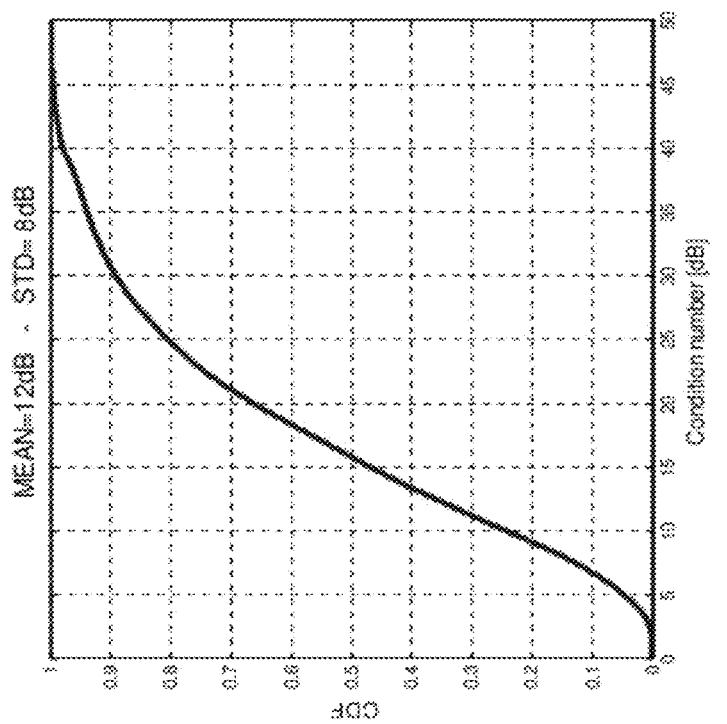
Fig. 17

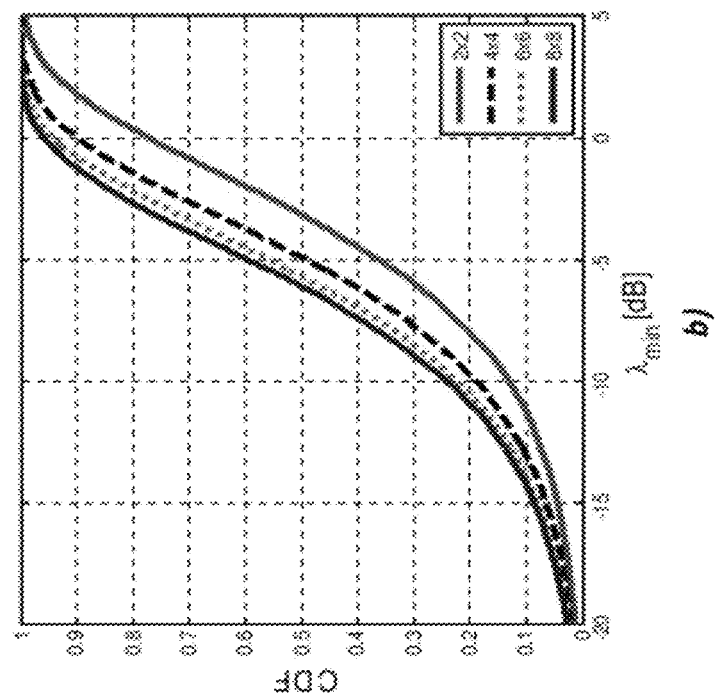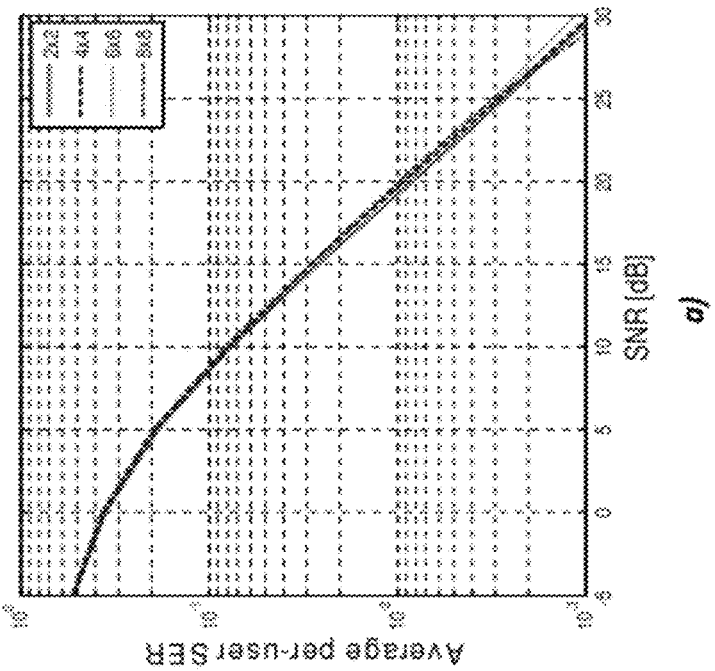
Fig. 20

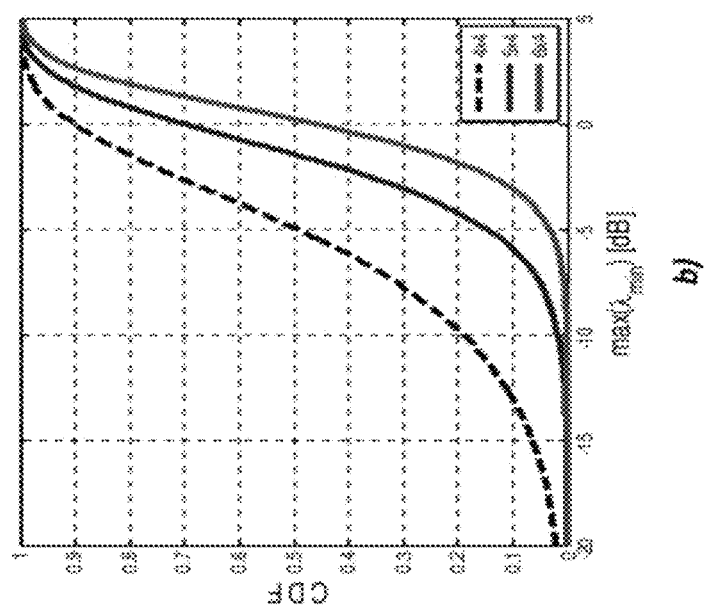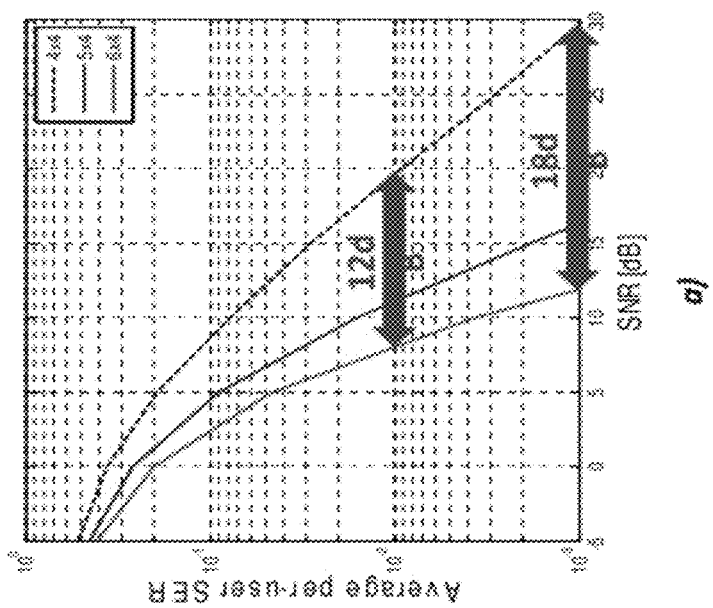
*Fig. 21*

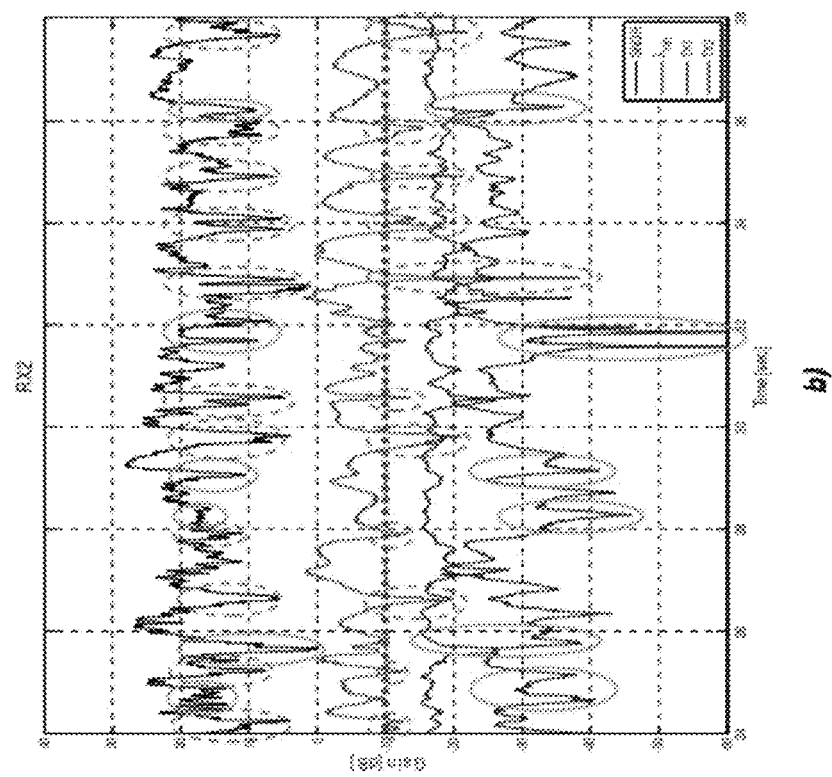
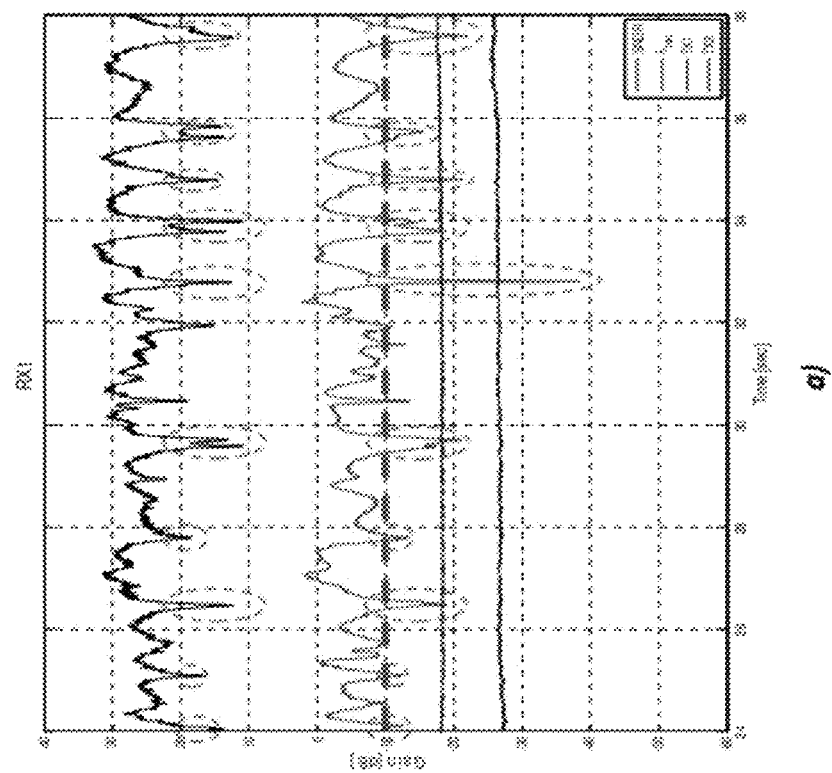
Fig. 23

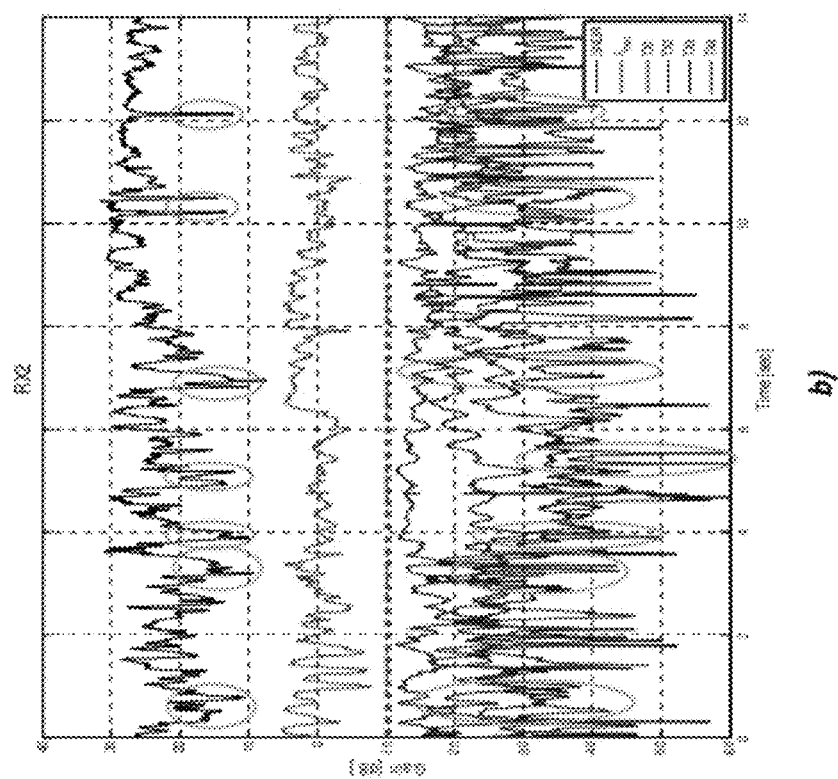
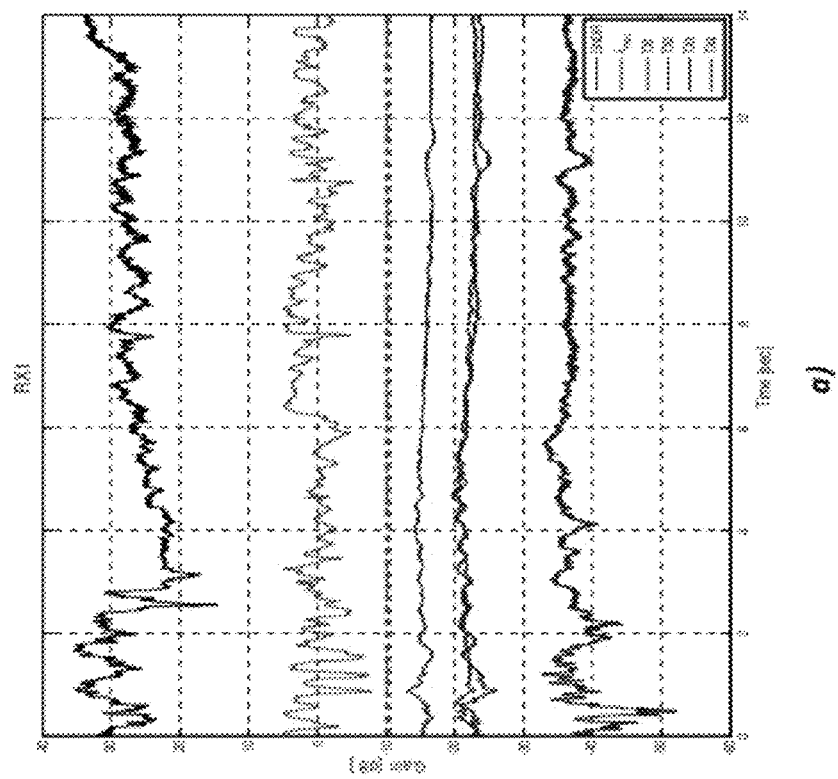
Fig. 24

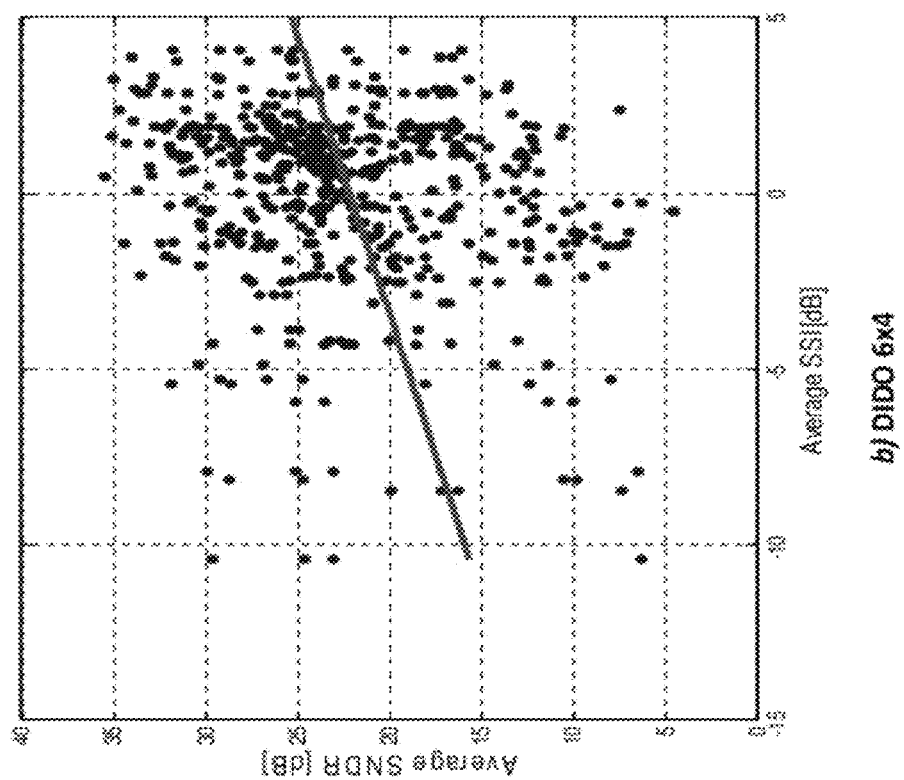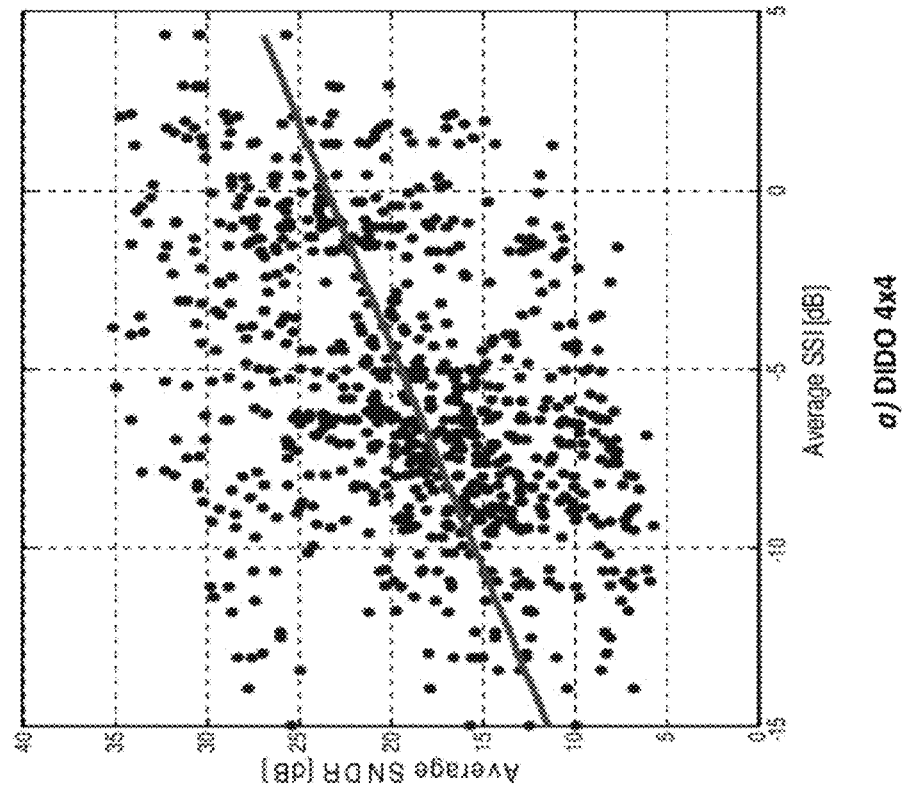
Fig. 30

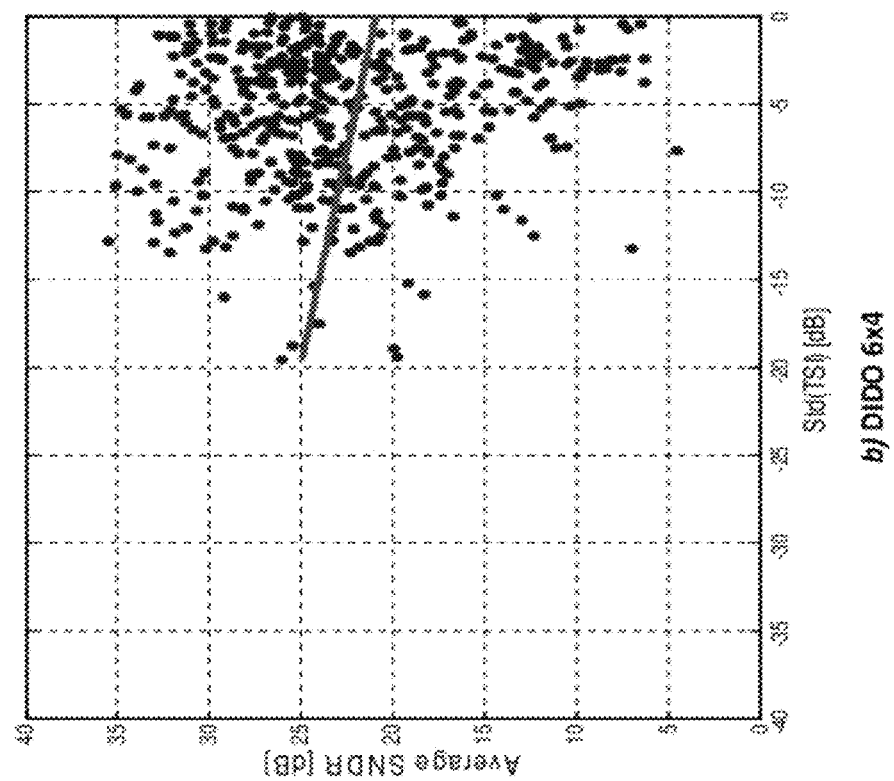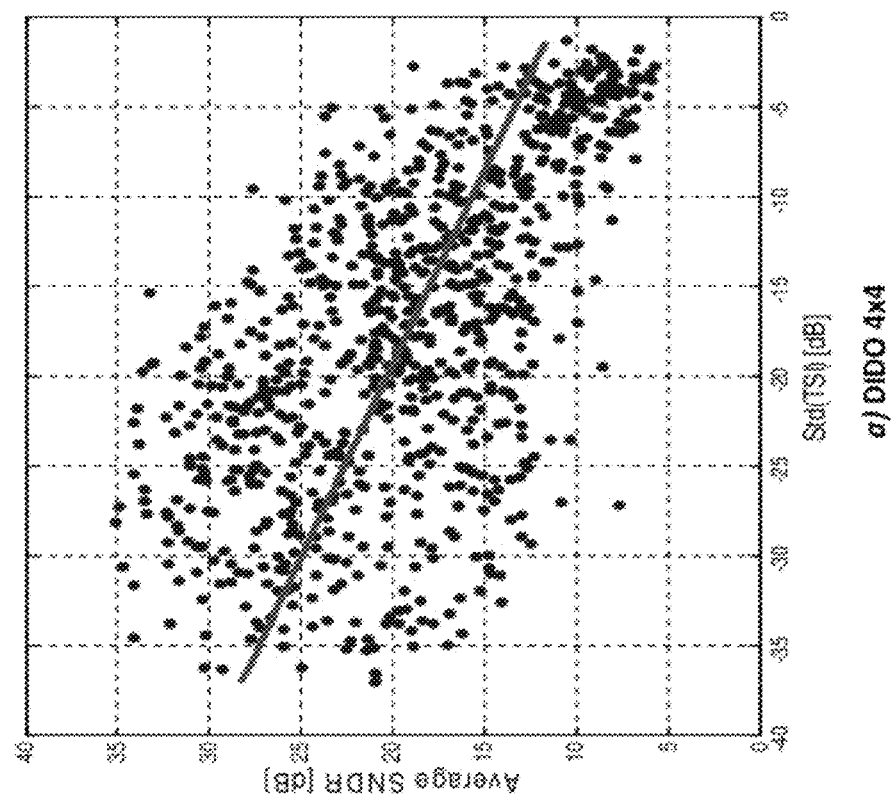
Fig. 32

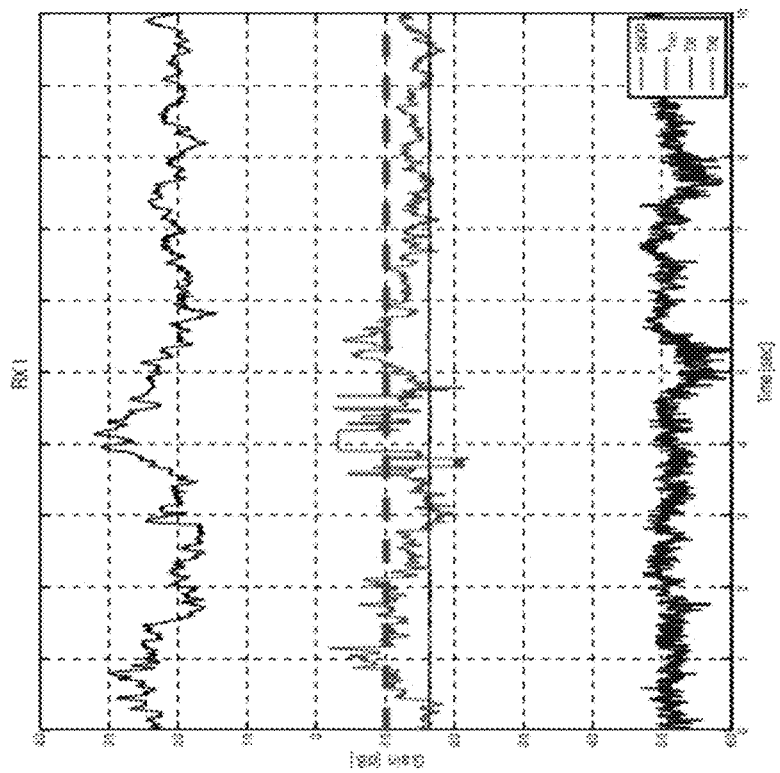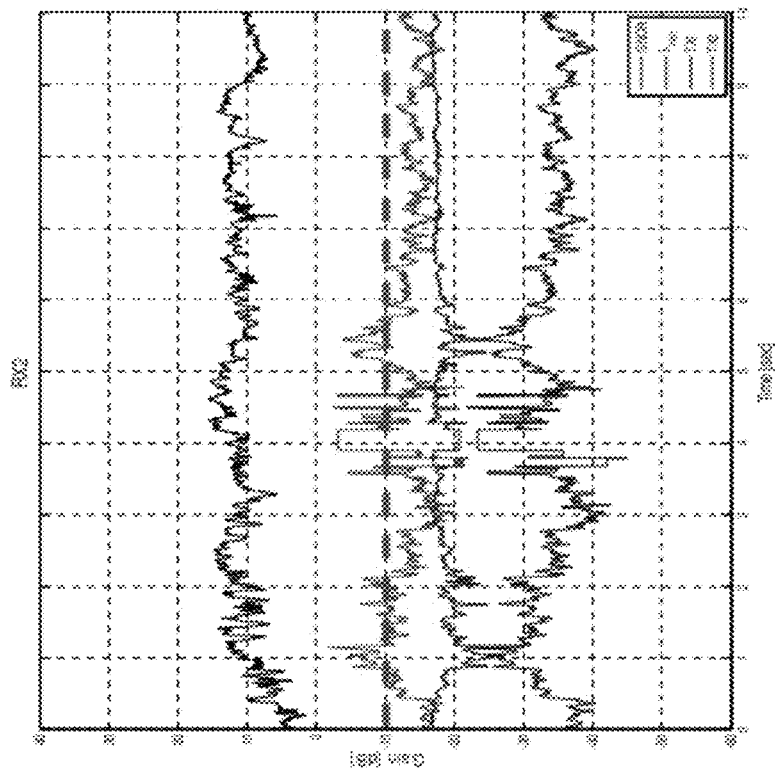
Fig. 44

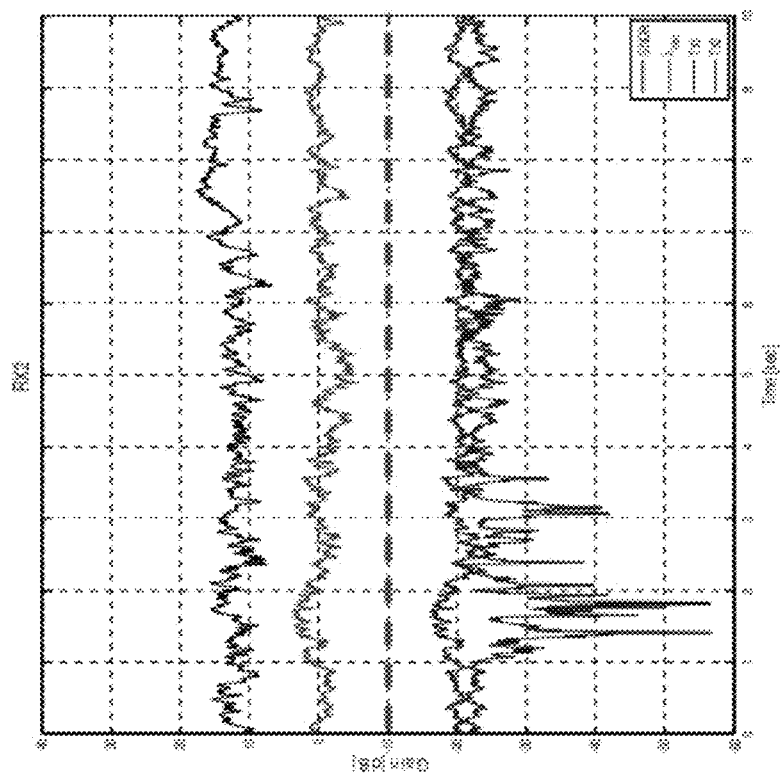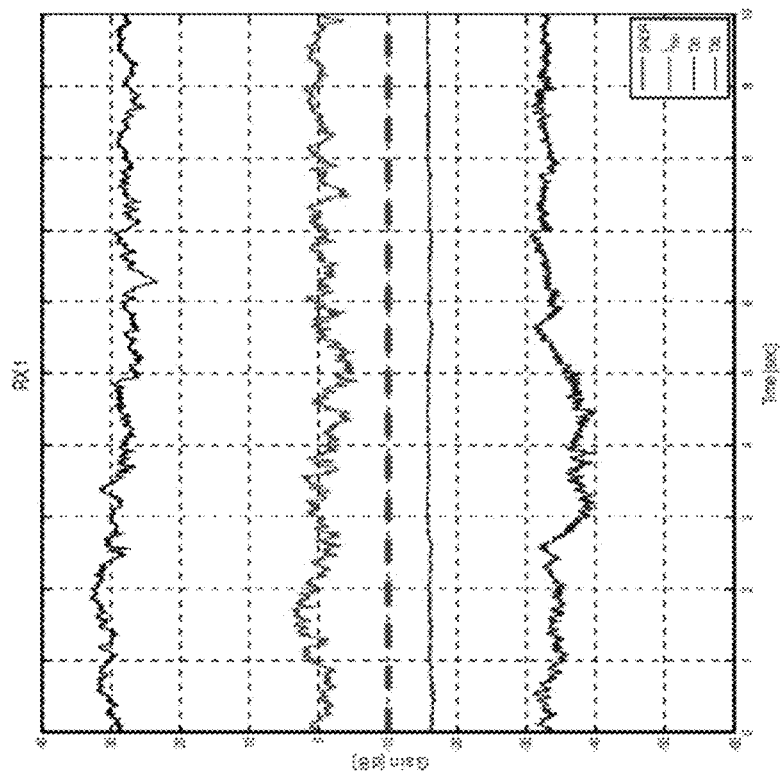
Fig. 45

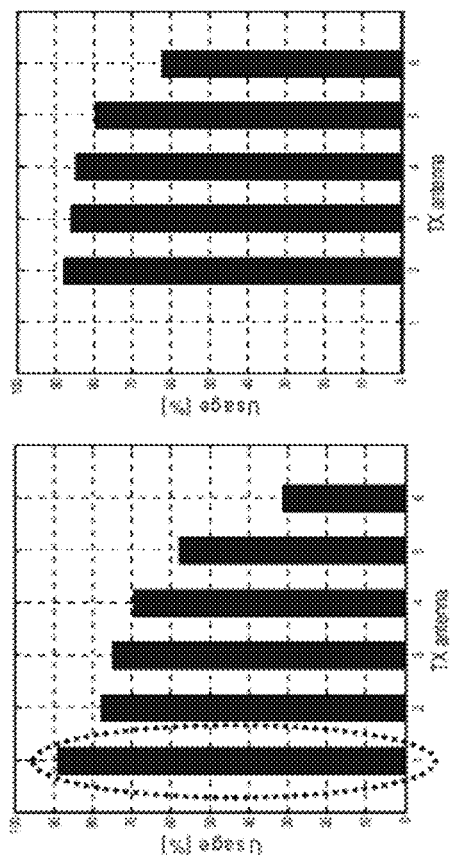
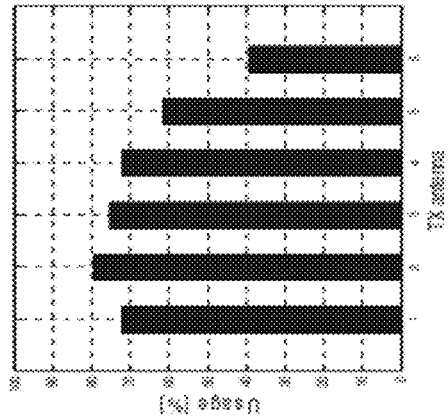
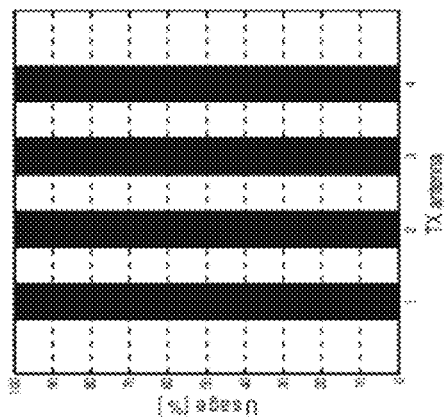
Fig. 53

SYSTEMS AND METHODS TO ENHANCE SPATIAL DIVERSITY IN DISTRIBUTED-INPUT DISTRIBUTED-OUTPUT WIRELESS SYSTEMS

RELATED APPLICATIONS

This application is a continuation-in-part of the following co-pending U.S. patent applications and issued patents:

U.S. application Ser. No. 13/464,648, entitled "System and Methods to Compensate for Doppler Effects in Distributed-Input Distributed Output Systems."

U.S. application Ser. No. 12/917,257, entitled "Systems And Methods To Coordinate Transmissions In Distributed Wireless Systems Via User Clustering"

U.S. application Ser. No. 12/802,988, entitled "Interference Management, Handoff, Power Control And Link Adaptation In Distributed-Input Distributed-Output (DIDO) Communication Systems"

U.S. Pat. No. 8,170,081, issued May 1, 2012, entitled "System And Method For Adjusting DIDO Interference Cancellation Based On Signal Strength Measurements"

U.S. application Ser. No. 12/802,974, entitled "System And Method For Managing Inter-Cluster Handoff Of Clients Which Traverse Multiple DIDO Clusters"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,958, entitled "System And Method For Power Control And Antenna Grouping In A Distributed-Input-Distributed-Output (DIDO) Network"

U.S. application Ser. No. 12/802,975, entitled "System And Method For Link adaptation In DIDO Multicarrier Systems"

U.S. application Ser. No. 12/802,938, entitled "System And Method For DIDO Precoding Interpolation In Multicarrier Systems"

U.S. application Ser. No. 12/630,627, entitled "System and Method For Distributed Antenna Wireless Communications"

U.S. Pat. No. 7,599,420, issued Oct. 6, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,636,381, issued Dec. 22, 2009, entitled "System and Method for Distributed Input Distributed Output Wireless Communication";

U.S. Pat. No. 8,160,121, issued Apr. 17, 2012, entitled "System and Method For Distributed Input-Distributed Output Wireless Communications";

U.S. application Ser. No. 11/256,478, entitled "System and Method For Spatial-Multiplexed Tropospheric Scatter Communications";

U.S. Pat. No. 7,418,053, issued Aug. 26, 2008, entitled "System and Method for Distributed Input Distributed Output Wireless Communication";

U.S. application Ser. No. 10/817,731, entitled "System and Method For Enhancing Near Vertical Incidence Skywave ("NVIS") Communication Using Space-Time Coding."

BACKGROUND

Prior art multi-user wireless systems add complexity and introduce limitations to wireless networks which result in a situation where a given user's experience (e.g. available bandwidth, latency, predictability, reliability) is impacted by the utilization of the spectrum by other users in the area. Given the increasing demands for aggregate bandwidth within wireless spectrum shared by multiple users, and the increasing growth of applications that can rely upon multi-user wireless network reliability, predictability and low latency for a given user, it is apparent that prior art multi-user wireless technology suffers from many limitations. Indeed, with the limited availability of spectrum suitable for particular types of wireless communications (e.g. at wavelengths that are efficient in penetrating building walls), prior art wireless techniques will be insufficient to meet the increasing demands for bandwidth that is reliable, predictable and low-latency.

BRIEF DESCRIPTION OF THE DRAWINGS

A better understanding of the present invention can be obtained from the following detailed description in conjunction with the drawings, in which:

FIG. 5 illustrates simulated transmit covariance matrices for DIDO 6×6 systems with three models.

FIG. 6 illustrates the cumulative density function (CDF) of the diversity metric as well as the symbol error rate (SER) performance as a function of the signal-to-noise ratio (SNR) for three channel models.

FIG. 8 illustrates space selectivity indicator (SSI) as a function of the maximum auto-correlation and cross-correlation coefficients of the spatial covariance matrix.

FIG. 12 illustrates combined plots containing SNDR, TSI, and SSI.

FIG. 15 illustrates the SNDR versus the average SSI (a) and standard deviation of the SSI (b).

FIG. 17a illustrates the CN defined in equation (7) plotted as a function of the minimum auto-correlation coefficient and maximum cross-correlation coefficient, where every dot is the result of 100 msec of data.

FIG. 17b illustrates the CDF of the SSI defined as the CN.

FIG. 18 illustrates a three dimensional version of FIG. 17a.

FIG. 20 illustrates the performance of different order DIDO systems in i.i.d. channels assuming same per-antenna transmit power.

FIG. 21 illustrates the simulated performance of DIDO 4×4 in i.i.d. channels.

FIG. 23 illustrates the traces of SNDR, SSI (indicated as $\lambda_{min}$) and TSI (being the absolute value of the complex channel gain from every transmitter indicated as T×1, . . . , M).

FIG. 24 illustrates the results obtained over the same route as in FIG. 23, but using two extra antennas.

FIG. 30 illustrates results for DIDO 4×4 and 6×4.

FIG. 32 illustrates results for DIDO 4×4 and 6×4.

FIGS. 44-46 illustrate the channel traces (SNDR, SSI and TSI) for three different cases: i) DIDO 2×2 without transmit power balancing method; ii) DIDO 2×2 with transmit power balancing method; iii) DIDO 4×2 with transmit power balancing method in combination with antenna selection method.

FIG. 53 shows the statistics of the BTSs that have been selected for transmission and their relative usage.

DETAILED DESCRIPTION

Figure 1:
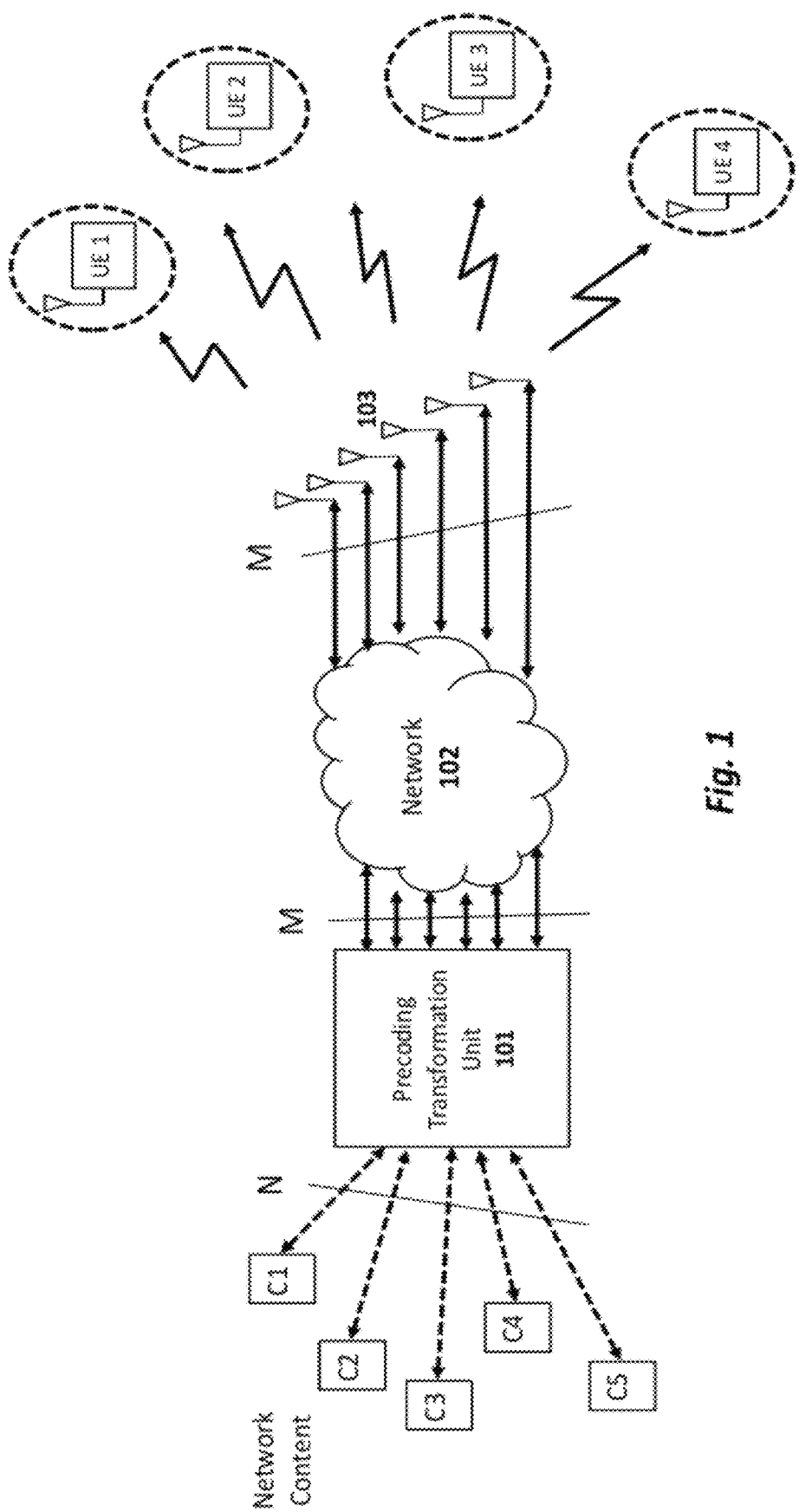
FIG. 1 illustrates one embodiment of a multi-user (MU) multiple antenna system (MAS), or MU-MAS, consisting of a precoding transformation unit.

One solution to overcome many of the above prior art limitations is an embodiment of Distributed-Input Distributed-Output (DIDO) technology. DIDO technology is described in the following patents and patent applications, all of which are assigned the assignee of the present patent and are incorporated by reference. These patents and applications are sometimes referred to collectively herein as the "related patents and applications."

U.S. application Ser. No. 13/464,648, entitled "System and Methods to Compensate for Doppler Effects in Distributed-Input Distributed Output Systems."

U.S. application Ser. No. 12/917,257, entitled "Systems And Methods To Coordinate Transmissions In Distributed Wireless Systems Via User Clustering"

U.S. application Ser. No. 12/802,988, entitled "Interference Management, Handoff, Power Control And Link Adaptation In Distributed-Input Distributed-Output (DIDO) Communication Systems"

U.S. Pat. No. 8,170,081, issued May 1, 2012, entitled "System And Method For Adjusting DIDO Interference Cancellation Based On Signal Strength Measurements"

U.S. application Ser. No. 12/802,974, entitled "System And Method For Managing Inter-Cluster Handoff Of Clients Which Traverse Multiple DIDO Clusters"

U.S. application Ser. No. 12/802,989, entitled "System And Method For Managing Handoff Of A Client Between Different Distributed-Input-Distributed-Output (DIDO) Networks Based On Detected Velocity Of The Client"

U.S. application Ser. No. 12/802,958, entitled "System And Method For Power Control And Antenna Grouping In A Distributed-Input-Distributed-Output (DIDO) Network"

U.S. application Ser. No. 12/802,975, entitled "System And Method For Link adaptation In DIDO Multicarrier Systems"

U.S. application Ser. No. 12/802,938, entitled "System And Method For DIDO Precoding Interpolation In Multicarrier Systems"

U.S. application Ser. No. 12/630,627, entitled "System and Method For Distributed Antenna Wireless Communications"

U.S. Pat. No. 7,599,420, issued Oct. 6, 2009, entitled "System and Method for Distributed Input Distributed Output Wireless Communication";

U.S. Pat. No. 7,633,994, issued Dec. 15, 2009, entitled "System and Method for Distributed Input Distributed Output Wireless Communication";

U.S. Pat. No. 7,636,381, issued Dec. 22, 2009, entitled "System and Method for Distributed Input Distributed Output Wireless Communication";

U.S. Pat. No. 8,160,121, issued Apr. 17, 2012, entitled, "System and Method For Distributed Input-Distributed Output Wireless Communications";

U.S. application Ser. No. 11/256,478, entitled "System and Method For Spatial-Multiplexed Tropospheric Scatter Communications";

U.S. Pat. No. 7,418,053, issued Aug. 26, 2008, entitled "System and Method for Distributed Input Distributed Output Wireless Communication";

U.S. application Ser. No. 10/817,731, entitled "System and Method For Enhancing Near Vertical Incidence Skywave ("NVIS") Communication Using Space-Time Coding."

To reduce the size and complexity of the present patent application, the disclosure of some of the related patents and applications is not explicitly set forth below. Please see the related patents and applications for a full detailed description of the disclosure.

1. System Model

Described below is a multi-user (MU) multiple antenna system (MAS), or MU-MAS, consisting of a precoding transformation unit 101, a network 102 and M transceiver stations 103 communicating wirelessly to N client devices UE1-UE4, as depicted in FIG. 1. The precoding transformation unit 101 receives N streams of information with different network contents (e.g., videos, web-pages, video games, text, voice, etc., streamed from Web servers or other network sources C1-C5) intended for different client devices. Hereafter, we use the term "stream of information" to refer to any stream of data sent over the network containing information that can be demodulated or decoded as a standalone stream, according to certain modulation/coding scheme or protocol, to produce certain voice, data or video content. In one embodiment, the stream of information is a sequence of bits carrying network content that can be demodulated or decoded as a standalone stream. In one embodiment, this network content is delivered to the precoding transformation unit 101 via a network. Any type of network access technology may be used including wireline and wireless. Additionally, the network may be a local area network (e.g., LAN, WLAN, etc.), wide area network, the Internet, or any combination thereof.

In one embodiment, the precoding transformation unit 101 processes the channel state information (CSI) for each communication channel established with each client device UE1-UE4 to produce a precoding transformation. In another embodiment, channel quality information (e.g., signal-to-noise ratio, etc) or statistical channel information (e.g., spatial covariance matrix, etc.) are used to compute the precoding transformation. The precoding transformation can be linear (e.g., zero-forcing [1], block-diagonalization [2], matrix inversion, etc.) or non-linear (e.g., dirty-paper coding [3-5] or Tomlinson-Harashima precoding [6-7]).

In one embodiment, the precoding transformation unit 101 utilizes the precoding transformation to combine (according to certain algorithm) the N streams of information from the network content C1-C5 into M streams of bits. Hereafter, we use the term "stream of bits" to refer to any sequence of bits that does not necessarily contain any useful bit of information and as such cannot be demodulated or decoded as a standalone stream to retrieve the network content. In one embodiment of the invention, the stream of bits is the complex baseband signal produced by the precoding transformation unit and quantized over given number of bits to be sent to one of the M transceiver stations 103. In one embodiment, the M streams of bits are sent from the precoding transformation unit to the M transceiver stations 103 via the network 102 (which may be a wireline/wireless, Internet, wide area network, or local area network, or any combination thereof).

Finally, the M transceiver stations 103 send the streams of bits to the client devices UE1-UE4 that recover the streams of information and demodulate the network content. Note that the number of clients K in the system can be any value. For example, if K>M the extra (K−M) clients are multiplexed via different techniques described in the related patents and applications and in the prior art (e.g., TDMA, FDMA, OFDM, CDMA, etc.). Also, if K<=M but K<N, more than one stream of information is available for some of the client devices. Those client devices can demodulate multiple streams of information if they are equipped with multiple antennas by using existing MIMO or DIDO techniques.

One important feature of the present invention is that the MU-MAS transforms the streams of information into streams of bits sent over the network to the transceiver stations 103, such that the client devices UE1-UE4 can recover the stream of information when receiving the streams of bits simultaneously from all transceiver stations. We observe that, unlike prior art, the M streams of bits sent through the network are combinations of some or all N streams of information. As such, if a client device had to receive the stream of bits from only one of the M transceiver stations (even assuming good link quality and SNR from that station to the client), that information would be completely useless and it would be impossible to recover the original network content. It is only by receiving the streams of bits from all or a subset of the M transceiver stations that every client device can recover the streams of information and demodulate the network contents C1-C5.

Figure 2:
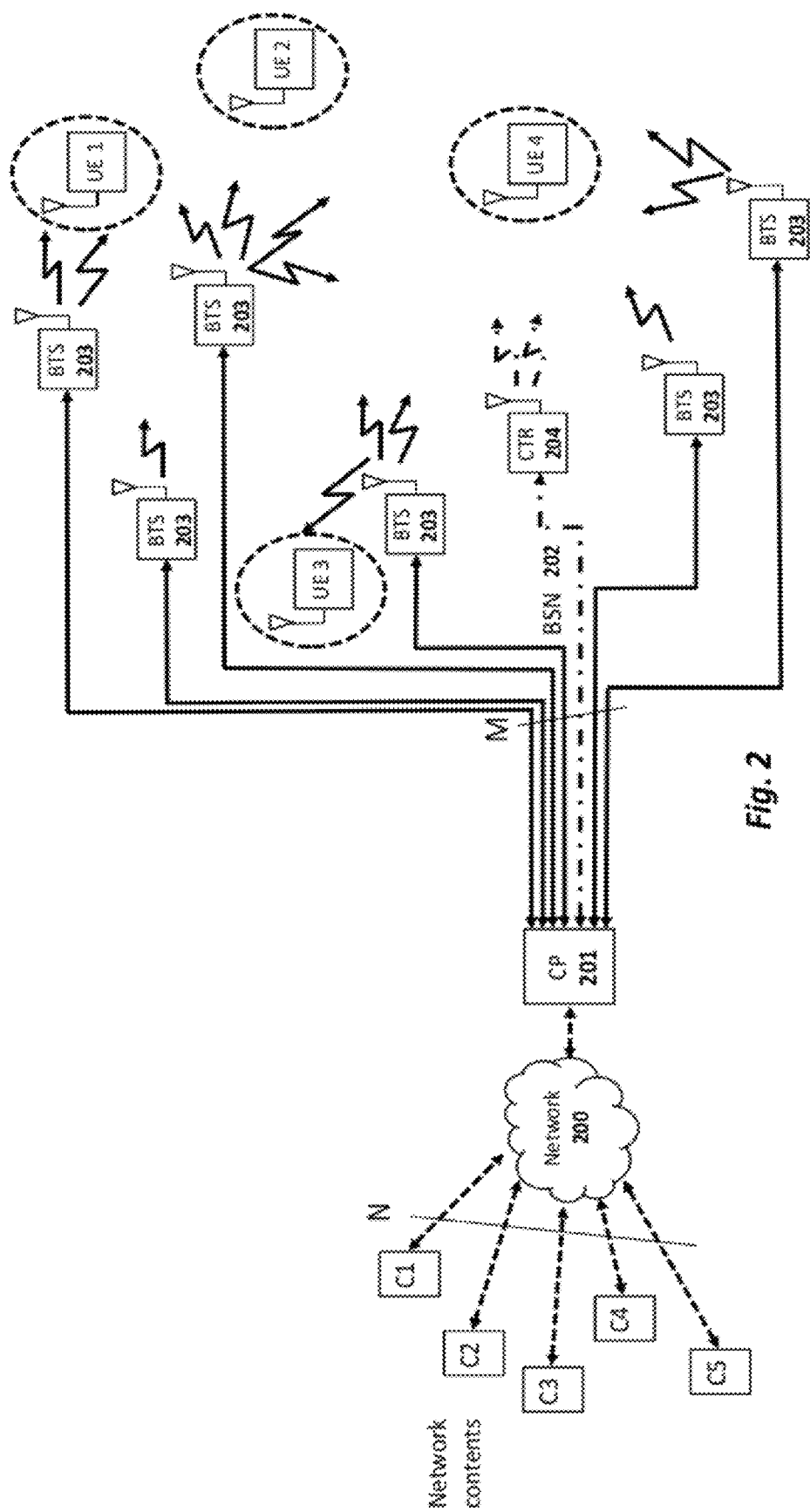
FIG. 2 illustrates one embodiment in which base transceiver stations (BTSs) are directly connected to a centralized processor (CP).
Figure 3:
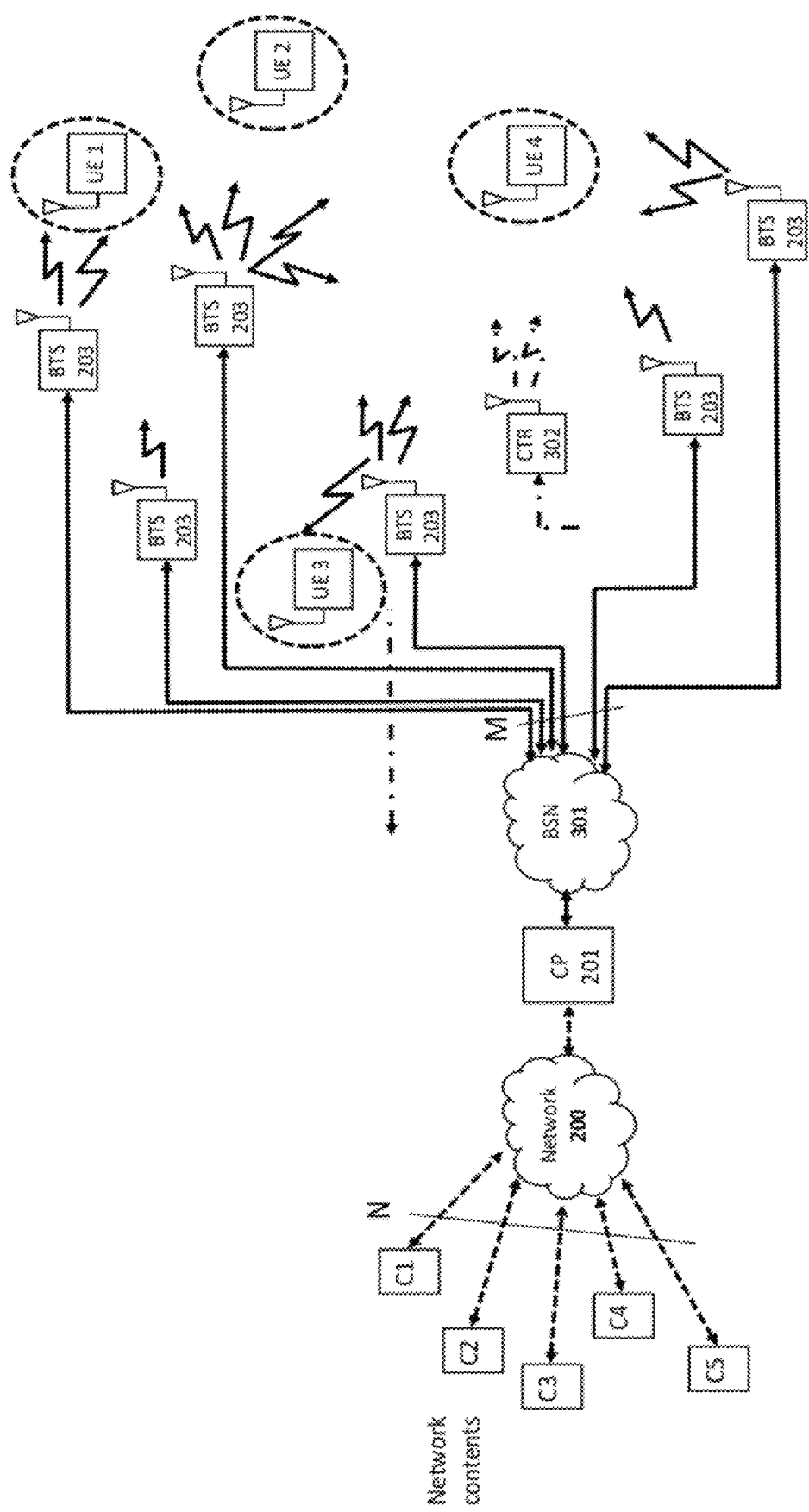
FIG. 3 illustrates an embodiment in which base transceiver stations (BTSs) are connected via a base station network.
Figure 4:
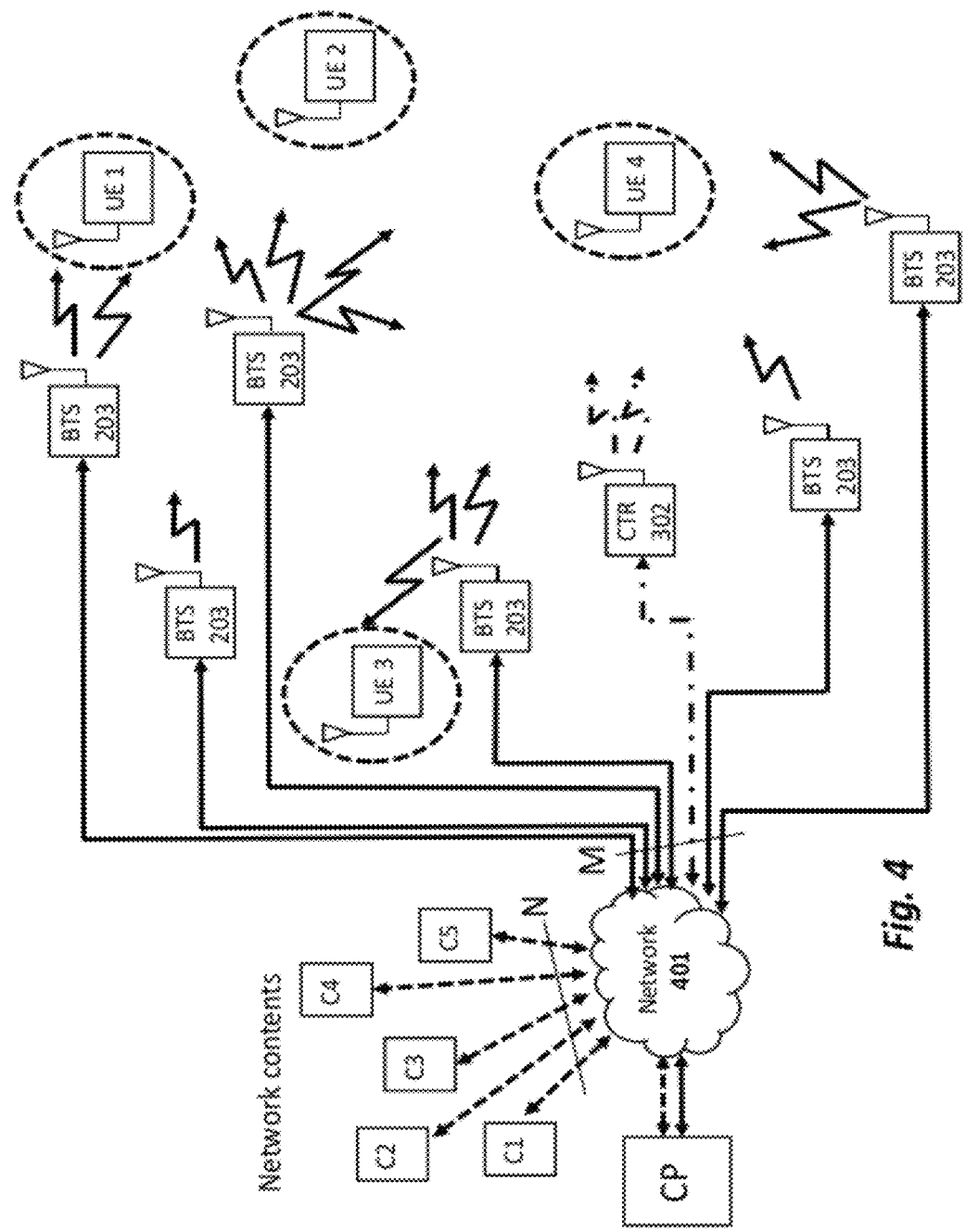
FIG. 4 illustrates another embodiment in which base transceiver stations (BTSs) are connected via a network.

In one embodiment of the invention, the MU-MAS is a distributed-input distributed-output (DIDO) system consisting of a centralized processor (CP) 201, base transceiver stations (BTSs) 203, and user equipment (UEs) UE1-UE4 as shown in FIG. 2 and described in the related patents and applications referenced above. The BTSs can either be directly connected to the CP 201 as in FIG. 2 or via the base station network (BSN) 301 as depicted in FIG. 3. In another embodiment, the network contents C1-C5 and the BTSs 203 are both connected to the CP 201 via the same network 401 as in FIG. 4, which may be a wireline/wireless local area network, wide area network, and/or the Internet.

For client devices to reliably recover the network content from the received streams of information, the wireless channel must have a sufficient number of degrees of freedom or equivalently must have high spatial diversity. Spatial diversity depends on the distribution in space of the transceiver stations 203 and the client devices UE1-UE4 as well as the spatial distribution of multi-paths in the propagation environment (or channel angular spread). Described below are different metrics to evaluate the spatial diversity of the wireless channel that will be used in the techniques and methods described later on in the present application.

2. Diversity Metrics and Channel Models

The received signal at target client k is given by $$r_k = H_k W_k s_k + H_k \sum_{\substack{u=1 \\ u \neq k}}^{K} W_u s_u + n_k \quad (1)$$

where k=1, . . . , K, with K being the number of clients. Moreover, $r_k \in C^{R \times M}$ is the vector containing the receive data streams at client k, assuming M transmit DIDO antennas and R receive antennas at the client devices; $s_k \in C^{N \times 1}$ is the vector of transmit data streams to client k in the main DIDO cluster; $s_u \in C^{N \times 1}$ is the vector of transmit data streams to client u in the main DIDO cluster; $n_k \in C^{N \times 1}$ is the vector of additive white Gaussian noise (AWGN) at the R receive antennas of client k; $H_k \in C^{R \times M}$ is the DIDO channel matrix from the M transmit DIDO antennas to the R receive antennas at client k; $W_k \in C^{M \times R}$ is the matrix of DIDO precoding weights to client k in the main DIDO cluster; $W_u \in C^{M \times R}$ is the matrix of DIDO precoding weights to client u in the main DIDO cluster.

To simplify the notation without loss of generality, we assume all clients are equipped with R receive antennas and that there are M DIDO distributed antennas with $M \geq (R \cdot K)$. If M is larger than the total number of receive antennas, the extra transmit antennas are used to pre-cancel interference to the target clients or to improve link robustness to the clients within the same cluster via diversity schemes described in the related patents and applications, including U.S. Pat. No. 7,599,420; U.S. Pat. No. 7,633,994; U.S. Pat. No. 7,636,381; and application Ser. No. 12/143,503.

The DIDO precoding weights are computed to pre-cancel inter-client interference. For example, block diagonalization (BD) precoding described in the related patents and applications, including U.S. Pat. No. 7,599,420; U.S. Pat. No. 7,633,994; U.S. Pat. No. 7,636,381; and application Ser. No. 12/143,503 and [2] can be used to remove inter-client interference, such that the following condition is satisfied in the main cluster $$H_k W_u = 0^{R \times R}; \forall u=1, \ldots, K; \text{ with } u \neq k. \quad (2)$$

Substituting conditions (2) into (1), we obtain the received data streams for target client k, where inter-user interference is removed $$r_k = H_k W_k s_k + n_k. \quad (3)$$

We define the effective channel matrix of user k as $$\tilde{H}_k = H_k W_k. \quad (4)$$

One embodiment of the invention defines the diversity metric as the minimum over all clients of the minimum singular values of the effective channel matrices in (4)

$$\lambda_{min} = \min_{k=1,\ldots,K} \lambda_{min}^{(k)}(\tilde{H}_k). \quad (5)$$

Another embodiment uses the minimum or maximum singular value or the condition number of the composite DIDO channel matrix obtained by staking the channel matrices from every client as $$\overline{H} = \begin{bmatrix} H_1 \\ \vdots \\ H_K \end{bmatrix}. \quad (6)$$

The condition number (CN) is defined as the ratio between the maximum and the minimum singular value of the composite DIDO channel matrix as $$CN = \frac{\lambda_{max}(\overline{H})}{\lambda_{min}(\overline{H})}. \quad (7)$$

Next, we define different channel models that will be used to simulate the performance of the system and methods described in this application in realistic propagation conditions. We employ the well known Kronecker structure [8,9] and model the spatial covariance matrix with cross-correlation entries $r_{i,j} = \rho_c^{|i-j|}$ with $i \neq j$, and auto-correlation entries given by $$r_{i,i} = \begin{cases} \rho_a & i=1 \\ \frac{(N-\rho_a)(N-i+1)}{\sum_{n=1}^{N-1} n} & i>1. \end{cases} \quad (8)$$

The advantage of the model in (8) is that it allows us to write the diagonal entries of the spatial covariance matrix as a function of only one parameter $\rho_a$.

We define three different channel models for the transmit spatial covariance matrix: i) "i.i.d. model" with $\rho_c = 0.00001$, $\rho_a = 1$ that approximates the independent identically distributed models; ii) "high cross-correlation model" with $\rho_c = 0.8$, $\rho_a = 1$ to simulate wireless systems where the antennas have equal transmit power and are in close proximity to each other (e.g., corner case in MIMO systems) thereby yielding high cross-correlation coefficients; iii) "high auto-correlation model" with $\rho_c = 0.00001$, $\rho_a = 5.9$ to simulate wireless systems with antennas distributed over a large area to yield low spatial correlation, but with one antenna overpowering all the others due to its close proximity to all clients (e.g., corner case in DIDO systems). Simulated transmit covariance matrices for DIDO 6×6 systems with these three models are shown in FIG. 5. In all the results presented hereafter, we assume the receive covariance matrix is identity, since the clients are assumed to be spread over large area, several wavelengths apart from one another.

FIG. 6 shows the cumulative density function (CDF) of the diversity metric (i.e., minimum singular value) as well as the symbol error rate (SER) performance as a function of the signal-to-noise ratio (SNR) for the three channel models described above. We observe the SER performance in the "high cross-correlation model" and "high auto-correlation model" degrades due to lack of spatial diversity. In the "high cross-correlation model", lack of diversity is due to high spatial correlation across the transmit antennas of the MIMO array. In the "high auto-correlation model", reduced diversity is due to transmit power imbalance on one of the transmit antennas over the others. One way to improve spatial diversity in the "high cross-correlation model" is to space antennas far apart, which can be prohibitive in practical MIMO systems. In the "high auto-correlation model" diversity can be increased by balancing transmit power across the distributed antennas as described later in this patent application.

Figure 7:
FIG. 7 illustrates an exemplary distribution of base transceiver stations.

We collected the diversity metric in DIDO systems for a variety of propagation conditions. In the experimental campaign, we used the DIDO BTSs installed in different buildings in downtown Palo Alto, as shown in FIG. 7. We began by measuring the "space selectivity indicator" (SSI) in (5) for DIDO 2×2 systems in a variety of propagation scenarios and with different combinations of transmit BTSs and receive antenna locations around downtown Palo Alto.

FIG. 8 shows the SSI as a function of the maximum auto-correlation and cross-correlation coefficients of the spatial covariance matrix. Each dot is obtained by averaging the spatial covariance matrix over a period of 5 seconds, which is enough to average out the fading effect at the speed considered in the experiments (i.e., stationary clients as well as clients moving at 3 mph). We observe the highest values of SSI (that indicate high channel spatial selectivity) are obtained when the maximum cross-correlation is "0" (i.e., low spatial correlation between transmit antennas, due to large physical spacing between antennas or high channel angular spread) and the maximum auto-correlation is "1" (i.e., good power balance across transmit antennas). Any scenario that deviates from these two cases yields low values of SSI and low spatial diversity.

Figure 9:
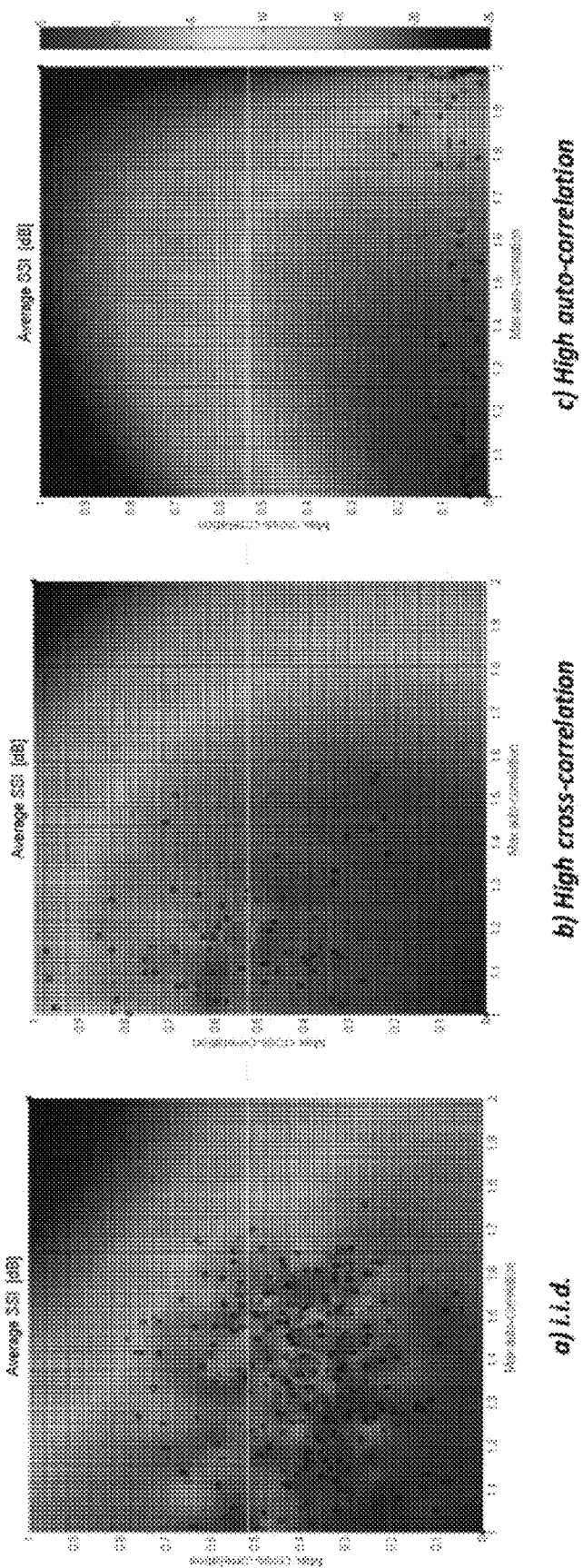
FIG. 9 illustrates exemplary SSI results for three channel models.

FIG. 9 shows the SSI results for the three channel models described above. The "i.i.d." case in FIG. 9a indicates scenarios where the DIDO BTSs were physically faraway from one another; the "high cross-correlation" case was obtained by spacing the transmit antennas one wavelength apart while allowing the clients to move around anywhere in the coverage area; the "high auto-correlation" case was obtained by placing all clients in proximity of antenna 10 in FIG. 7, such that it would overpower the other transmitter. The pink circle in every plot indicates the average of the auto- and cross-correlation coefficients. In FIG. 9b the average cross-correlation increases from FIG. 9a due to small antenna spacing and the average auto-correlation decreases due to transmit power balance. Vice versa, in FIG. 9c the average auto-correlation increases due to transmit power imbalance and the average cross-correlation decreases due to larger antennas spacing between BTSs.

Figure 10:
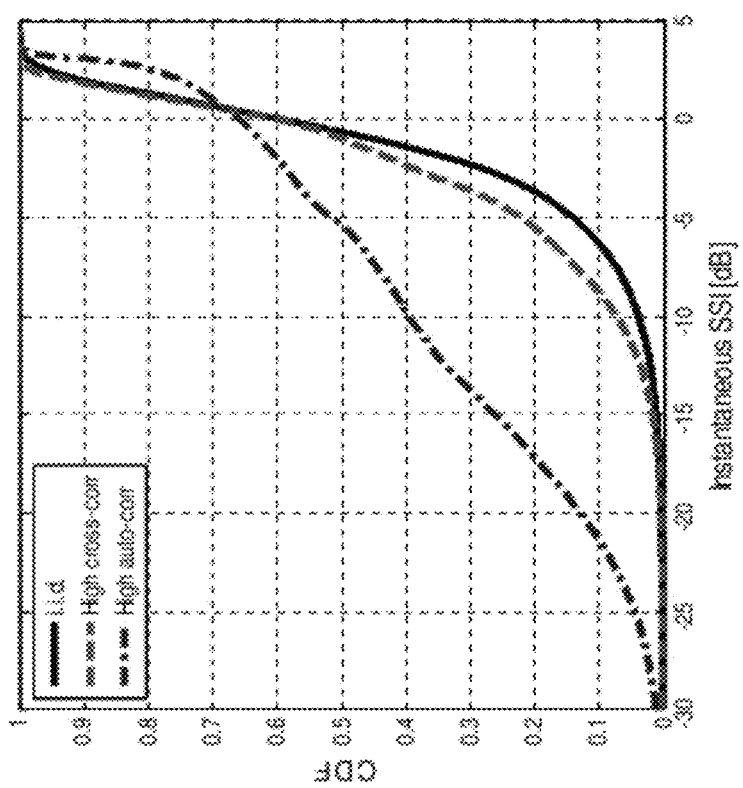
FIG. 10 illustrates a comparison of the cumulative density function (CDF) of the SSI in the three scenarios above.

FIG. 10 compares the cumulative density function (CDF) of the SSI in the three scenarios above. We observe that the i.i.d. case yields the best performance over the other two channel conditions.

Figure 11:
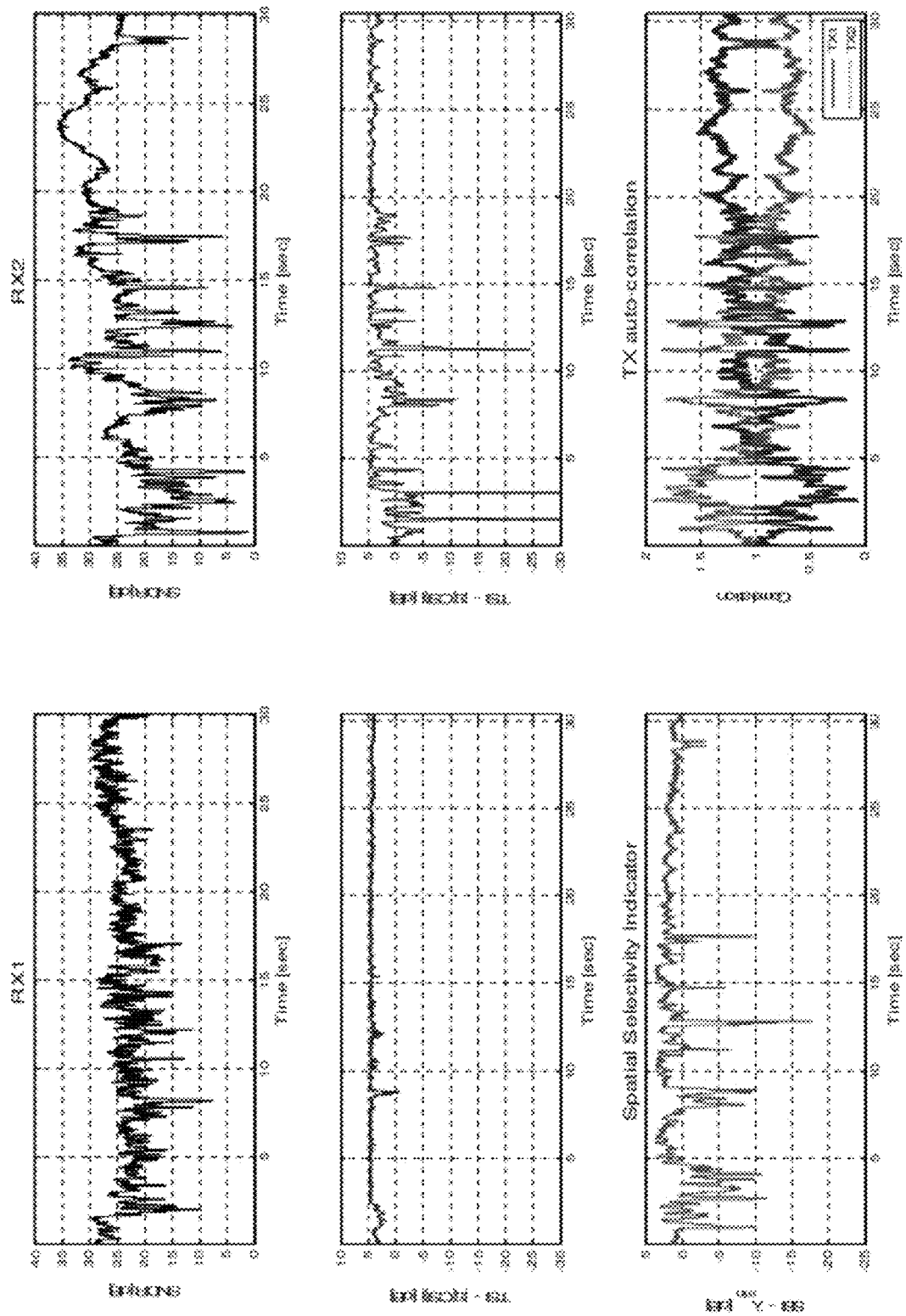
FIG. 11 illustrates the SNDR of client devices in a DIDO 2×2 system for one measurement set.

Next, we analyze how the signal-to-noise-plus-distortion ratio (SNDR) and SER performance of DIDO systems varies as a function of spatial and temporal variations. The spatial variations are measured via the above defined SSI. The temporal variations are measured through the "time selectivity indicator" (TSI). One embodiment of the inventions defines the TSI as the absolute value of the sum of the complex channel gain from some or all transmit antennas in the DIDO system. Any other metric tracking channel variations, deep-fade rate or duration can be used as TSI. The top row in FIG. 11 shows the SNDR of both client devices in the DIDO 2×2 system for one measurement set. The second row depicts the TSI: we observe the TSI of client 1 is flat because it is stationary, whereas the TSI of client 2 fades over time due to client's mobility. The third row shows the SSI as well as the auto-correlation coefficients for each of the two transmitters. We observe that when the two auto-correlation coefficients are close to "1", the SSI increases.

FIG. 12 combines the above results all on one plot. For the first receiver (i.e., Rx1) we observe the SNDR trace fades even though the client is stationary and the TSI is flat. In fact, due to the mobility of Rx2, the SSI varies over time and those variations produce SNDR fades also for Rx1. Moreover, we observe that the SSI may fade independently on the TSI. In fact TSI fades indicate poor signal quality from both transmitters due to destructive interference of multipaths, but the DIDO channel may still have enough spatial degrees of freedom (i.e., large SSI) to support multiple spatial data streams. Alternatively, SSI fades indicate the DIDO channel matrix is singular and cannot support multiple parallel data streams, but the signal quality from all transmit antennas may still be good, yielding large TSI. The present invention uses TSI, SSI, or a combination of the two metrics to evaluate the channel diversity and adjust system parameters to enhance diversity.

The SSI can be used to measure and predict the areas of coherence in DIDO systems. For example, one embodiment of the invention measures the SSI, keeps track of it over time, and predicts its future behavior. Based on that prediction, it adapts both transmit and receive system parameters (e.g., number of BTSs to employ for transmission or number of client devices to receive data streams).

Figure 13:
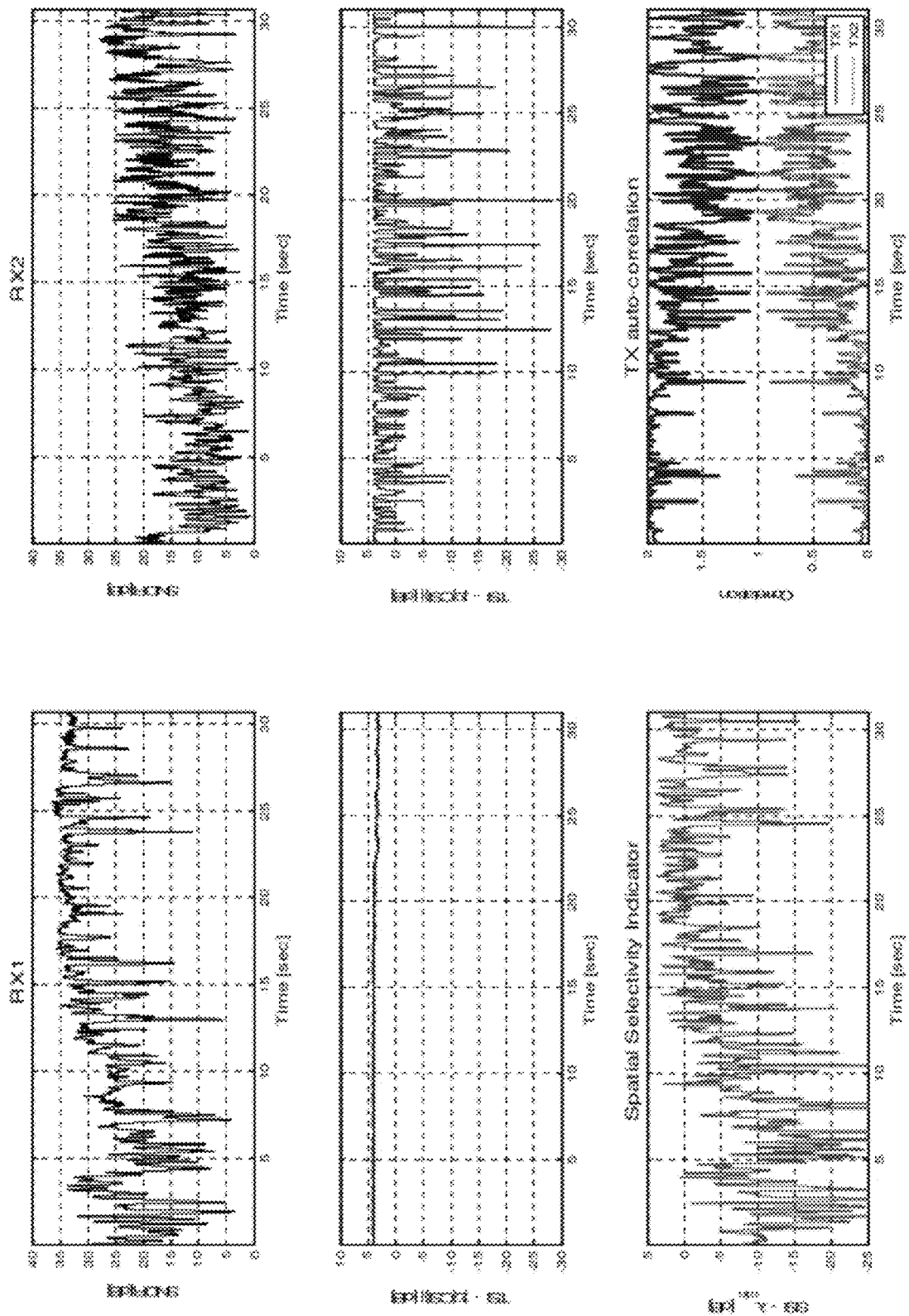
FIG. 13 illustrates the results from a second channel scenario where RX2 moves from a location with high power imbalance to another with low power imbalance.
Figure 14:
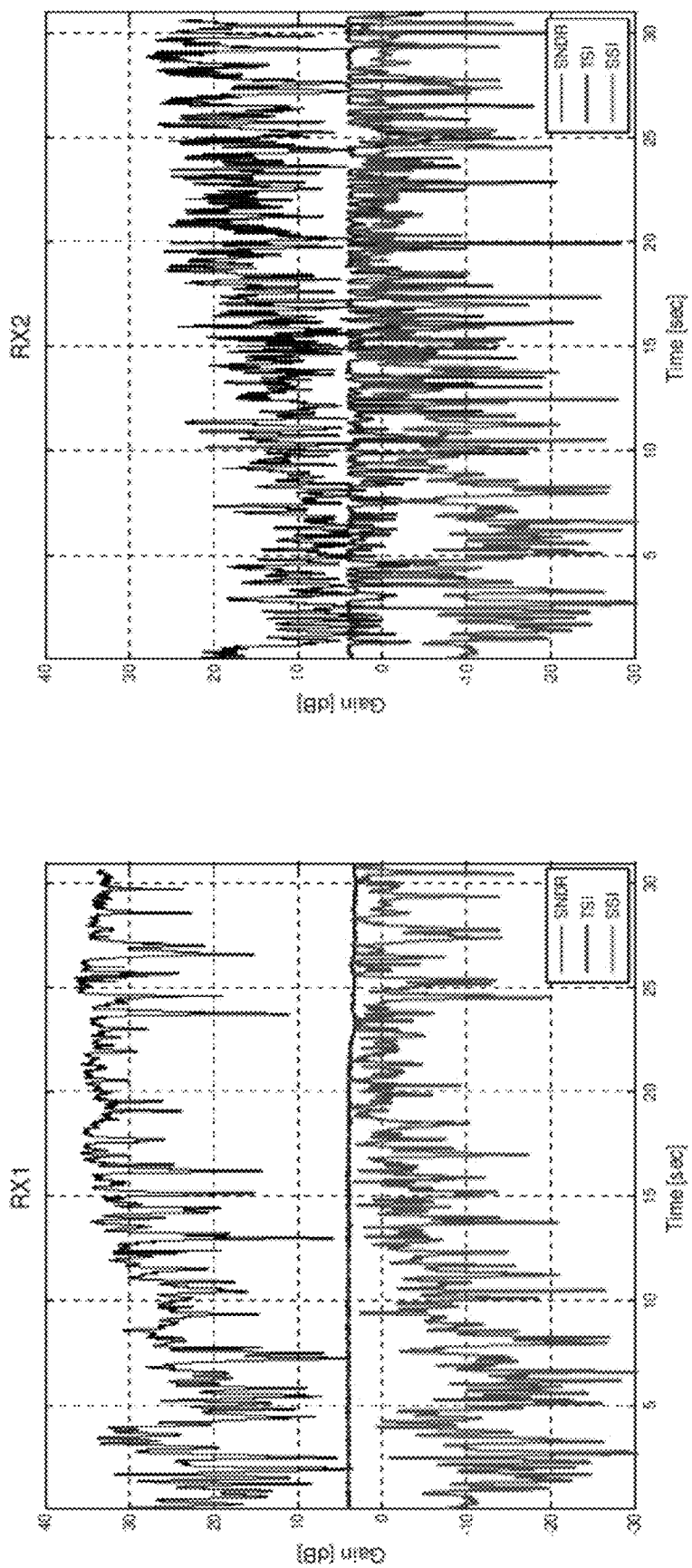
FIG. 14 illustrates that even the performance of RX1 (the stationary client) improves as the SSI increases.

FIG. 13 shows the results from a second channel scenario where RX2 moves from a location with high power imbalance to another with low power imbalance. The result of this variation is SSI improvement. FIG. 14 shows the summary for the same measurement scenario: we observe even the performance of RX1 (the stationary client) improves as the SSI increases.

We compared the SNDR performance against the SSI in a large set of propagation conditions. FIG. 15 depicts the SNDR versus the average SSI in a) and standard deviation of the SSI in b). Each dot represents one measurement collected over a period of 5 seconds. The red solid line represents the linear regression of all measurement points, where the upper and lower 10% of the measurements has been removed from the regression calculation. We observe the average SNDR increases as a function of the average SSI in FIG. 15a due to large spatial diversity available in the wireless channel. For example, scenarios characterized by large power imbalance yield low average SSI resulting in low SNDR. Moreover, in FIG. 15b the average SNDR decreases as a function of the standard deviation of the SSI due to frequent deep-fades of the SSI due to client mobility. Note that in practical systems the average and standard deviation of the SSI can be computed via running average techniques or methods using forgetting factor for efficient memory use and reduction in computational complexity.

Figure 16:
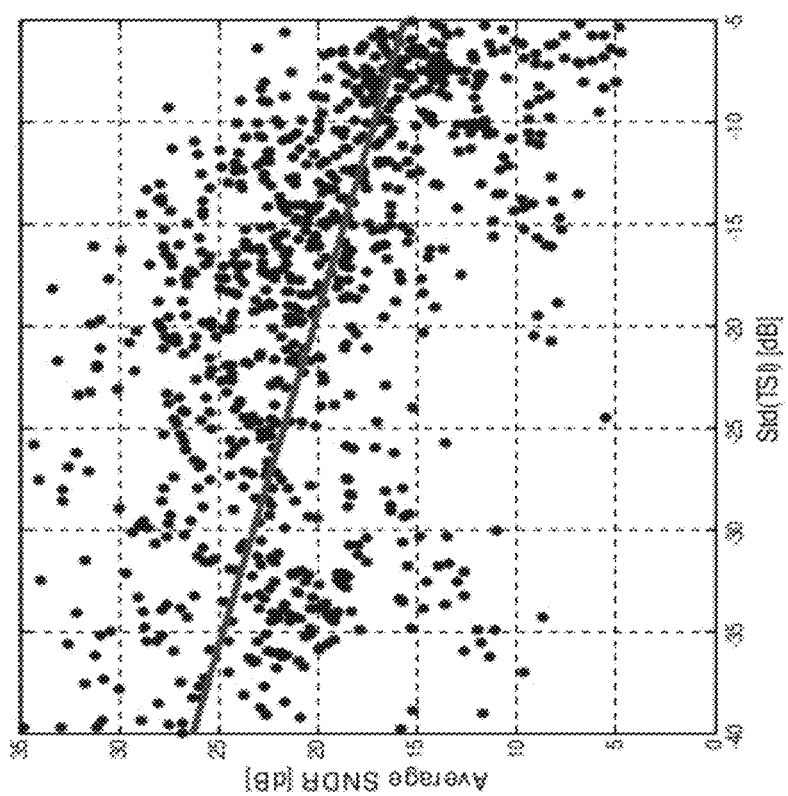
FIG. 16 illustrates how SNDR decreases as the standard deviation of the TSI due to deep-fade in time caused by a client's mobility and Doppler effect.

FIG. 16 shows similar results for the temporal channel variations. The SNDR decreases as the standard deviation of the TSI due to deep-fade in time caused by the client's mobility and Doppler effect.

Figure 18:
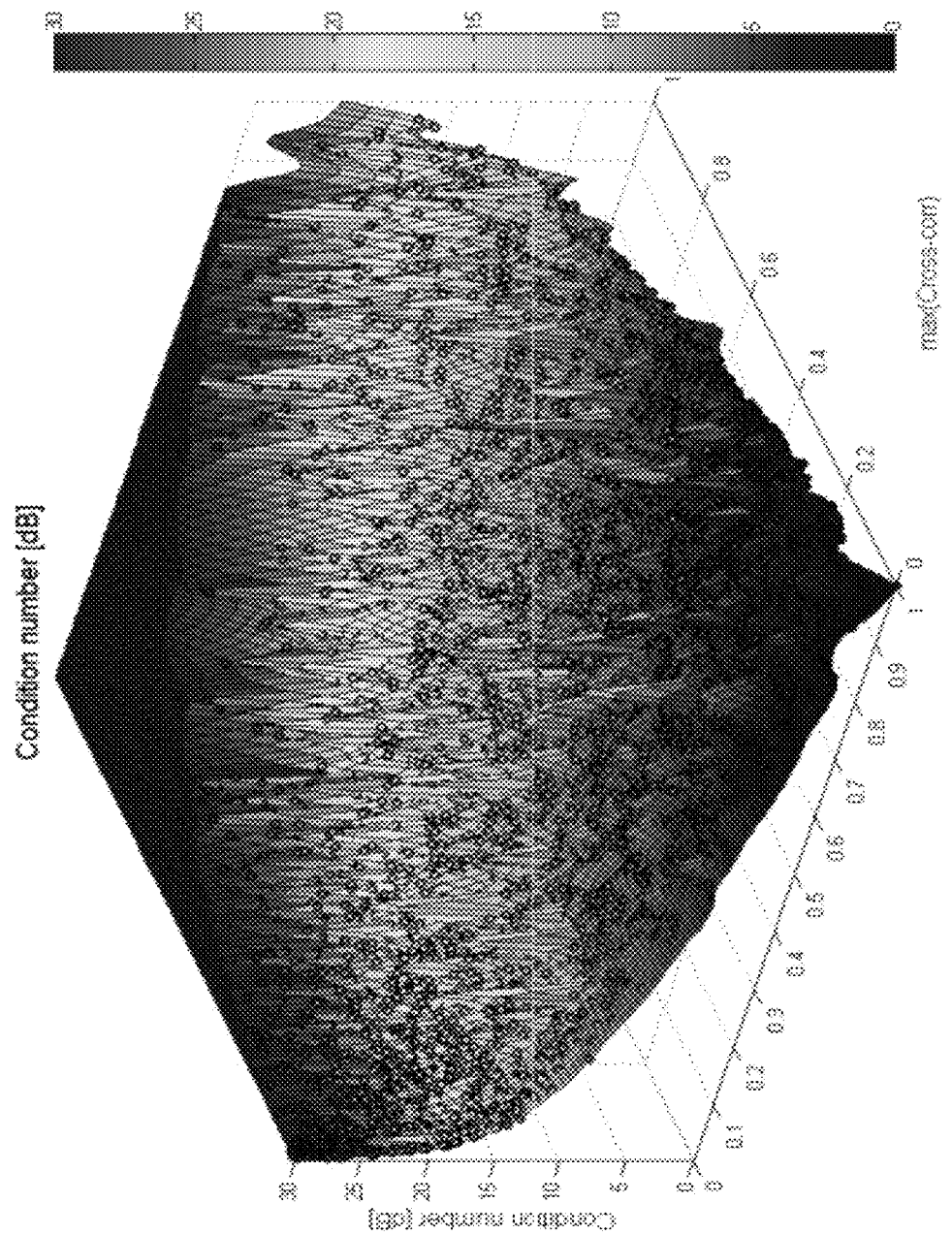

Another embodiment of the invention uses the condition number (CN) as SSI. The CN defined in equation (7) is plotted as a function of the minimum auto-correlation coefficient and maximum cross-correlation coefficient in FIG. 17b, where every dot is the result of 100 msec of data. Contrarily to the minimum singular value of the effective channel matrix, lower CN indicates channels with high spatial diversity. FIG. 17a shows the CDF of the SSI defined as the CN. FIG. 18 depicts the three dimensional version of FIG. 17a.

Figure 19:
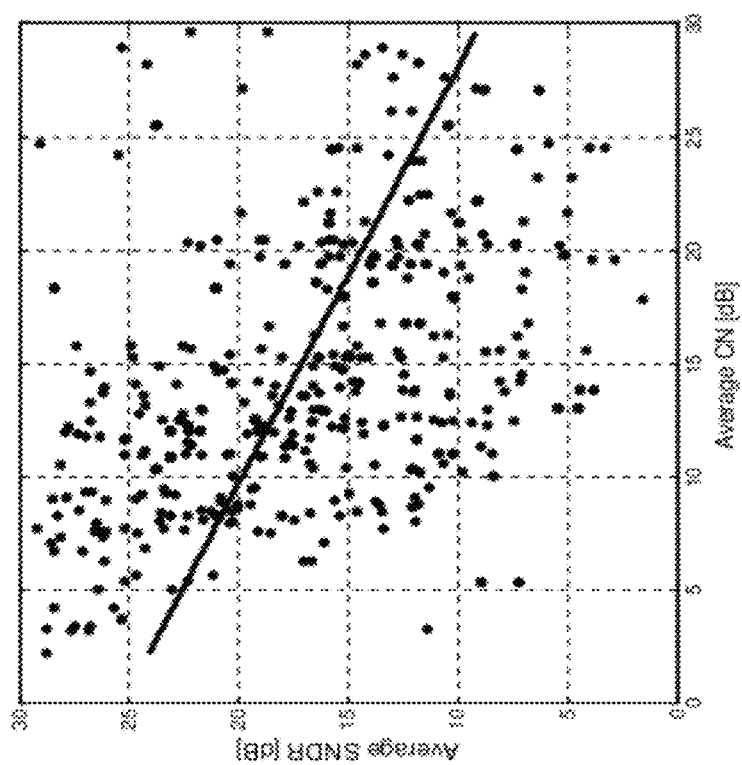
FIG. 19 illustrates the average SNDR as a function of the average CN.

FIG. 19 shows the average SNDR as a function of the average CN. Every dot represents an average over 20 seconds of data. We observe that the SNDR degrades as the value of the average CN increases.

3. Methods for Transmit Antenna Selection

One way to increase the spatial degrees of freedom in a wireless link is to add more transmit antennas than the number of clients in the system and select among the antennas that satisfy a certain SSI performance target. This algorithm is known as transmit antenna selection as described in [10] and our previous patent application U.S. Pat. No. 7,636,381. In one embodiment, all possible combination of transmit antenna subsets are first identified. Then the SSI is computed for each of the antenna sets. Finally the set that maximizes the diversity metric or SSI is chosen as optimal transmit antenna subset.

FIG. 20 shows the performance of different order DIDO systems in i.i.d. channels assuming same per-antenna transmit power. The SSI degrades for increasing number of transmit antennas as the CDF shifts to the left going from 2×2 to 8×8, but the SER performance is similar for any order DIDO.

FIG. 21 shows the simulated performance of DIDO 4×4 in i.i.d. channels. Antenna selection provides significant gains in SNR depending on the target SER. For example, at SER target of 1% by adding two extra antennas the gain is 12 dB or at a target of 0.1% that gain increases up to 18 dB. Also, FIG. 21b shows that the CDF of the SSI improves with antenna selection due to enhanced spatial diversity. Note that in FIG. 21 we plot the maximum (over all possible transmit antenna subsets) of the minimum singular value of the effective channel matrix. We define the mean value of the CDF in FIG. 21b in decibels as $$D_{dB} = 20 \log_{10}(E\{\max(\lambda_{min})\}) \qquad (9)$$

Figure 22:
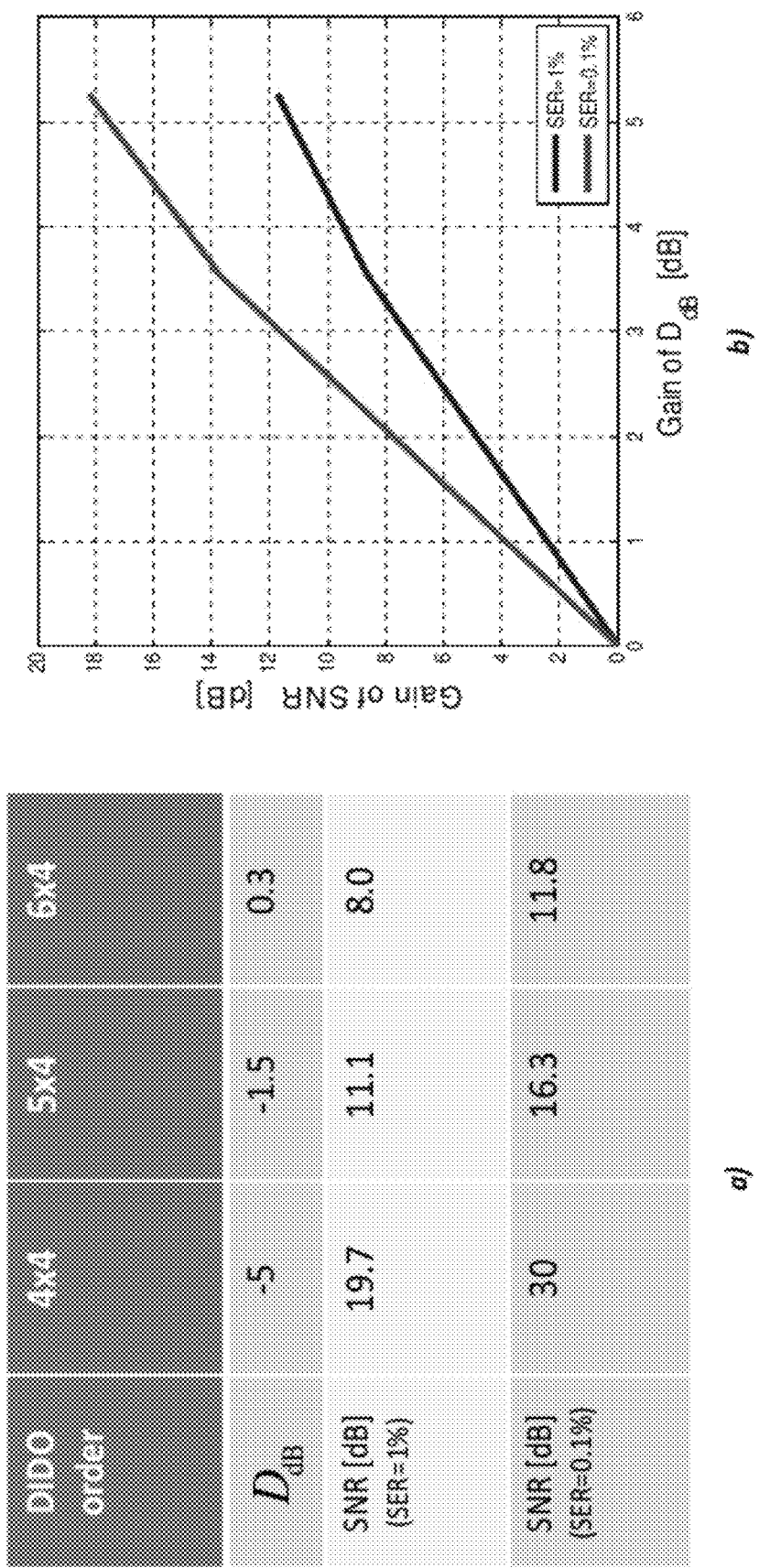
FIG. 22 illustrates the gain in SNR as a function of the gain of the diversity metric in (9).
Figure 25:
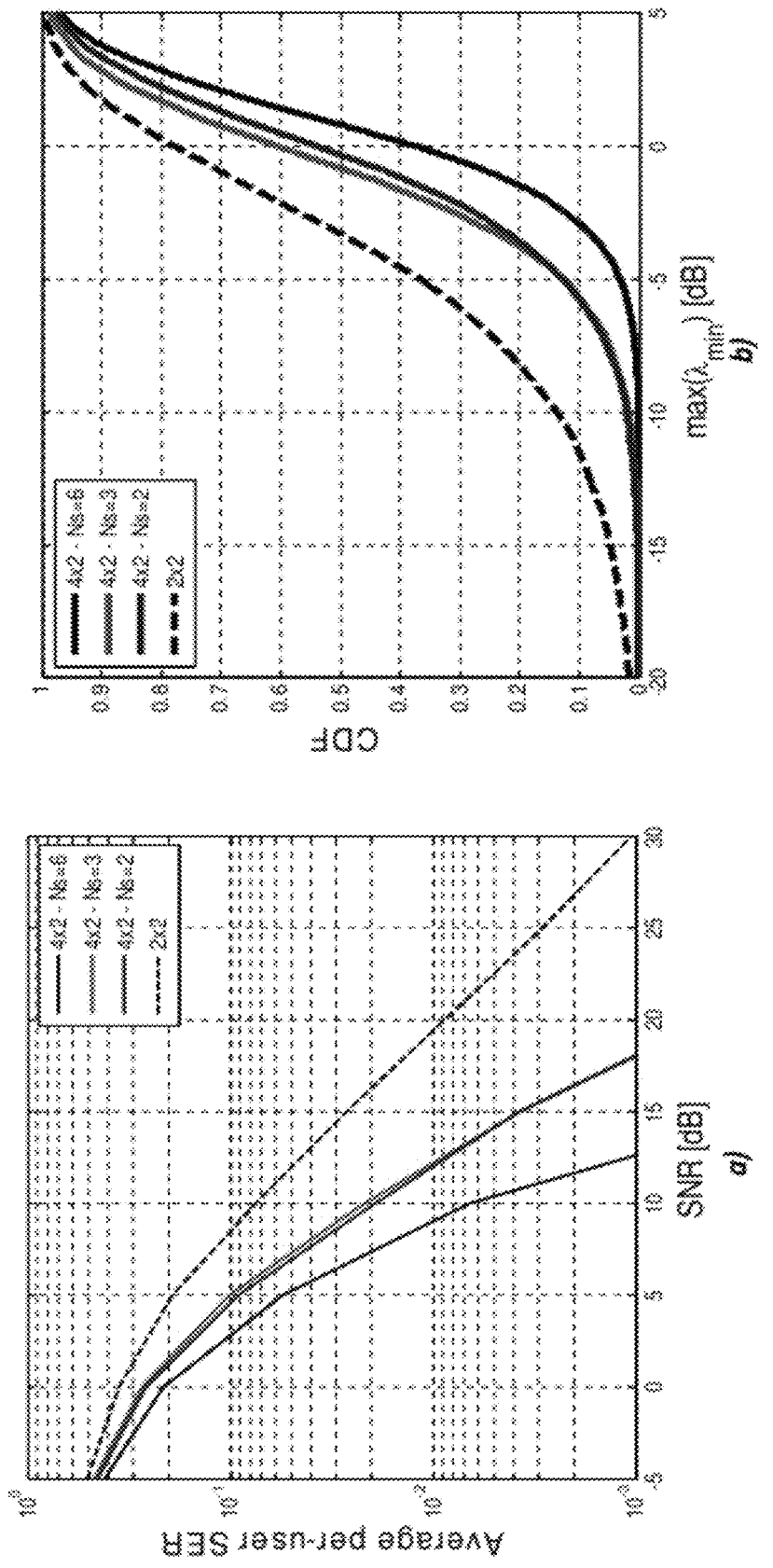
FIGS. 25-28 show the simulated SER performance and CDF of the SSI for DIDO 4×2, 6×4, 8×6 and 10×8 systems.
Figure 26:
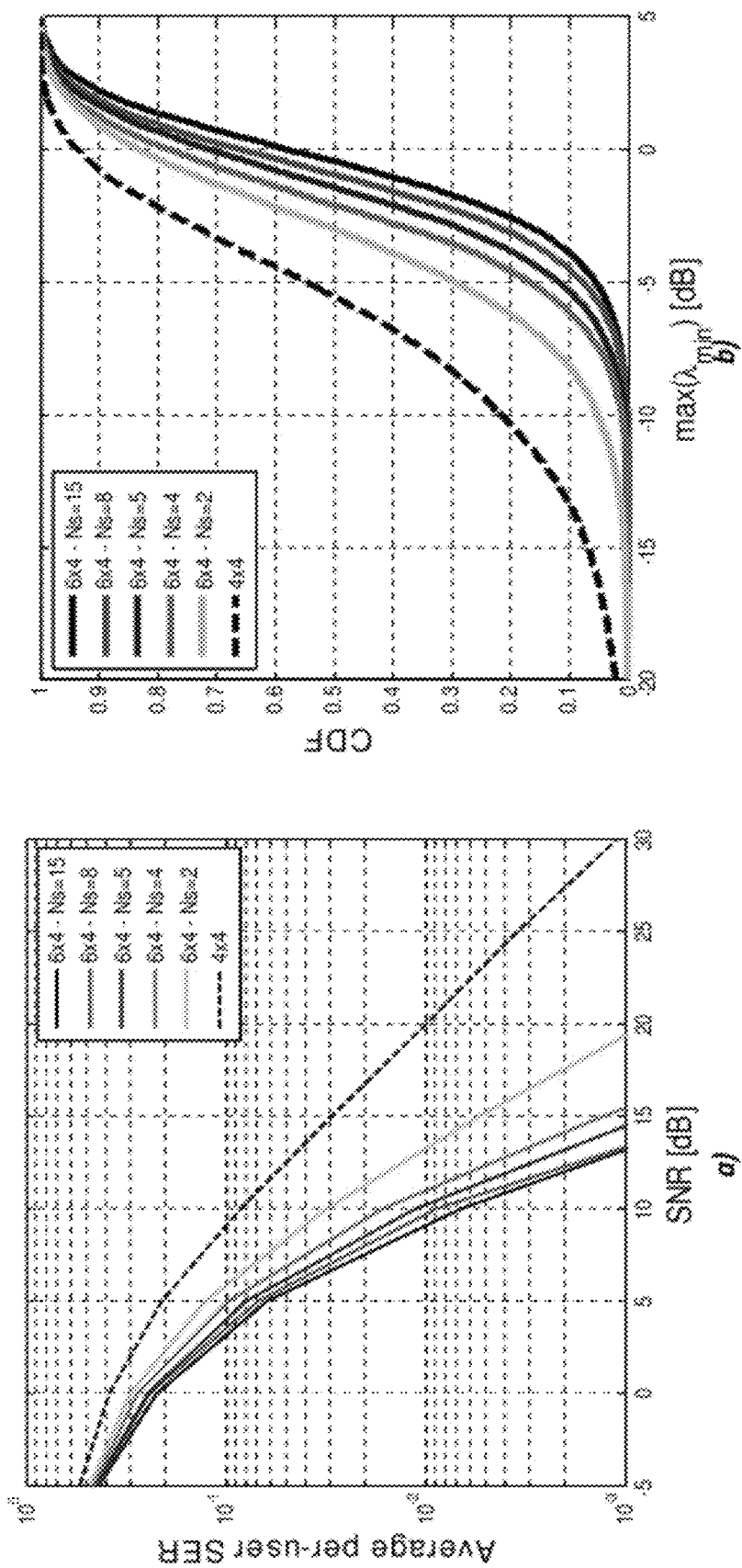
Figure 27:
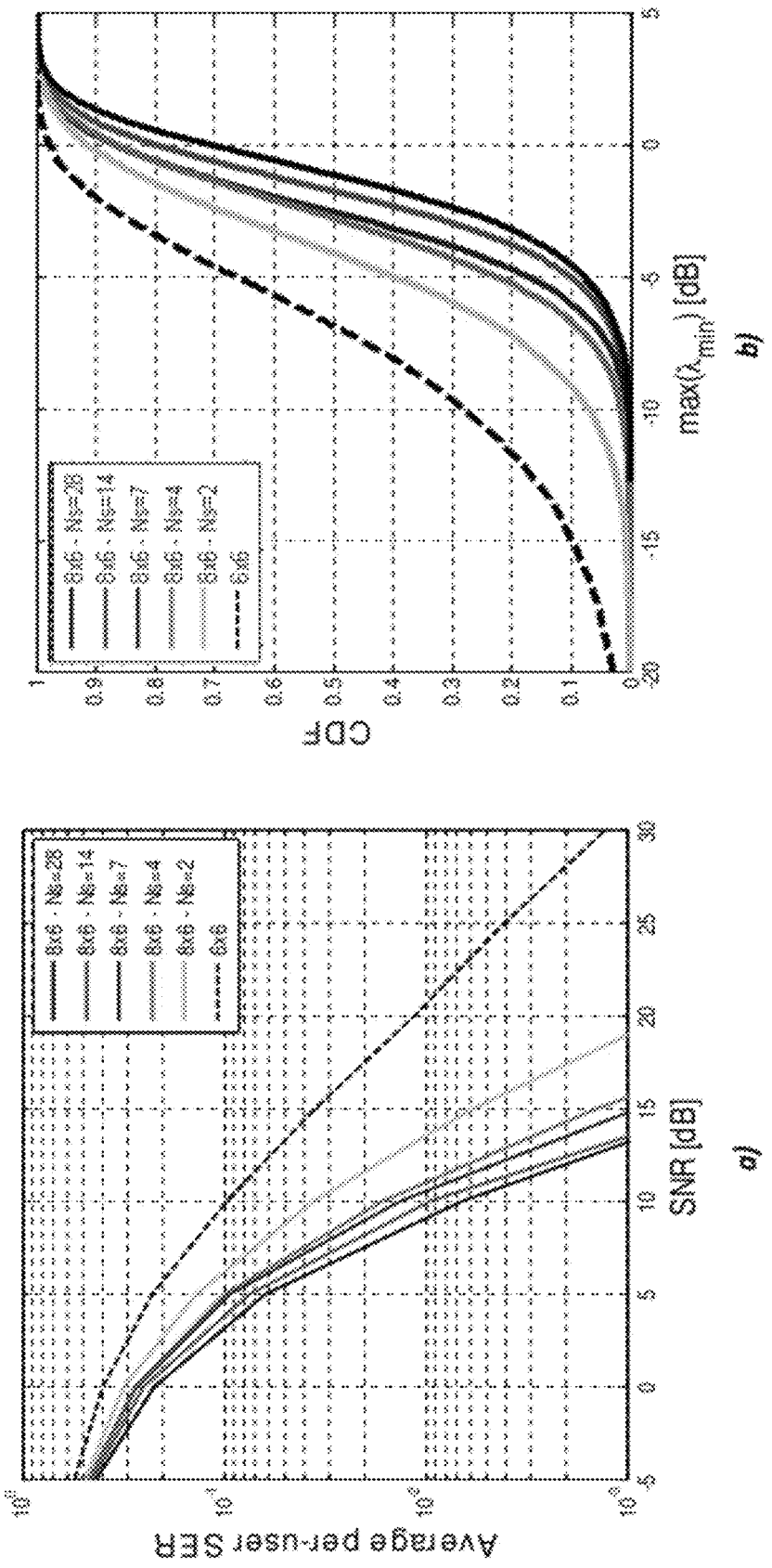
Figure 28:
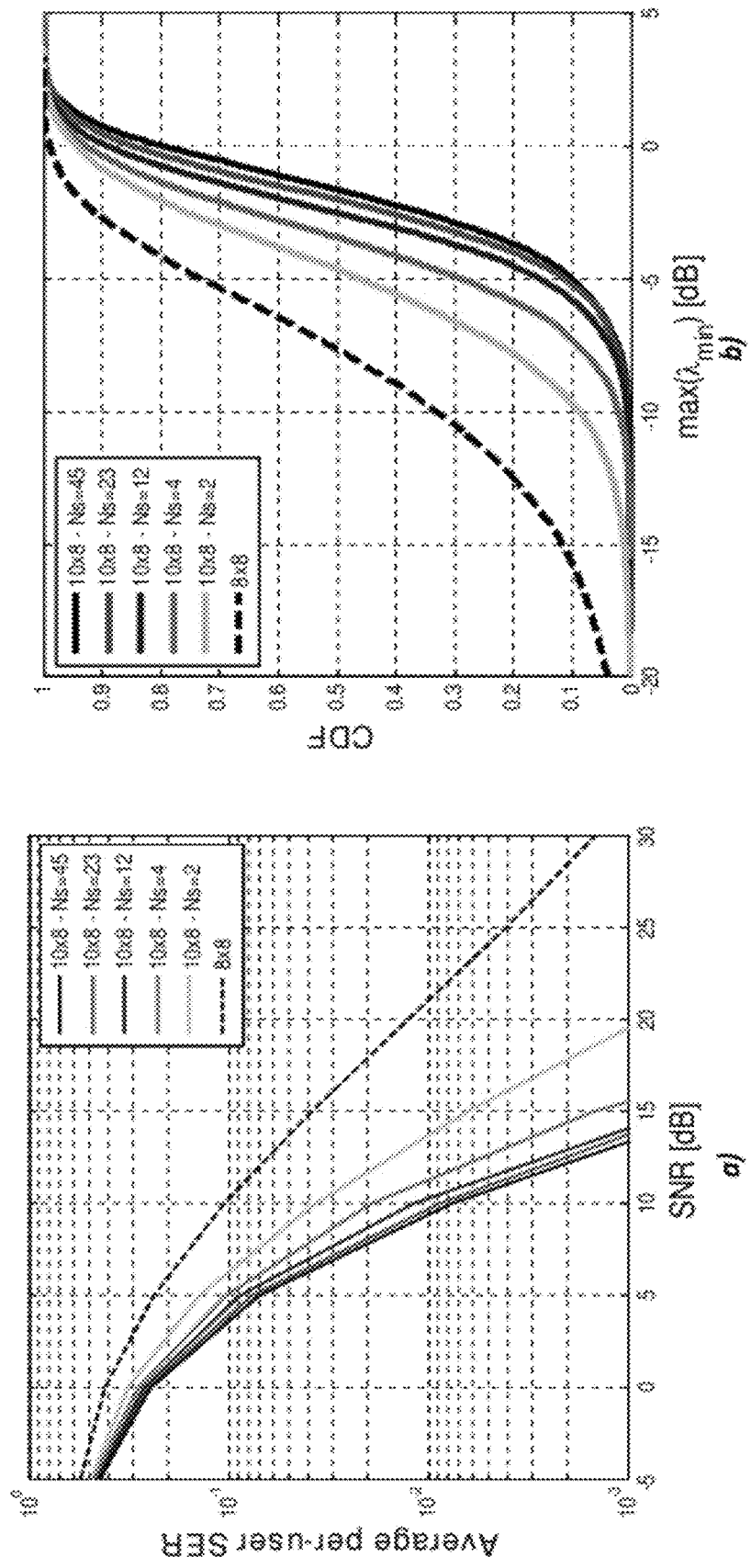

FIG. 22 shows the gain in SNR as a function of the gain of the diversity metric in (9). The values in the table a) are obtained from the simulated SER performance in FIG. 21a. In FIG. 22b we observe close to linear relation between the two gains. In one embodiment of the invention, the average SSI is used to decide whether to employ the selection algorithm or not. In fact, antenna selection algorithms require additional computational complexity as the SSI must be computed over all antenna subsets. Understanding under what channel conditions the antenna selection algorithm is really needed, allows to turn off the algorithm when unnecessary, thereby improving computational complexity of the system. For example, if the average SSI is above a certain threshold, there is no need to trigger the antenna selection algorithm and a fixed number of antennas are used for transmission. If the average SSI decreases (e.g., due to client's mobility) the algorithm will trigger the antenna selection algorithm in such a way that the best antenna subset is chosen for transmission over the wireless link.

The SSI threshold can be pre-calculated by analyzing experimental data from practical measurements. For example, FIG. 23 shows the traces of SNDR, SSI (indicated as $\lambda_{min}$) and TSI (being the absolute value of the complex channel gain from every transmitter indicated as TX1, ..., M). Note that we intentionally subtracted 20 dB from the TSI traces to fit all traces into the same plot while avoiding overlaps. In this experiment, the first client RX1 is stationary, whereas the second RX2 is mobile. We observe that even for the stationary client the SNDR trace varies over time due to fades in the SSI trace. In particular, every time the SSI falls below −10 dB, the SNDR undergoes deep-fades. We choose −10 dB as a threshold for the SSI. This invention is not limited to this value of SSI and other values may be chosen based on different performance criteria. For the mobile client, deep-fades are caused by either SSI fades or TSI fades. As observed before, these two types of fades are uncorrelated and may occur at different times.

FIG. 24 shows the results obtained over the same route as in FIG. 23, but using two extra antennas. Note that the SNDR trace is not aligned with the one in FIG. 24 because the instantaneous channel varies from one experiment to the next due to fast-fading effects. We observe that, by adding two extra antennas and running the transmit antenna selection algorithm, it is possible to remove deep-fades from the SSI trace and improve SNDR performance of both clients. FIG. 24a shows that the stationary client does not undergo any SNDR deep fade. FIG. 24b shows that the SNDR fades of the mobile client are only due to TSI, whereas the SSI fades are completely removed.

One embodiment of the invention scans through the available transmit antenna subsets until the first one that provides SSI above the predefined threshold is reached. Once that subset is found, the search stops thereby reducing the computational complexity of the algorithm.

In FIGS. 23 and 24 we observed that the SSI exhibits a structured behavior with periods of deep-fade that alternate to periods of high gain. This temporal correlation between consecutive samples of SSI can be exploited to reduce the complexity of the antenna subset selection algorithm. In one embodiment, the same antenna subset is preserved until the SSI undergoes a deep-fade and its value drops below the predefined threshold. In another embodiment, the system keeps track of the statistics of the antenna subset that have been chosen in the past and only selects those for future transmissions.

Another way to reduce computational complexity of the system is to reduce the number of combinations of transmit antennas to be chosen across with the antenna selection method. FIGS. 25-28 show the simulated SER performance and CDF of the SSI for DIDO 4×2, 6×4, 8×6 and 10×8 systems. All these systems employ two extra antennas than the number of clients. Performance is shown for different numbers Ns of antenna subsets. We observe that, for any DIDO order, 10 or less subsets of transmit antennas suffice to approximate closely the SER performance of the same system using all possible combinations of antenna subsets. Reducing the number of antenna subsets can yield a significant reduction in computational complexity as the SSI does not need to be computed over all antenna subsets. One embodiment of the invention selects a limited number of subsets as a means to reduce the computational complexity of the system, while maintaining system performance close to ideal performance.

One embodiment of the invention uses combination of SSI and TSI to select the optimal antenna subset. For example, the antenna subset that provides the maximum SSI and TSI is selected. Another embodiment defines a first selection phase that identifies all antenna subsets that provide SSI above the predefined threshold. Then, a second selection phase chooses the subset that yields the largest TSI. Alternatively, another threshold is defined for the TSI and the subset that satisfies both SSI and TSI thresholds is selected.

All the methods and results described above for single-carrier systems can be directly extended to multi-carrier and/or OFDM systems by defining "frequency selectivity indicator" (FSI). For example, in OFDM systems every tone experiences a frequency flat channel. Then all methods described above can be applied on a tone-by-tone basis. In another embodiment, different combinations of SSI, TSI and FSI are employed to select the optimal antenna subset according to the criteria defined above.

Figure 29:
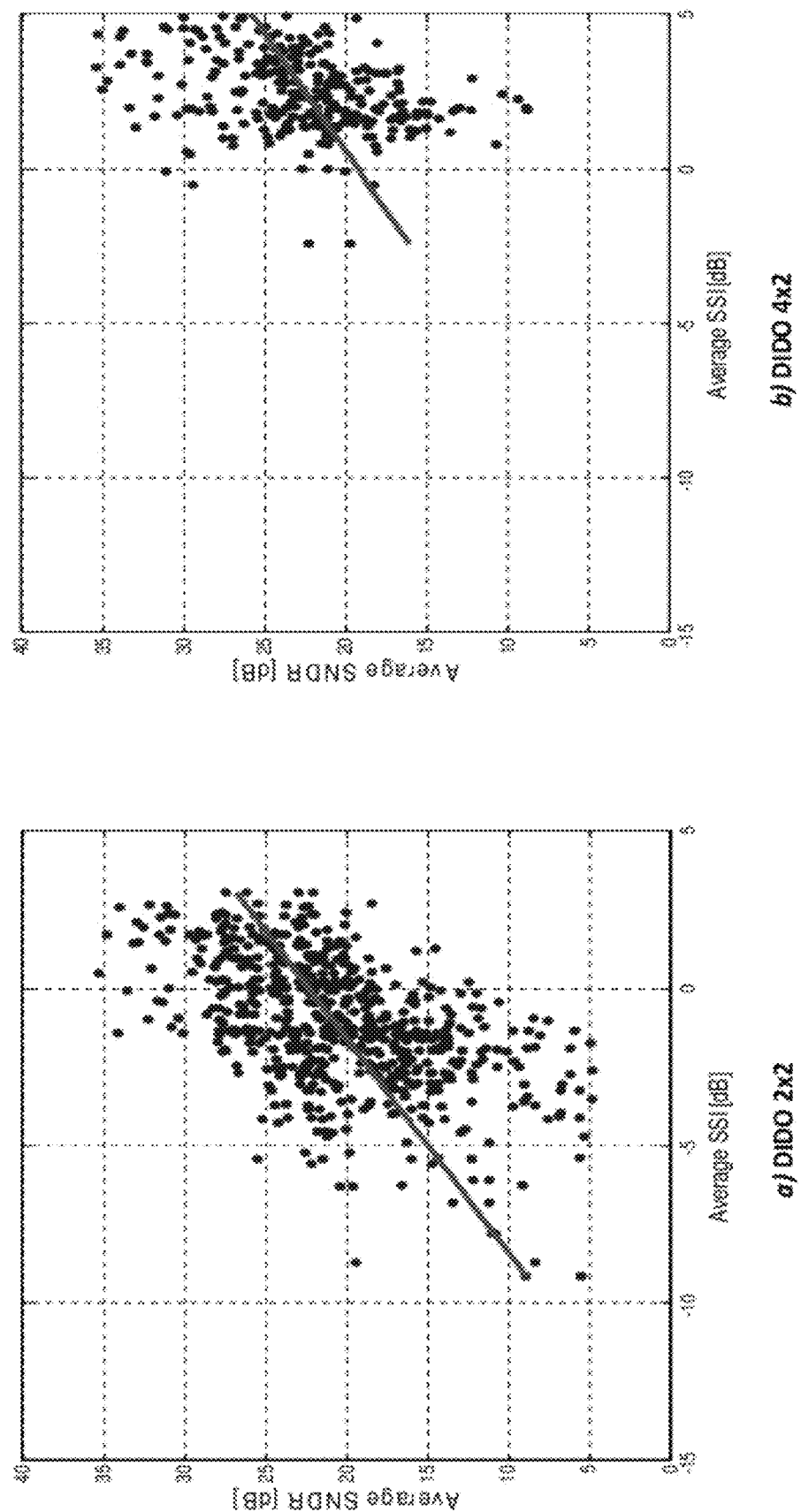
FIG. 29 illustrates the average SNDR (over periods of 5 seconds) versus the average SSI.

Finally, we show the performance of antenna selection algorithms in a variety of propagation conditions. FIG. 29 depicts the average SNDR (over periods of 5 seconds) versus the average SSI. Large average SSI indicates channels with high spatial diversity, thereby yielding large average SNDR. We observe that two extra antennas used for antenna selection going from DIDO 2×2 to 4×2 increases both average SNDR and SSI. Similar results are shown in FIG. 30 for DIDO 4×4 and 6×4.

Figure 31:
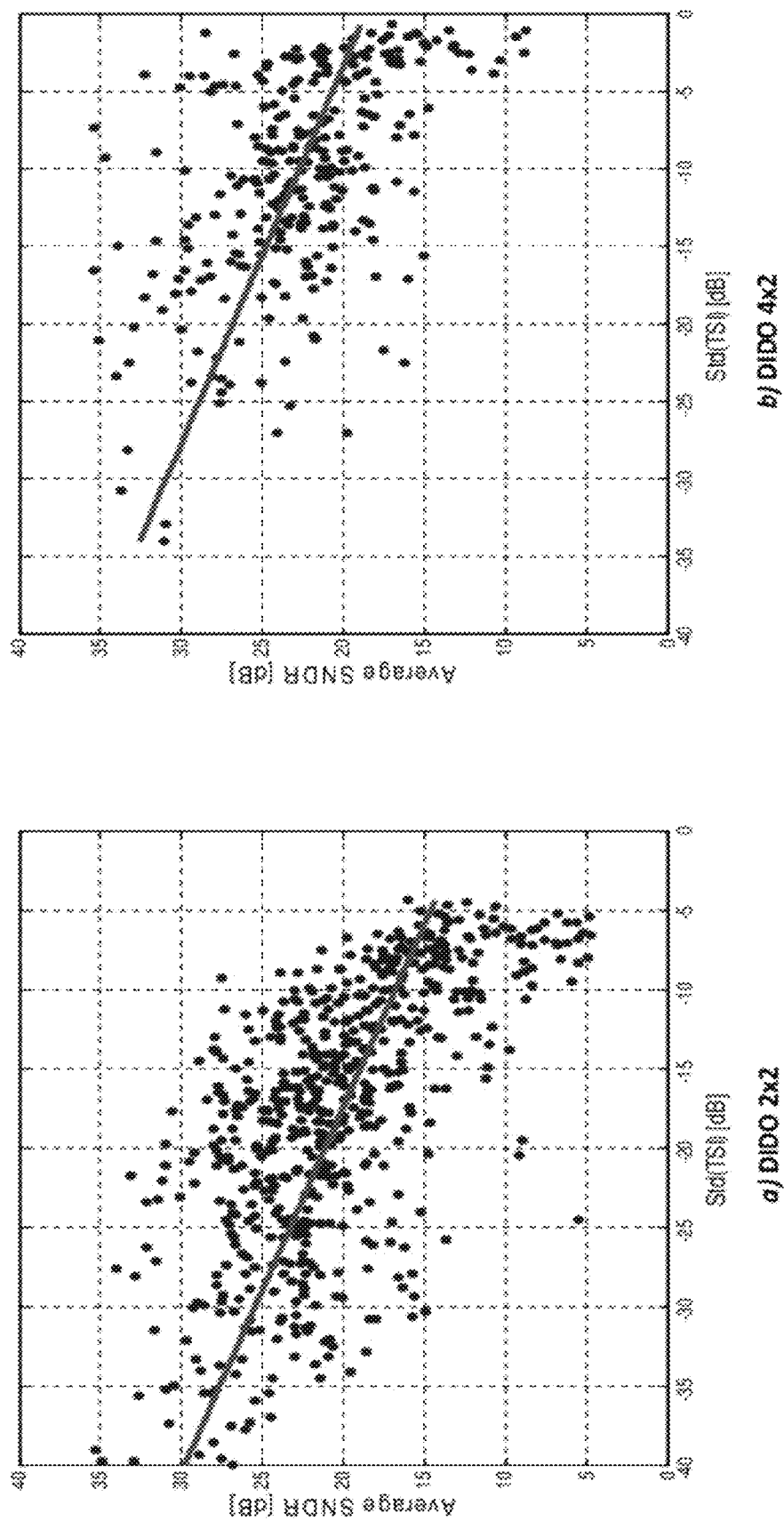
FIG. 31 illustrates the average SNDR as a function of the standard deviation of the TSI for DIDO 2×2 and 4×2.

FIG. 31 depicts the average SNDR as a function of the standard deviation of the TSI for DIDO 2×2 and 4×2. High standard deviation indicates large time selectivity due to Doppler effects that degrade the SNDR performance. Similar results are showed in FIG. 32 for DIDO 4×4 and 6×4.

Figure 33:
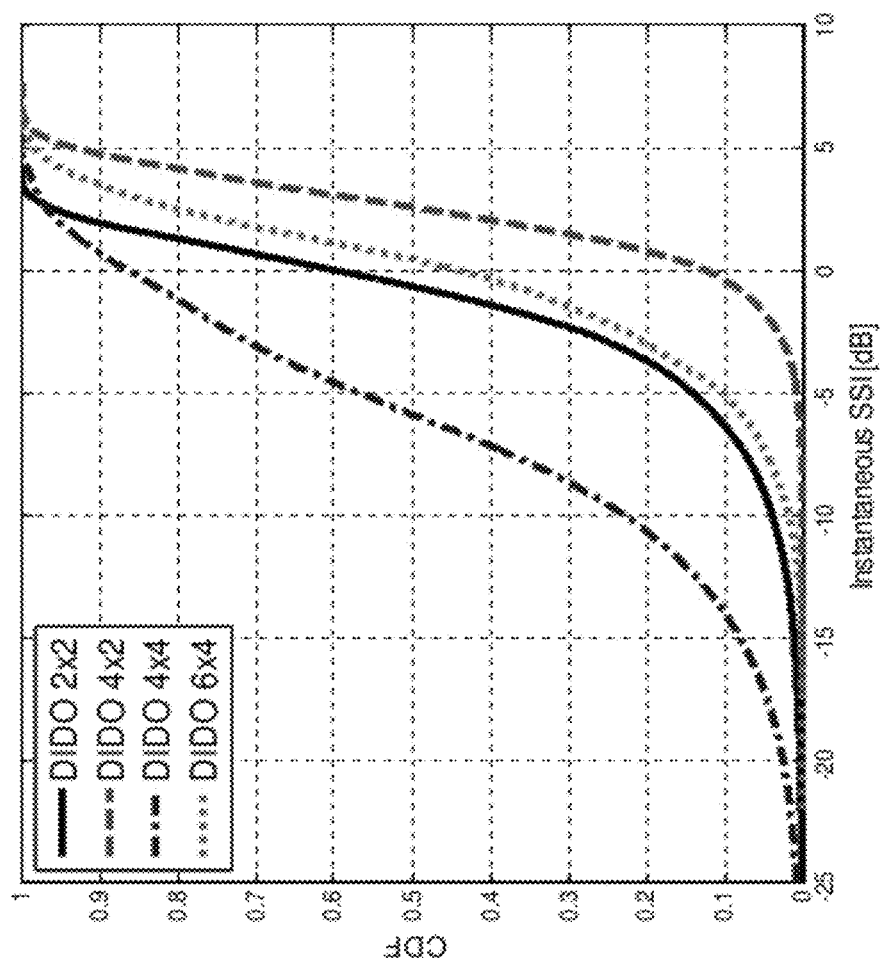
FIG. 33 compares the CDF of the instantaneous SSI for four DIDO systems.

Finally, FIG. 33 compares the CDF of the instantaneous SSI for all four DIDO systems considered above. We observe that 4×4 has worse CDF performance than 2×2 due to reduced degrees of freedom when switching to higher order DIDO. In both cases, adding 2 extra antennas with transmit selection algorithms yield significant improvement in SSI performance.

4. Methods for User Selection

In one embodiment, spatial diversity is enhanced in DIDO channels via user selection. In this embodiment, if there are not enough degrees of freedom in the wireless channel for the given number of transmit antennas available in the system, then the system drops transmission to one or multiple clients. This technique may employ the SSI to measure the spatial diversity in the wireless link. When the SSI falls below a predefined threshold, one or multiple clients are dropped.

In one embodiment of the invention, the fastest moving client is dropped. In fact, the client experiencing the highest Doppler effect is most likely to undergo deep-fades. Another embodiment utilizes the TSI and FSI to select the client with lower channel quality and drops that client. When the client is dropped, the bits transmitted over that period are corrupted and those bits can be recovered via forward error correction (FEC) coding. Another embodiment utilizes alternative multiplexing technique such as TDMA, FDMA, OFDMA or CDMA to serve the dropped clients.

Figure 34:
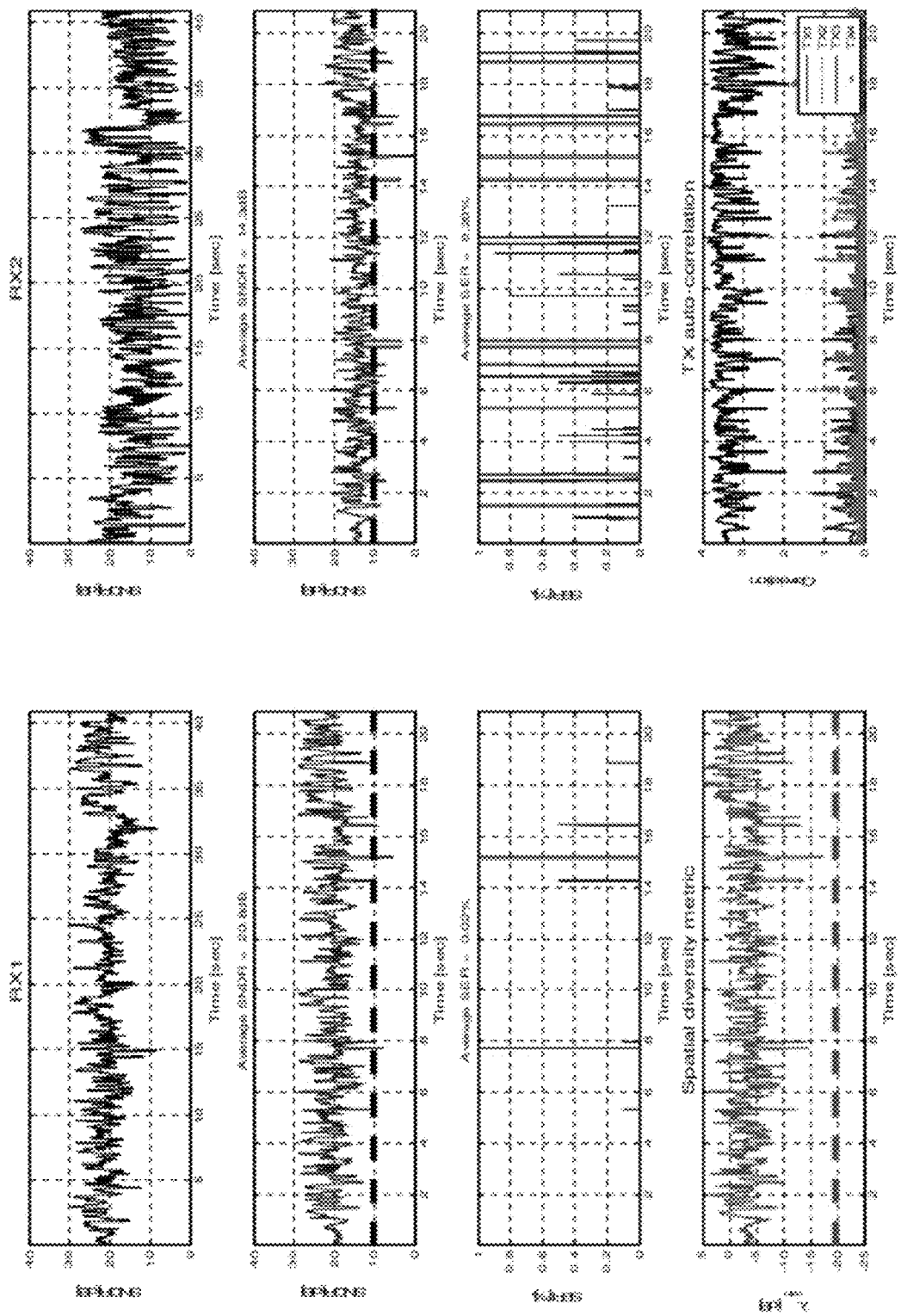
FIG. 34 illustrates the results from one particular measurement set with approximately 20 seconds of data.

FIG. 34 shows the results from one particular measurement set with approximately 20 seconds of data. The first row depicts the measured SNDR trace for the two clients denoted as RX1 (stationary client) and RX2 (mobile client); the second row is the simulated SNDR with the target fixed to 10 dB to demodulate 4-QAM constellations reliably; the third row is the simulated SER; finally the fourth row depicts the SSI and the auto-correlation coefficients. We observe that even if RX1 is stationary, its SNDR drops below the target due to lack of spatial diversity, as indicated by low SSI. If the SSI target is too low (i.e., −20 dB in the figure) the user selection algorithm is never triggered and RX1 undergoes severe SER degradation.

Figure 35:
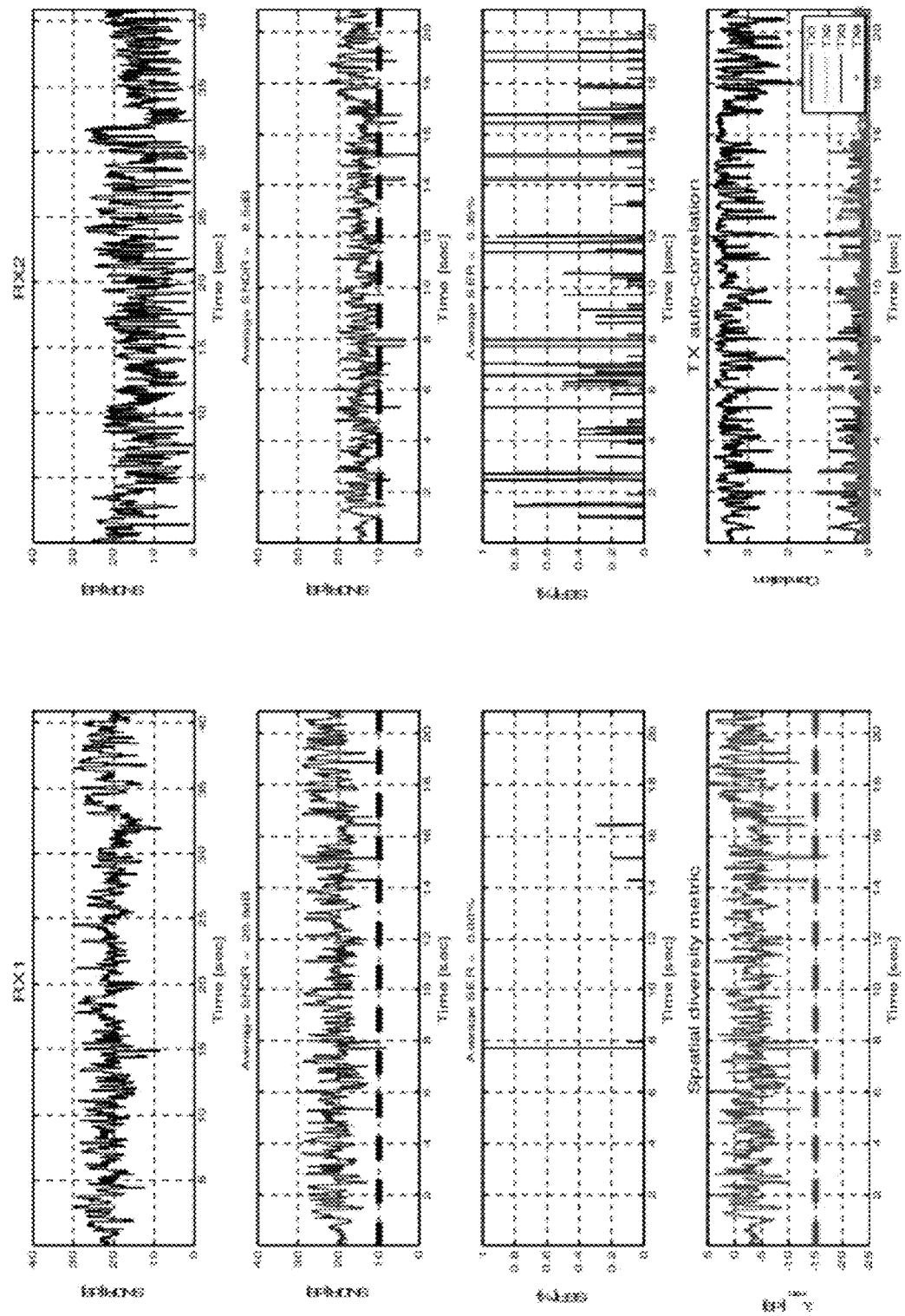
FIG. 35 illustrates one embodiment where the SSI target is raised to −15 dB and as a result the SER performance improves.
Figure 36:
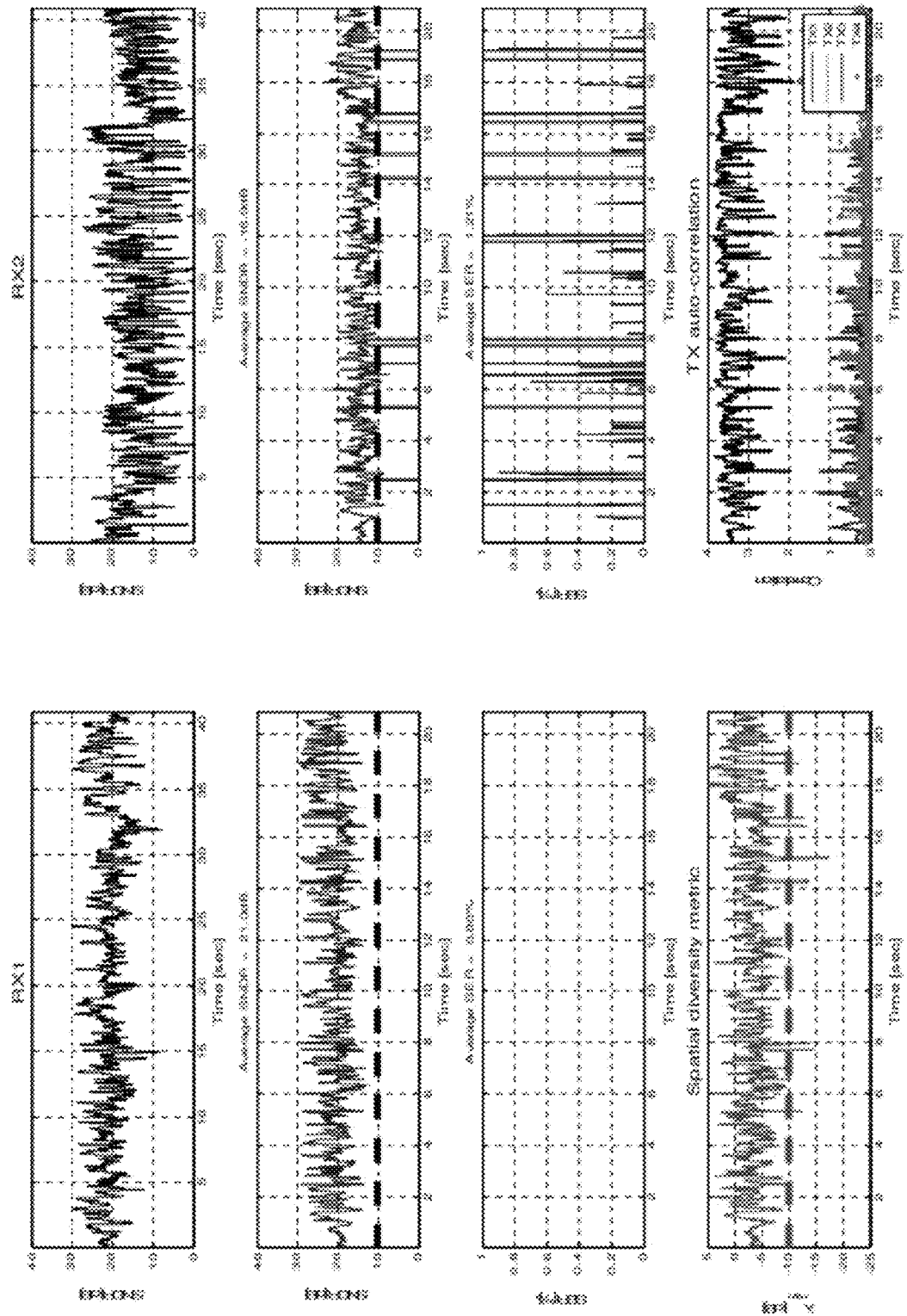
FIG. 36 illustrates improvements achieved by raising the target SSI.

FIG. 35 shows the case where the SSI target is raised to −15 dB and as a result the SER performance improves. Further improvement is achieved by raising the target SSI further up −10 dB as in FIG. 36, in which case the SER for RX1 is reduced to zero throughout the duration of the measurement. In this case the SSI threshold is determined based on the SER performance, but this invention is not limited to that and any other performance criterion can be used for that.

5. Methods for Transmit Power Balancing

Figure 37:
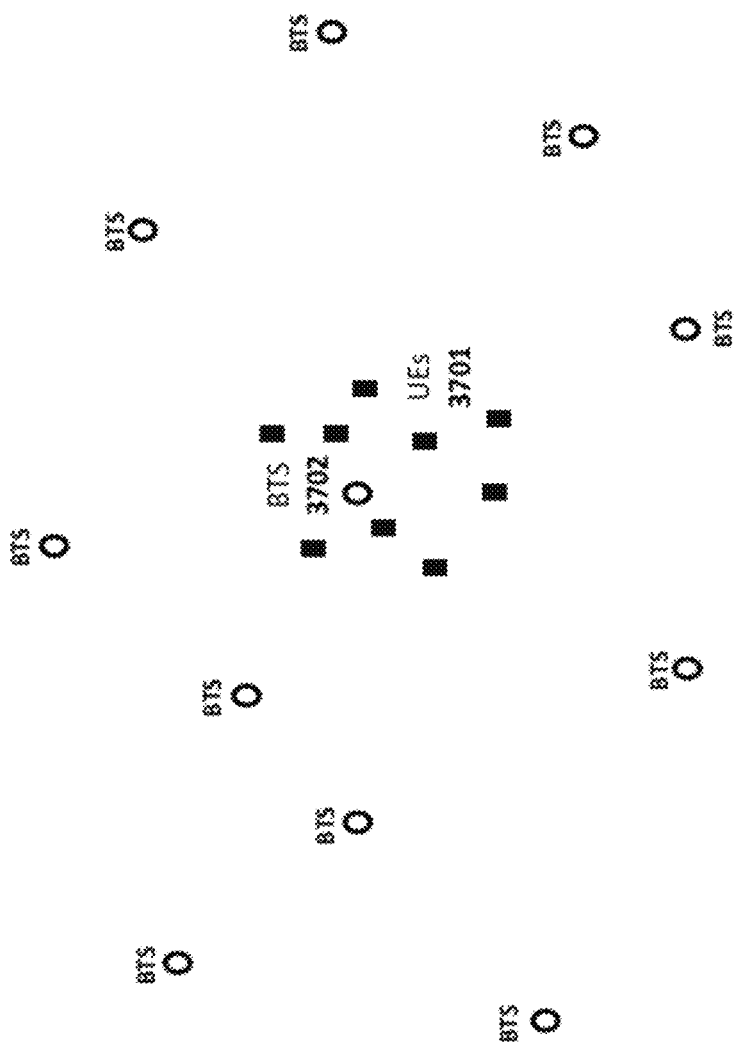
FIG. 37 illustrates an exemplary scenario where multiple UEs are clustered around one BTS.

Transmit power imbalance occurs when most or all of the clients are around one BTS and far from all the others, such that one BTS overpowers the others. Transmit power imbalance reduces channel spatial diversity (i.e., decreases the SSI), thereby adversely affecting system performance. One exemplary scenario is shown in FIG. 37 where multiple UEs 3701 (identified as squares) are clustered around one particular BTS 3702 (identified with a circle) and located far away from the other BTSs. This scenario would happen, for example, when there is an event in one location in which the group of clients are participating, and all other BTSs are far away. One embodiment of the invention adaptively adjusts the power of the BTSs in such a way that the power received at all clients from all BTSs is balanced. In one embodiment of the invention, the power of the BTS that is overpowering all the others is reduced until the power received by the clients balances the power received from all other BTSs. In another embodiment of the invention the power from all other BTSs is increased until the received power level from all BTSs to every client is balanced.

In TDD systems in which channel reciprocity is exploited, the channel state information (CSI) for the downlink is obtained from the uplink. The uplink training signal is quantized by the ADC at the receiver of the BTS and, as such, it has limited dynamic range, depending on the number of bits of the ADC. If all clients are clustered around one of the BTSs, the CSI for that BTS will have a much larger amplitude than the one from all the others and, as such, it will make the DIDO channel matrix singular and limit the spatial degrees of freedom of the link. That is the effect of transmit power imbalance. In FDD systems or TDD systems that do not exploit channel reciprocity, the same issue manifests at the receiver of the client devices also equipped with ADC. Moreover, the CSI may need to be quantized or mapped into bits via limited feedback techniques, before being sent over the wireless link. That quantization again limits the dynamic range for the CSI and yields a power imbalance when one of the BTSs overpowers the other. Embodiment of the invention described herein employ techniques for preventing power imbalance in MU-MAS and DIDO systems.

As shown in FIG. 13, one way to identify transmit power imbalance is by looking at the auto-correlation coefficient $\rho_a$: when the auto-correlation value approximates the number of the BTSs (assuming the transmit spatial covariance matrix is normalized with trace equal to the number of BTSs) the system undergoes transmit power imbalance. For example, in a power imbalanced DIDO 4×4 system, one auto-correlation would be close to "4" and all other auto-correlation coefficients would be close to zero. Contrarily, in a perfectly balanced system, all auto-correlation coefficients would be "1".

Figure 38:
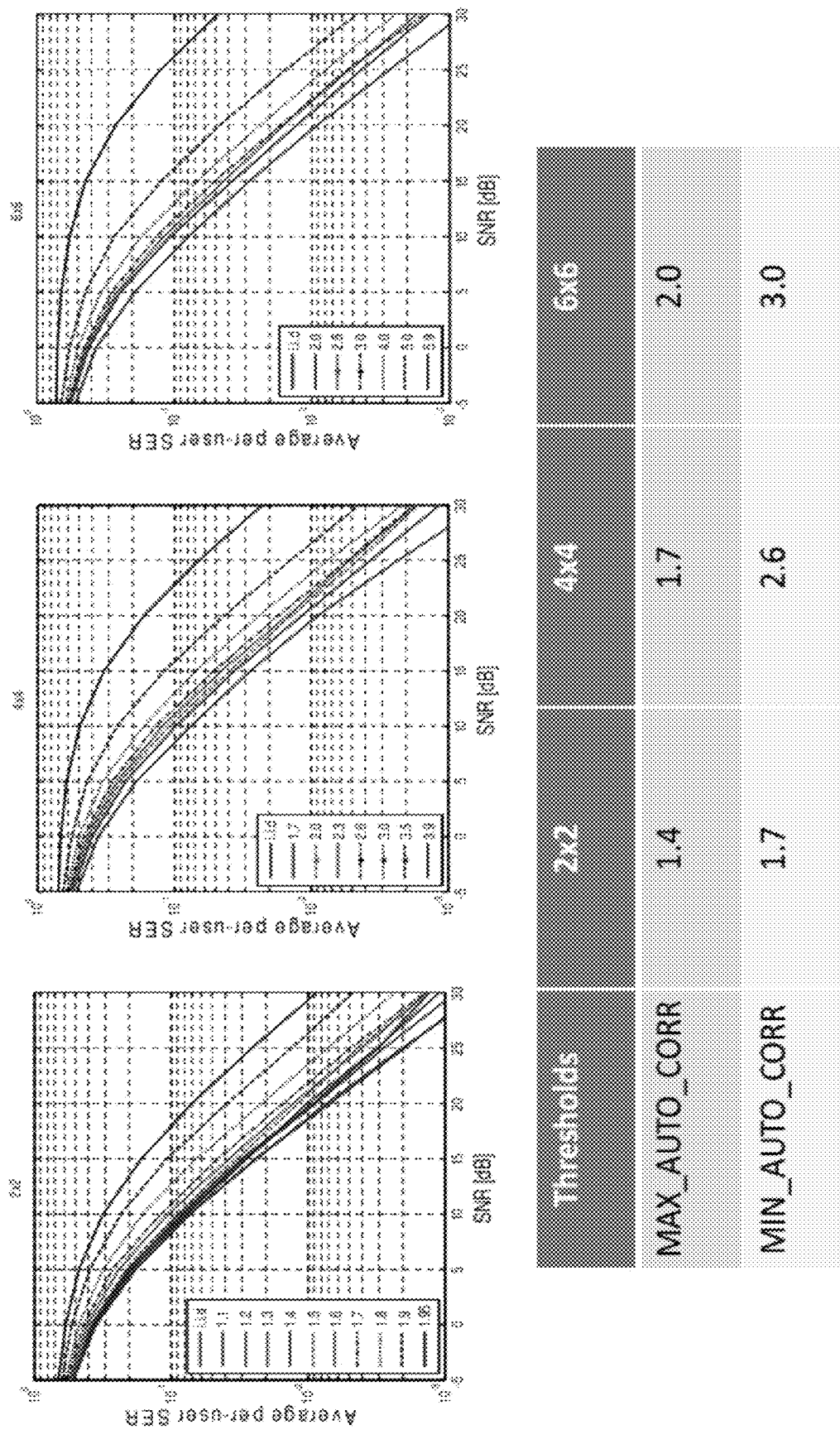
FIG. 38 illustrates SER performance of different order DIDO systems for different values of the maximum auto-correlation coefficient.

Transmit power imbalance adversely affects the performance of the system. For example, FIG. 38 shows the SER performance of different order DIDO systems for different values of the maximum auto-correlation coefficient. As the maximum auto-correlation decreases to "1", the SER performance approaches the ideal i.i.d. case. These SER results can be used to define thresholds that distinguish balanced systems from imbalanced systems. These auto-correlation thresholds can be determined through numerical, analytical, or empirical methods. For example, in FIG. 38 the thresholds are chosen such that the SER performance does not degrade more than 3 dB from the ideal i.i.d. performance. The invention, however, is not limited to this performance criterion and any other criteria that measure the system performance can be used. Another embodiment of the invention employs a hysteresis loop where two different thresholds are defined for the auto-correlation coefficient as in the table in FIG. 38.

Figure 39:
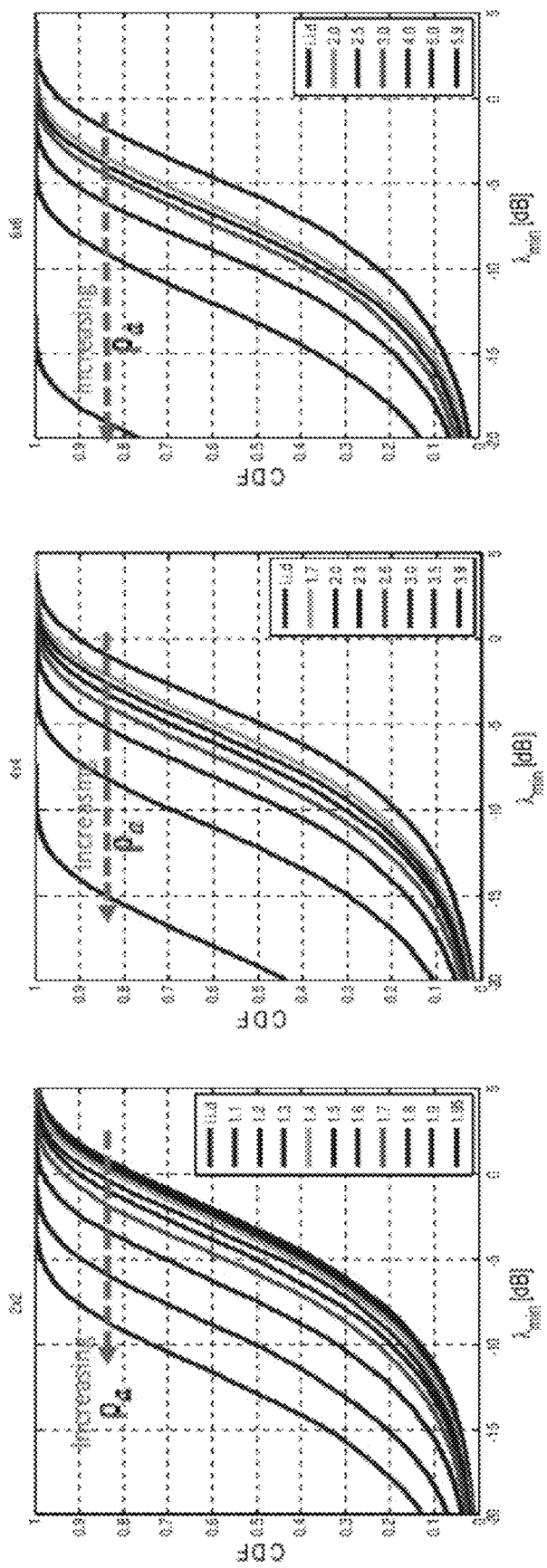
FIG. 39 illustrates the CDF of the SSI for different values of maximum auto-correlation.

FIG. 39 shows the CDF of the SSI for different values of maximum auto-correlation. We observe that increasing the maximum auto-correlation yields worse SSI performance due to reduced spatial diversity.

Embodiments of the invention propose different methods for balancing the transmit power across all BTSs in the MU-MAS or DIDO system. These methods can be executed at a regular rate. In one embodiment, the proposed methods run every execution cycle. However, depending on the constraints of the system being used, a lower rate may be used. Hereafter, we described these methods in details.

One embodiment of the invention aims to keep the transmit power of each BTS at the maximum possible level, while staying within the auto-correlation thresholds. We define two different thresholds, as shown in FIG. 38. The upper threshold, MAX_AUTO_CORR, represents the point at which the auto correlation number results in a significant drop in spatial diversity. If the auto-correlation number goes above this threshold, there will be a large drop in system performance.

The lower threshold, MIN_AUTO_CORR acts as a buffer to prevent the system from changing power settings too often. If a given BTS has an auto correlation number below MIN_AUTO_CORR, it can safely increase its transmit gain value (assuming transmit gain is not already set to its maximum). Note that the transmit gain may be the analog gain of the power amplifier in the RF chain and/or the digital gain corresponding to a certain level of the DAC. If the auto-correlation is between the MIN_AUTO_CORR and MAX_AUTO_CORR, no action is taken. If the power was to be increased in this instance, it could increase the auto-correlation number until it was above the MAX_AUTO_CORR, at which point the power would be decreased until it was below the MAX_AUTO_CORR, etc. This effect would cause the power to be changing constantly, which is inefficient and may potentially cause performance degradation.

Figure 40:
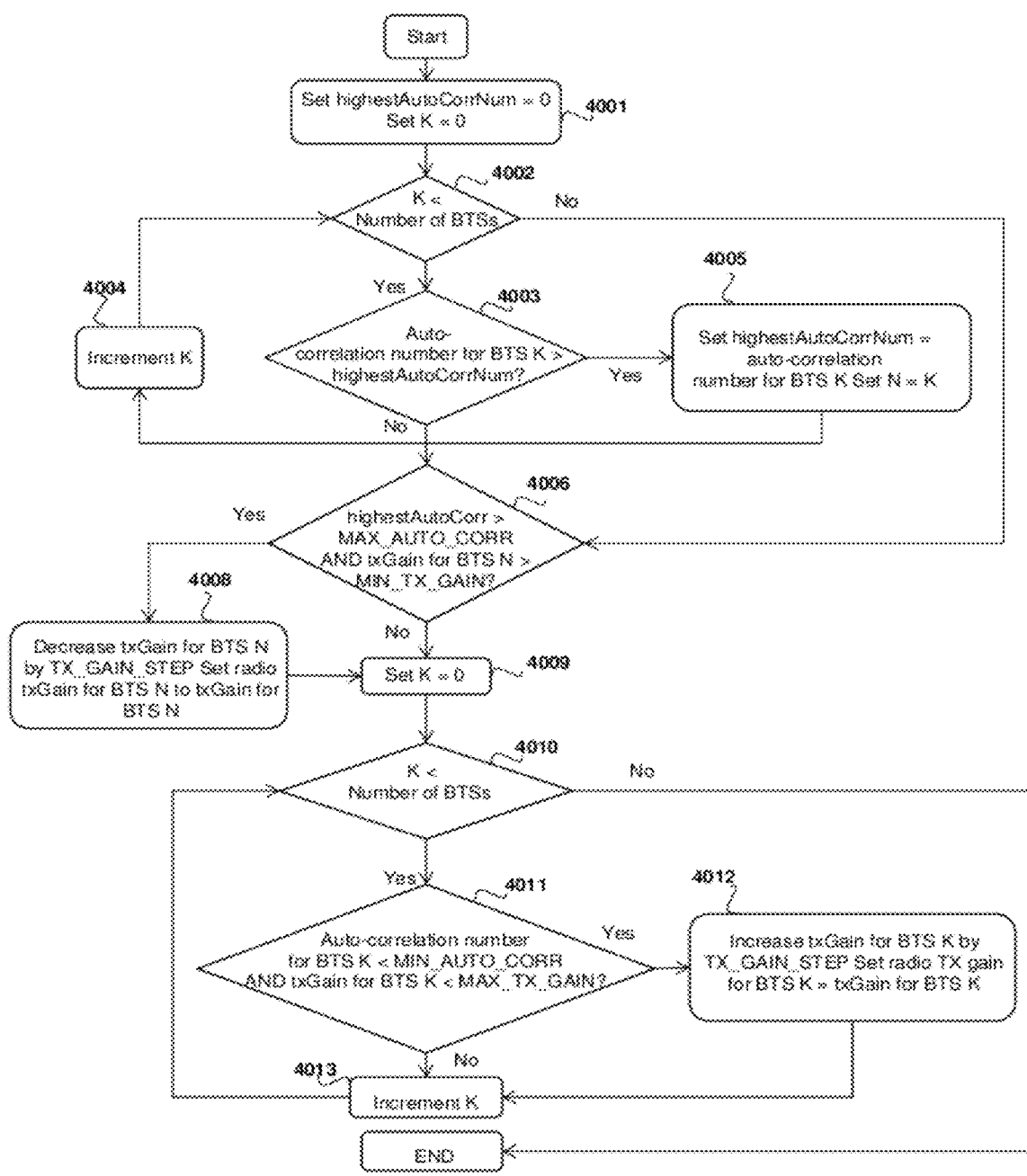
FIG. 40 illustrates one embodiment of a method for balancing the transmit power across all BTSs in the MU-MAS or DIDO system.

One embodiment of a method is illustrated in FIG. 40 and its associated pseudo-code is described as follows:

```
BEGIN
    INITIALIZE txGain for each BTS
    SET highestAutoCorrNum = 0
    SET K = 0
    REPEAT WHILE K < number of BTSs
        IF auto correlation number for BTS K > highestAutoCorr-
        Num
        THEN
            SET maxAutoCorrNum = auto correlation number of BTS
            K
            SET N = K
        END IF
        INCREMENT K
    END REPEAT
    IF highestAutoCorrNum > MAX_AUTO_CORR AND
    txGain for BTS N > MIN_TX_GAIN THEN
        Decrease the txGain for BTS N by TX_GAIN_STEP
        Set radio TX gain for BTS N = txGain for BTS N
    SET K = 0
    REPEAT WHILE K < number of BTSs
        IF txGain for BTS K < MAX_TX_GAIN AND
        auto correlation number for BTS K < MIN_AUTO_CORR
        THEN
            INCREASE txGain for BTS K by TX_GAIN_STEP
            SET radio TX gain for BTS K to txGain for BTS K
        END IF
        INCREMENT K
    END REPEAT
END
```

In summary, this method first determines which BTS has the highest correlation. That correlation value is saved, along with the index of the corresponding BTS. Then, if the highest correlation is above the upper threshold, the transmit gain is decreased. The transmit gain will not decrease below a defined minimum. Then, for each BTS, the transmit gain is increased if the highest correlation is below the lowest value. If the highest auto-correlation number is between the two thresholds, no action is taken. This is the target mode of operation of the proposed method.

Turning to the specific details of FIG. 40, at 4001, the variables highestAutoCorrNumber and K are initialized to zero. Steps 4002 and 4004 ensure that the loop repeats for each BTS. At 4002, if the current value of K is currently less than the number of BTSs, then at 4003, a determination is made as to whether the autocorrelation number for BTS K is greater than the current highest auto-correlation number. If so, then at 4005 the variable highestAutoCorrNum is set to the auto-correlation number for BTS K (i.e., BTS K has the highest auto-correlation number) and control variable N is set equal to K.

At 4006, if the highestAutoCorrNum is greater than the maximum auto-correlation (MAX_AUTO_CORR) and the transmit gain (txGain) for BTS N is greater than the minimum transmit gain (MIN_TX_GAIN) then, at 4008, the transmit gain for BTS N is decreased using a specified step size (TX_GAIN_STEP) and the txGain of BTS N's radio is set to the new txGain value.

At 4009, the control value K is set equal to zero. Step 4010 ensures that each BTS is addressed by the loop of steps 4011-4012. That is, if K is currently less than the number of BTSs (i.e., if all BTSs have not been analyzed) then, at 4011, a determination is made as to whether the auto-correlation number for BTS K is less than the minimum auto-correlation (MIN AUTO CORR) and the txGain for BTS K is less than the maximum allowable transmit gain value (MAX_TX_GAIN). If both conditions are met then, at 4012, the transmit gain for BTS K is increased by the predefined step size (TX_GAIN_STEP) and the new txGain is set on BTS K's radio. The control value K is incremented at 4013 and, at 4010, if K is equal to the number of BTSs (i.e., each BTS has been analyzed), the process terminates.

In another embodiment of the invention, auto-correlation values are mapped to transmit gain values. One embodiment uses a linear mapping, shown below. Although a linear mapping is simple to implement, the adverse effect of the auto-correlation on system performance does not scale linearly. Typically, system performance is significantly affected only after the auto-correlation number reaches some fraction of its maximum value. For example, DIDO 2×2 performance is seriously affected only when the maximum auto-correlation is above 1.95 (or 97.5% of its maximum value). Another mapping algorithm may utilize an exponential function or another power function designed to operate in these ranges, rather than a linear function.

Figure 41:
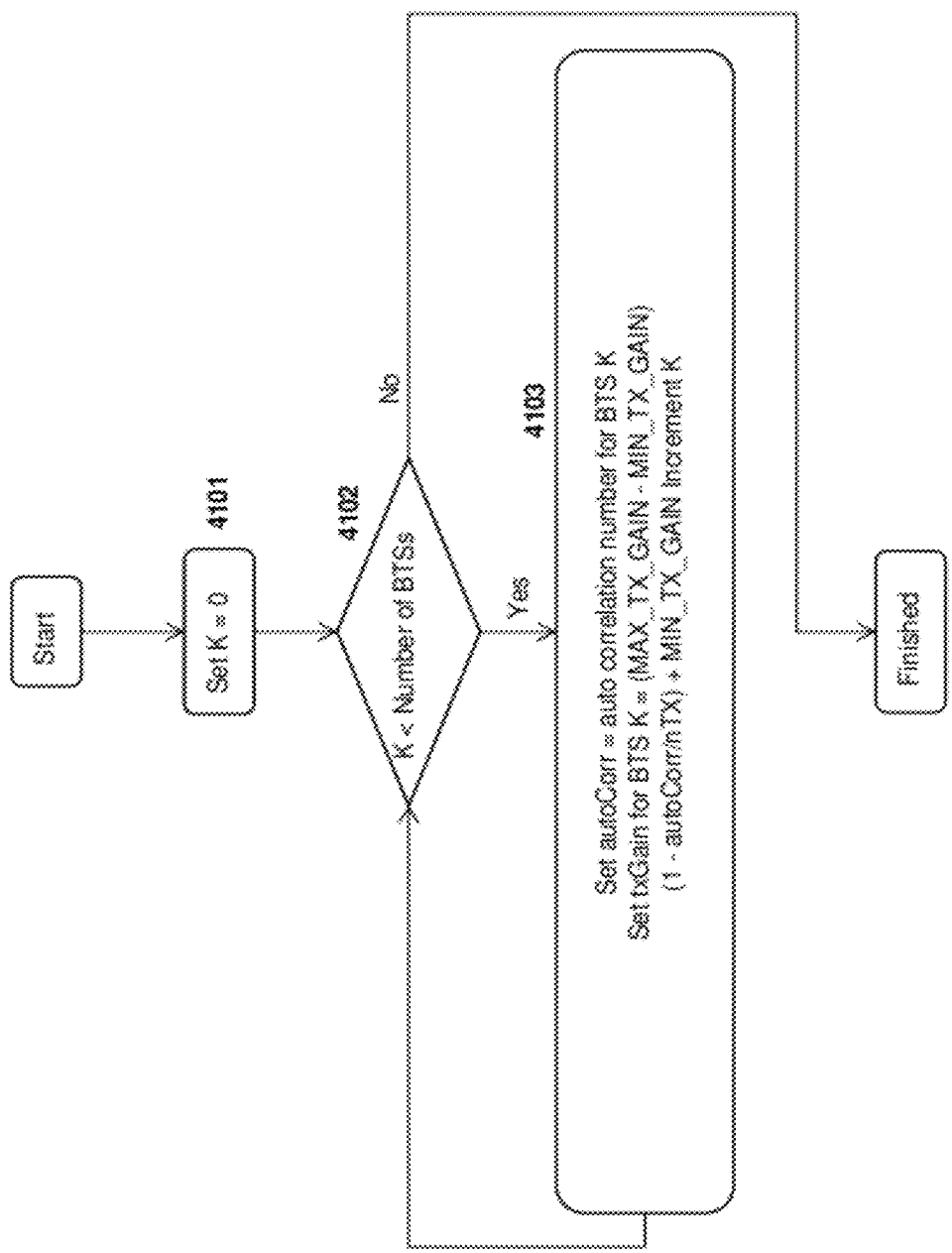
FIG. 41 illustrates another embodiment of a method for balancing the transmit power across all BTSs in the MU-MAS or DIDO system.

One embodiment of the method is illustrated in FIG. 41 and its pseudo-code is described as follows:

```
BEGIN
    INITIALIZE txGain for each BTS
    SET K = 0
    REPEAT WHILE K < number of BTSs
        SET autoCorr = auto correlation number for BTS K
        SET txGain for BTS K =
        (MAX_TX_GAIN - MIN_TX_GAIN)*(1 - autoCorr/nTX) +
        MIN_TX_GAIN
        INCREMENT K
    END REPEAT
```

This method takes an auto-correlation number and scales it directly into a transmit gain value. Most of the complexity in the method is to allow different orders of DIDO and different values of MIN_TX_GAIN and MAX_TX_GAIN. For example, the simplest form of the equation for a DIDO 2×2 system with transmit gain that ranges between A and B would be:

$$(B-A)*\left(1-\frac{\rho_a}{2}\right) \quad (9)$$

For example, an auto-correlation value of 2 (highest value for DIDO 2×2) would result in the transmit gain for that BTS being set to A=0 (lowest transmit power), while an auto correlation value of 0 (lowest value for DIDO 2×2) would result in the transmit gain for that BTS being set to B=30 (highest transmit power). It should be noted that both of these cases indicated extreme power imbalance. In the first case ($\rho_a$=2.0), this BTS is being received too strongly across the UEs. In the second case ($\rho_a$=0.0), the other BTS is being received too strongly. A perfectly balanced system, with $\rho_a$=1.0 for both BTSs, would result in the transmit gain staying at 15 (being the default value), as desired.

Turning to the specifics of FIG. 41, at 4101, the control variable K is initialized to 0. At 4102, if K is less than the number of BTSs being observed, then the operations set forth in 4103 are performed. Specifically, the variable auto-Corr is set equal to the current auto correlation number for BTS K. In addition, the variable txGain for BTS K is set equal to the difference between the maximum transmit gain value and the minimum transmit gain value (MAX_TX_GAIN–MIN_TX_GAIN) multiplied by (1–autoCorr/nTX) and added to the minimum transmit gain value (MIN_TX_GAIN). Control variable K is then incremented until K=the number of BTSs. The process then terminates.

Both of the previous methods are designed to adjust the transmit gain of every BTS within a single step. Another embodiment of the invention defines a method that always adjusts the power of only two BTSs. With this method, however, in certain scenarios one or more of the BTSs could remain at low transmit power setting for long periods of time. Thus, in practical systems this method would be combined with an algorithm similar to Method 1 (using thresholds as in FIG. 40) where the power of each BTS is increased if the auto-correlation number for that BTS is below MIN_AUTO_CORR.

The pseudo-code for Method 3 described above is as follows:

```
BEGIN
    INITIALIZE txGain for each BTS
    SET highestAutoCorrNum = 0
    SET lowestAutoCorrNum = MAX_AUTO_CORR
    SET K = 0
    REPEAT WHILE K < number of BTS
        IF auto correlation number for BTS K > highestAutoCorrNum
    THEN
            SET highestAutoCorrNum = auto correlation number of BTS K
            SET highestIdx = K
        ELSE IF auto correlation number for BTS K < lowestAutoCorrNum
        THEN
            SET lowestAutoCorrNum = auto correlation number of BTS K
            SET lowestIdx = K
        END IF
        INCREMENT K
    END REPEAT
    DECREASE txGain for BTS highestIdx by TX_GAIN_STEP
    IF txGain for BTS highestIdx < MIN_TX_GAIN THEN
        SET txGain for BTS highestIdx = MIN_TX_GAIN
    END IF
    SET radio TX gain for BTS highestIdx = txGain for BTS highestIdx
    INCREASE txGain for BTS lowestIdx by TX_GAIN_STEP
    IF txGain for BTS lowestIdx > MAX_TX_GAIN THEN
        SET txGain for BTS lowestIdx = MAX_TX_GAIN
    END IF
END
```

In summary, this method first determines the maximum and minimum auto-correlation values and records the indices for the corresponding BTS. Then, the transmit gain of the BTS with the highest auto correlation is reduced by TX_GAIN_STEP, and the transmit gain of the BTS with the lowest auto correlation is increased by TX_GAIN_STEP.

Figure 42:
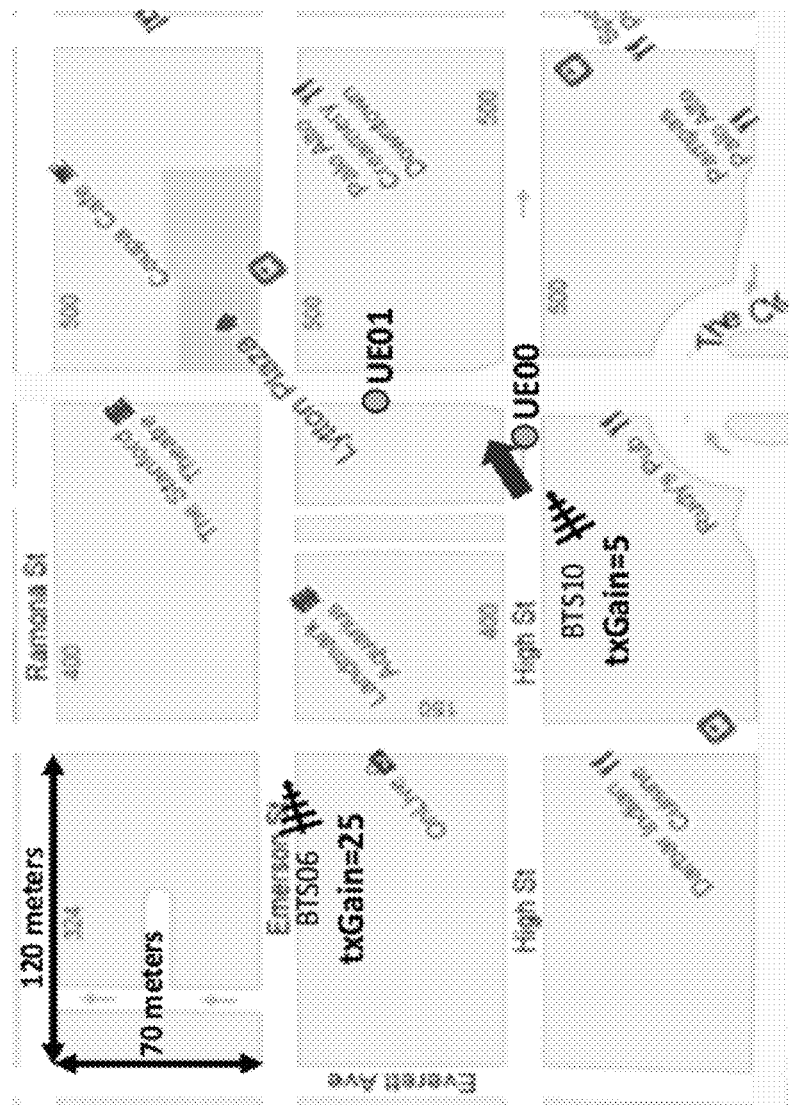
FIG. 42 illustrates the performance of the transmit power balancing methods in practical outdoor propagation scenarios.
Figure 43:
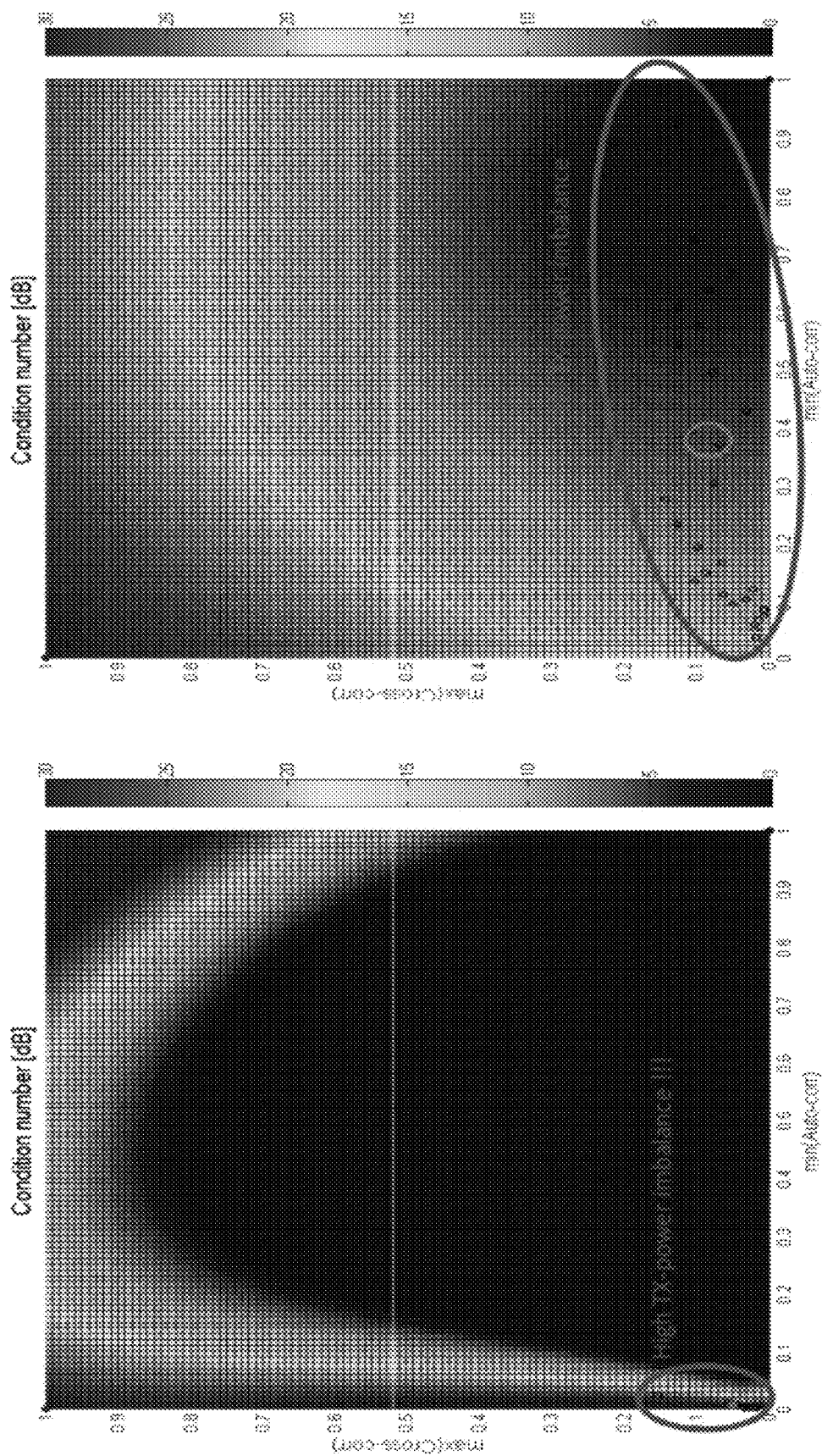
FIG. 43 illustrates the distribution of the condition number with and without power imbalance.

Finally, we show the performance of the transmit power balancing methods in practical outdoor propagation scenarios. The first scenario we considered is depicted in FIG. 42. Transmit power imbalance is caused by the two clients UE00, UE01 being in close proximity to BTS 10. The distribution of the condition number with and without power imbalance is shown in FIG. 43.

Figure 46:
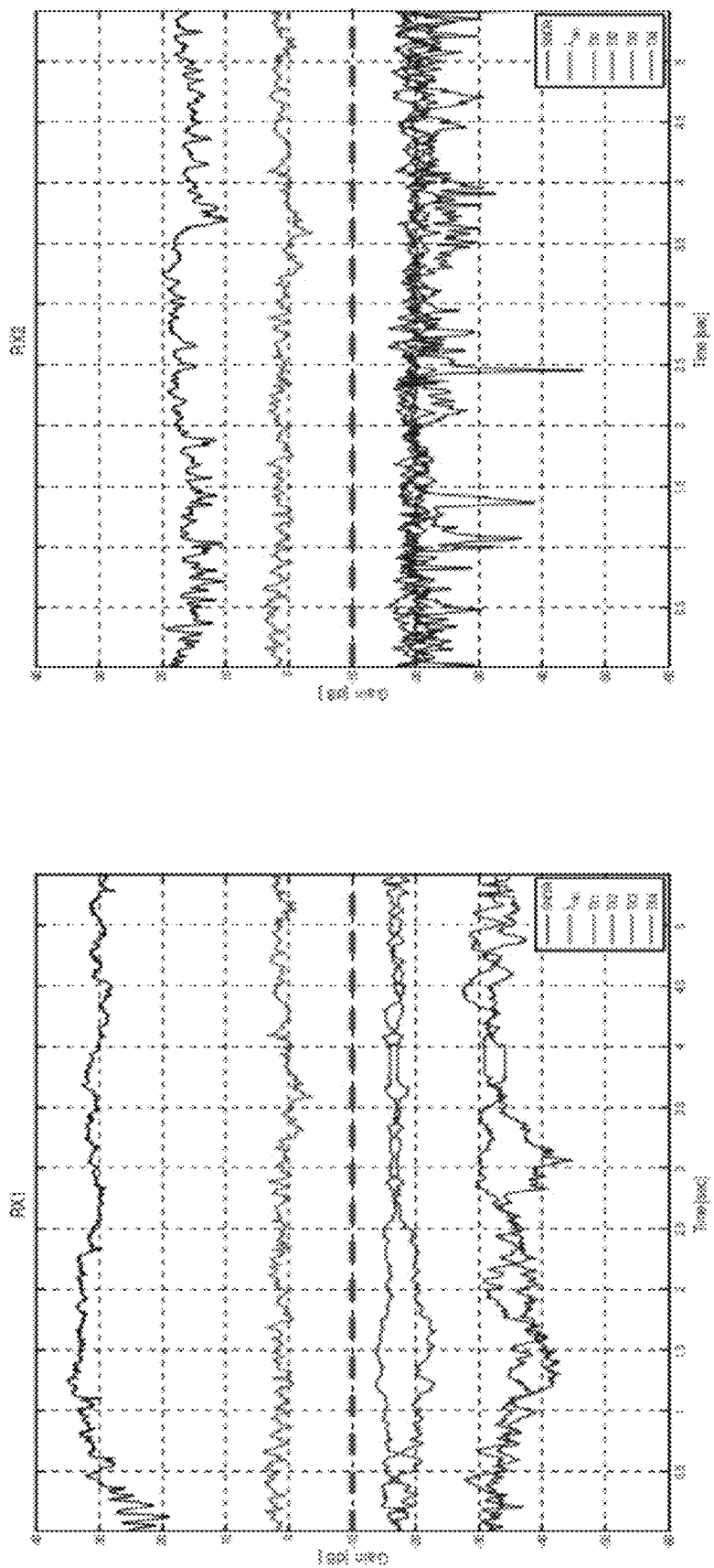

FIGS. 44-46 show the channel traces (SNDR, SSI and TSI) for three different cases: i) DIDO 2×2 without transmit power balancing method; ii) DIDO 2×2 with transmit power balancing method; iii) DIDO 4×2 with transmit power balancing method in combination with antenna selection method. The SSI threshold is set to −10 dB. We observe that transmit power balancing and antenna selection methods help improve the SSI trace and consequently the SNDR performance.

Figure 47:
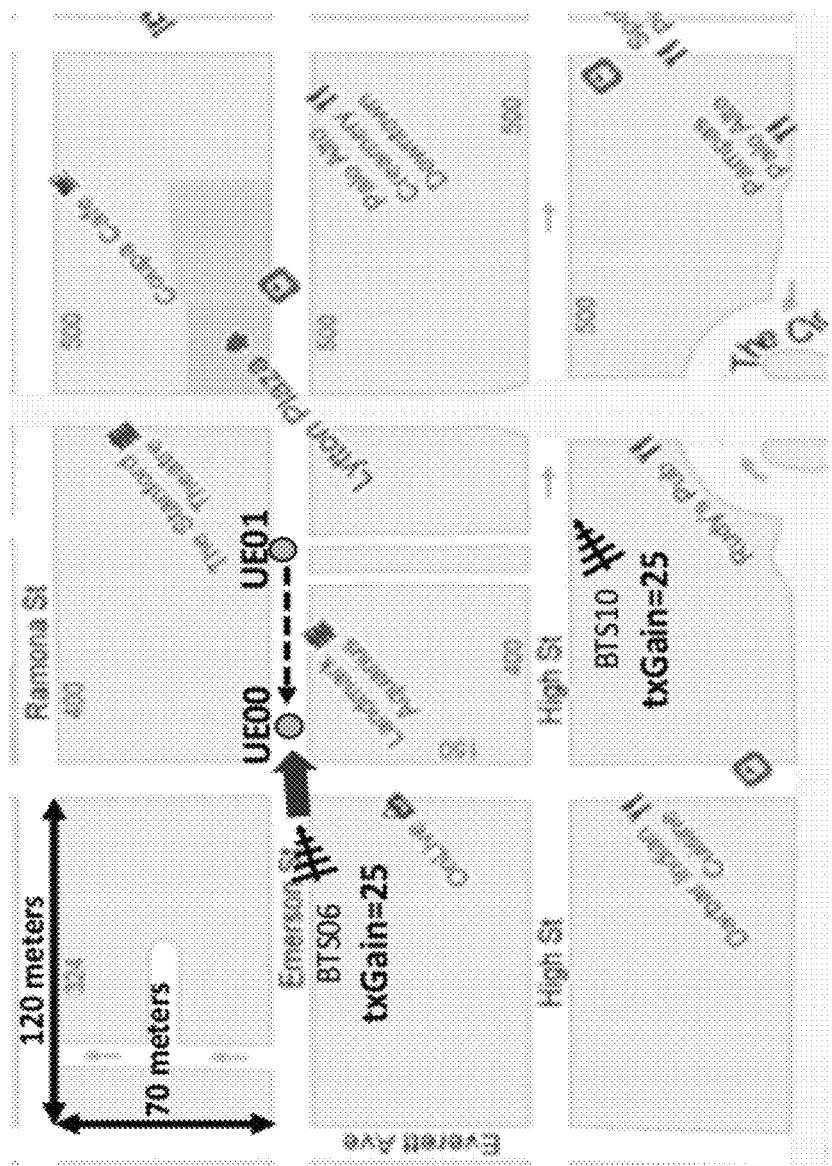
FIG. 47 illustrates a scenario where a particular BTS is the source of transmit power imbalance.
Figure 48:
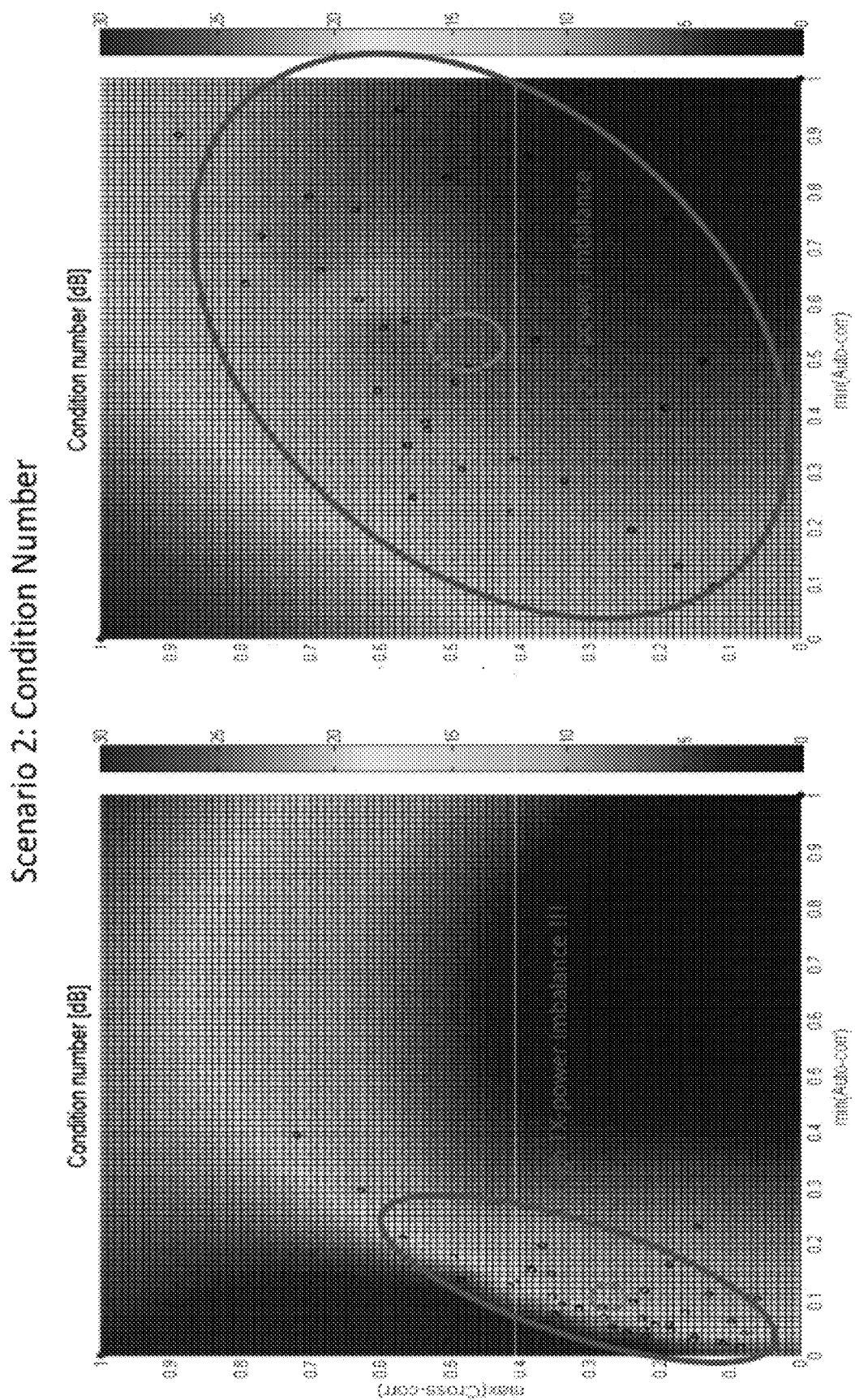
FIG. 48 illustrates the condition number distribution with and without imbalance.
Figure 49:
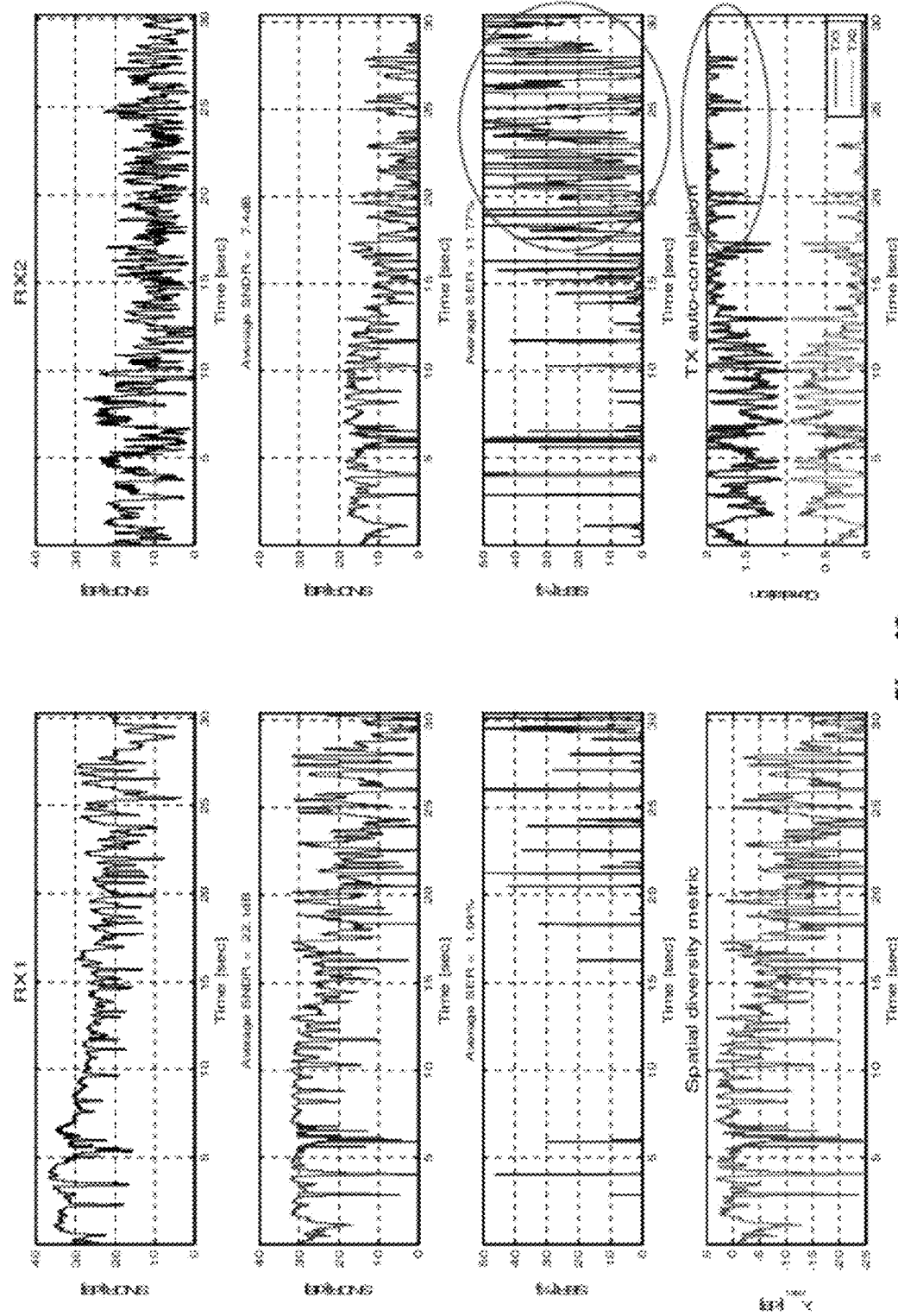
FIGS. 49-51 depict channel traces for different algorithms.
Figure 50:
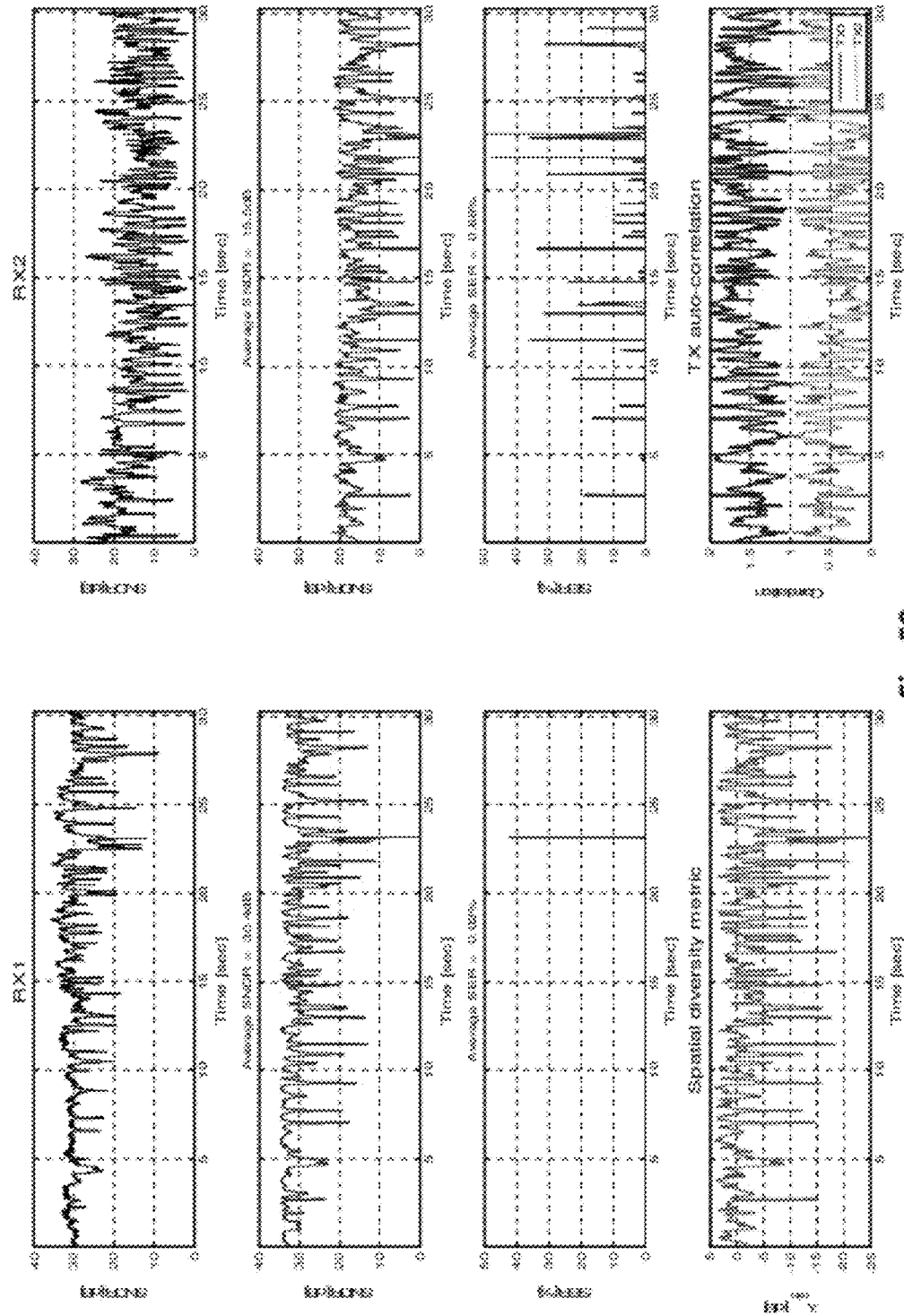
Figure 51:
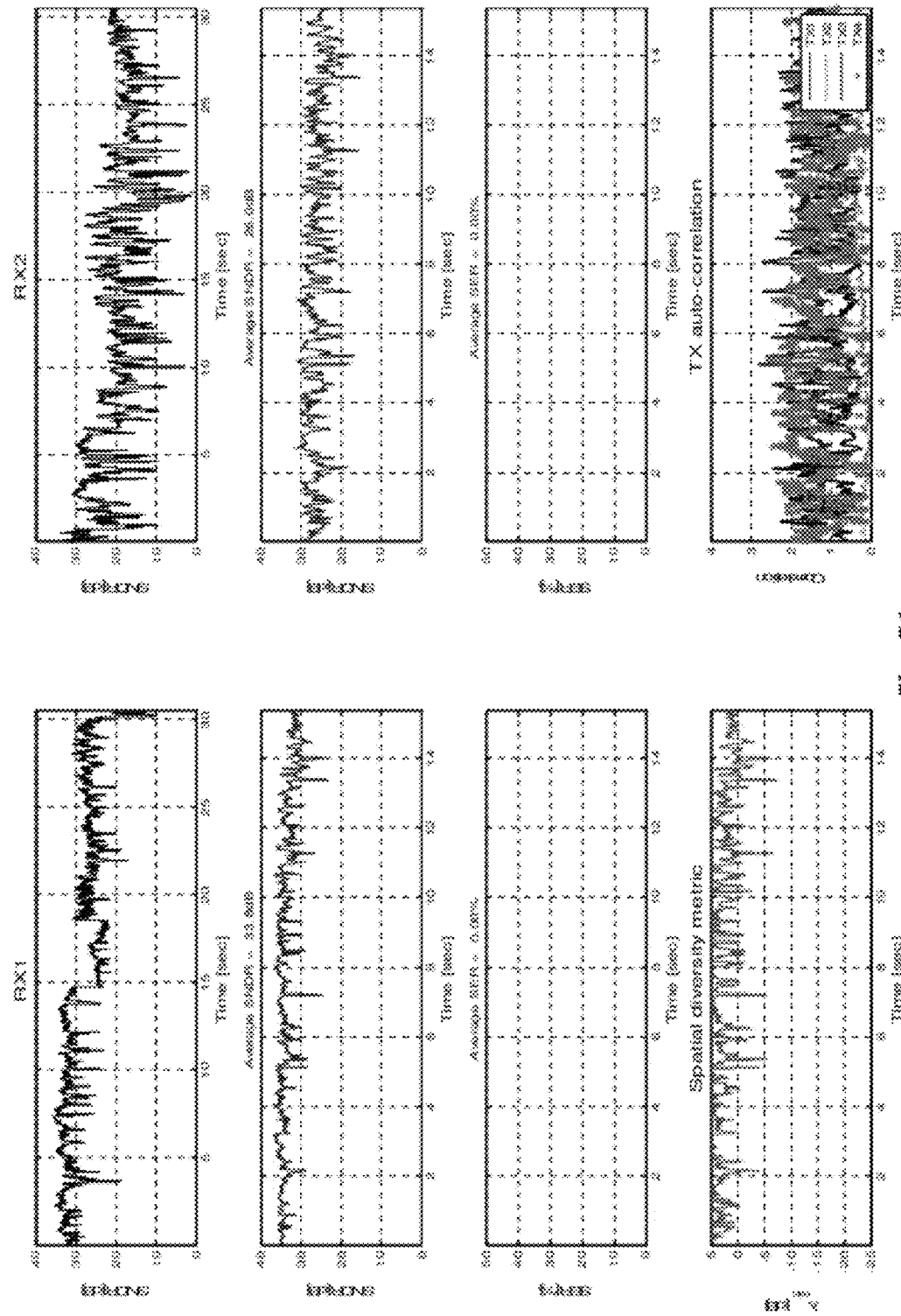

A different scenario is depicted in FIG. 47, where BTS 6 is the source of transmit power imbalance. FIG. 48 shows the condition number distribution with and without imbalance and FIGS. 49-51 depict channel traces for different algorithms as before. Once again, both transmit power balancing and antenna selection methods improve SSI and SNDR performance.

Figure 52:
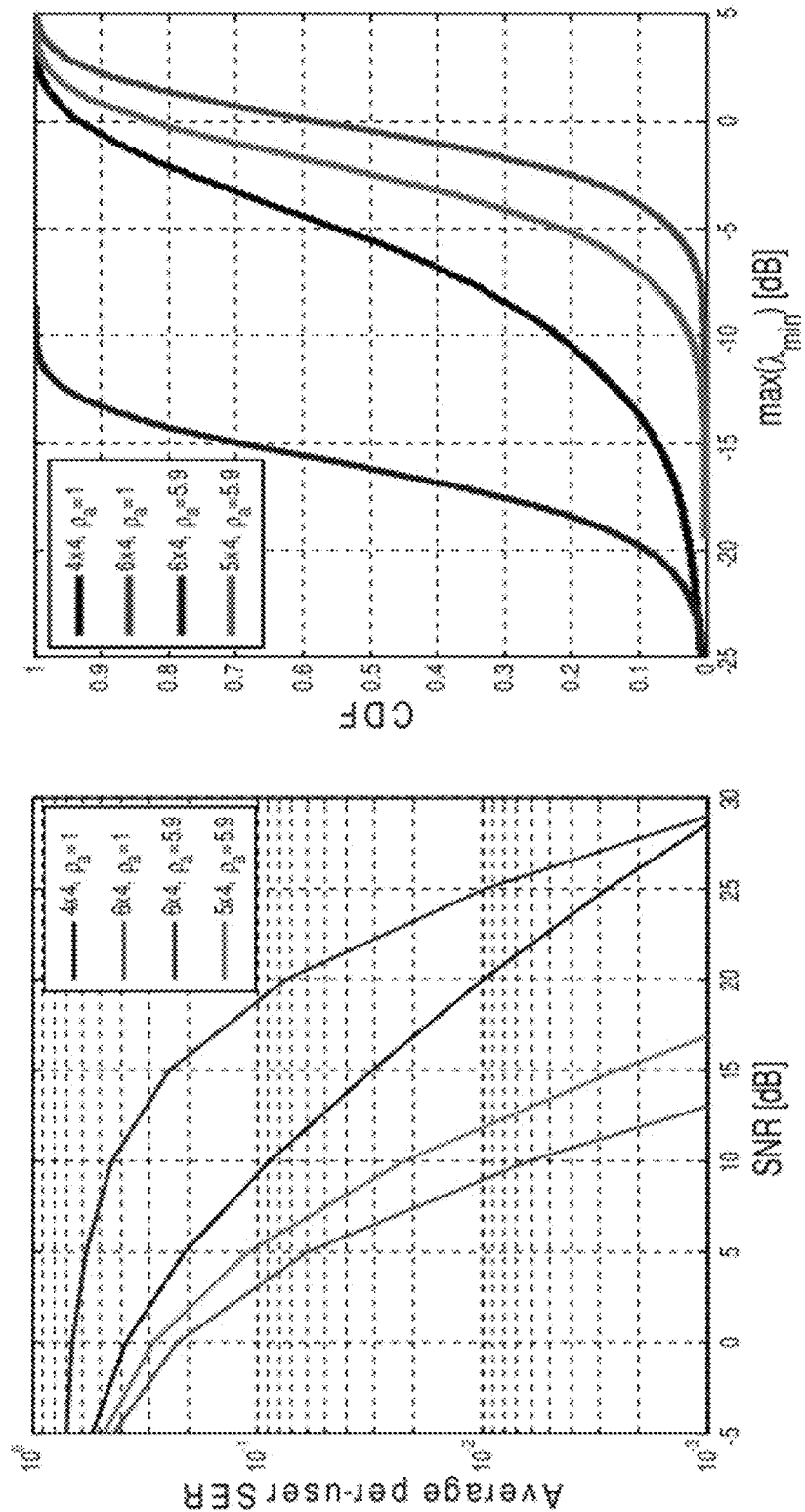
FIG. 52 illustrates the SER and CDF of the SSI for DIDO systems with 4 clients.

Another embodiment of the invention employs a combination of transmit power balancing and antenna selection algorithms. In this method, the extra antenna that provides the largest auto-correlation coefficient is removed and the conventional antenna selection algorithm is applied with the remaining extra antennas. For example, FIG. 52 shows the SER and CDF of the SSI for DIDO systems with 4 clients. The performance of DIDO 6×4 is significantly degraded when the system undergoes transmit power imbalance. By removing the BTS that yields a large auto-correlation coefficient, system performance is improved significantly as shown by the SER curve for DIDO 5×4.

Finally, FIG. 53 shows the statistics of the BTSs that have been selected for transmission and their relative usage. The last graph shows that DIDO 5×4 with transmit power balancing and antenna selection has zero usage of BTS1 because that BTS has been removed as a result of high auto-correlation value.

6. REFERENCES

[1] R. A. Monziano and T. W. Miller, *Introduction to Adaptive Arrays*, New York: Wiley, 1980.

[2] K. K. Wong, R. D. Murch, and K. B. Letaief, "A joint channel diagonalization for multiuser MIMO antenna systems," IEEE Trans. Wireless Comm., vol. 2, pp. 773-786, July 2003;

[3] M. Costa, "Writing on dirty paper," *IEEE Transactions on Information Theory*, Vol. 29, No. 3, Page(s): 439-441, May 1983.

[4] U. Erez, S. Shamai (Shitz), and R. Zamir, "Capacity and lattice-strategies for cancelling known interference," *Proceedings of International Symposium on Information Theory*, Honolulu, Hi., November 2000.

[5] G. Caire and S. Shamai, "On the achievable throughput of a multiantenna Gaussian broadcast channel," IEEE Trans. Info. Th., vol. 49, pp. 1691-1706, July 2003.

[6] M. Tomlinson, "New automatic equalizer employing modulo arithmetic," *Electronics Letters*, Page(s): 138-139, March 1971.

[7] H. Miyakawa and H. Harashima, "A method of code conversion for digital communication channels with intersymbol interference," *Transactions of the Institute of Electronic*

[8] D.-S. Shiu, G. J. Foschini, M. J. Gans, and J. M. Kahn, "Fading correlation and its effect on the capacity of multielement antenna systems," IEEE Trans. Comm., vol. 48, no. 3, pp. 502-513, March 2000.

[9] J. P. Kermoal, L. Schumacher, K. I. Pedersen, P. E. Mogensen, and F. Frederiksen, "A stochastic MIMO radio channel model with experimental validation," IEEE Jour. Select. Areas in Comm., vol. 20, no. 6, pp. 1211-1226, August 2002.

[10] R. Chen, R. W. Heath, Jr., and J. G. Andrews, "Transmit Selection Diversity for Unitary Precoded Multiuser Spatial Multiplexing Systems with Linear Receivers," *IEEE Trans. on Signal Processing*, vol. 55, no. 3, pp. 1159-1171, March 2007.

We claim:

1. A method implemented within a multiuser (MU) multiple antenna system (MAS) comprising:
communicatively coupling one or more centralized units to multiple distributed transceiver stations or antennas via a network, the network comprising wireline or wireless links or a combination of both;
employing the network as a backhaul communication channel; and
employing transmit antenna selection, user selection, or transmit power balancing to enhance channel space diversity within the MU-MAS;
transmitting a plurality of data streams concurrently from the multiple antennas to a plurality of users.

2. The method as in claim 1 wherein a space selectivity indicator (SSI), time selectivity indicator (TSI), and/or frequency selectivity indicator (FSI) are used as measures of the channel diversity.

3. The method as in claim 2 further comprising defining different subsets of transmit antennas and selects the subset that optimizes the SSI for transmission over the wireless links.

4. The method as in claim 2 wherein a selection criterion is based on SSI, TSI and/or FSI thresholds derived from measurements.

5. The method as in claim 2 wherein a minimum singular value of an effective channel matrix of every client device is used as SSI.

6. The method as in claim 2 wherein a minimum singular value or the condition number of a composite channel matrix from all client devices is used as SSI.

7. The method as in claim 2 wherein an absolute value of the sum of the complex channel gain from some or all transceiver stations is used as TSI.

8. The method as in claim 2 wherein the SSI is used to measure and predict the areas of coherence.

9. The method as in claim 2 wherein an average SSI is used to select adaptively between fixed transmit antenna configuration and transmit antenna selection methods based on changing channel conditions.

10. The method as in claim 2 wherein temporal correlation of the SSI is exploited to select an optimal antenna subset while reducing the computational complexity of the method.

11. The method as in claim 3 wherein searching for the optimal antenna subset is suspended as soon as the first subset that satisfies the SSI threshold is found, thereby reducing computational complexity.

12. The method as in claim 3 wherein only a limited number of antenna subsets are selected based on certain performance criterion as a means to reduce the computational complexity of the method.

13. The method as in claim 1 wherein a base transceiver station (BTS) that overpowers the other BTSs reduces its transmit power to balance the power from all BTSs to the clients.

14. The method as in claim 1 wherein a base transceiver station (BTS) that overpowers the other BTSs keeps its power level unaltered, the other BTSs increase their transmit power to balance the power from all BTSs to the clients.

15. The method as in claim 1 wherein a maximum auto-correlation coefficient of the covariance matrix is used as an indication of transmit power imbalance.

16. The method as in claim 15 wherein thresholds of auto-correlation are defined to select between power balanced and imbalanced methods and those thresholds are obtained based on certain performance criterion.

17. The method as in claim 16 wherein the selection is based on hysteresis loop and multiple thresholds of auto-correlation are defined for that hysteresis.

18. The method as in claim 15 wherein the auto-correlation is mapped into a transmit gain value and that value is used to adjust the power of the BTSs.

19. A multiuser (MU) multiple antenna system (MAS) comprising:
one or more centralized units communicatively coupled to multiple distributed transceiver stations or antennas via a network;
the network comprising wireline or wireless links or a combination of both, employed as a backhaul communication channel; and
the MU-MAS employing transmit antenna selection, user selection and/or transmit power balancing are employed to enhance channel spatial diversity;
transmitting a plurality of data streams concurrently from the multiple antennas to a plurality of users.

20. The system as in claim 19 wherein a space selectivity indicator (SSI), time selectivity indicator (TSI), and/or frequency selectivity indicator (FSI) are used as measures of the channel diversity.

21. The system as in claim 20 further comprising defining different subsets of transmit antennas and selects the subset that optimizes the SSI for transmission over the wireless links.

22. The system as in claim 20 wherein a selection criterion is based on SSI, TSI and/or FSI thresholds derived from measurements.

23. The system as in claim 20 wherein a minimum singular value of an effective channel matrix of every client device is used as SSI.

24. The system as in claim 20 wherein a minimum singular value or the condition number of a composite channel matrix from all client devices is used as SSI.

25. The system as in claim 20 wherein an absolute value of the sum of the complex channel gain from some or all transceiver stations is used as TSI.

26. The system as in claim 20 wherein the SSI is used to measure and predict the areas of coherence.

27. The system as in claim 20 wherein an average SSI is used to select adaptively between fixed transmit antenna configuration and transmit antenna selection systems based on changing channel conditions.

28. The system as in claim 20 wherein temporal correlation of the SSI is exploited to select an optimal antenna subset while reducing the computational complexity of the system.

29. The system as in claim 21 wherein searching for the optimal antenna subset is suspended as soon as the first subset that satisfies the SSI threshold is found, thereby reducing computational complexity.

30. The system as in claim 21 wherein only a limited number of antenna subsets are selected based on certain performance criterion as a means to reduce the computational complexity of the system.

31. The system as in claim 19 wherein a base transceiver station (BTS) that overpowers the other BTSs reduces its transmit power to balance the power from all BTSs to the clients.

32. The system as in claim 19 wherein a base transceiver station (BTS) that overpowers the other BTSs keeps its power level unaltered, the other BTSs increase their transmit power to balance the power from all BTSs to the clients.

33. The system as in claim 19 wherein a maximum auto-correlation coefficient of the covariance matrix is used as an indication of transmit power imbalance.

34. The system as in claim 33 wherein thresholds of auto-correlation are defined to select between power balanced and imbalanced systems and those thresholds are obtained based on certain performance criterion.

35. The system as in claim 34 wherein the selection is based on hysteresis loop and multiple thresholds of auto-correlation are defined for that hysteresis.

36. The system as in claim 35 wherein the auto-correlation is mapped into a transmit gain value and that value is used to adjust the power of the BTSs.

\* \* \* \* \*